United States Patent
Morris et al.

(10) Patent No.: US 10,815,441 B2
(45) Date of Patent: *Oct. 27, 2020

(54) FUEL AND PROCESS FOR POWERING A COMPRESSION IGNITION ENGINE

(71) Applicant: Gane Energy & Resources Pty Ltd., Victoria (AU)

(72) Inventors: Greg Morris, Victoria (AU); Michael John Brear, Victoria (AU); Ronald Andrew Slocombe, Victoria (AU)

(73) Assignee: Gane Energy & Resources Pty Ltd., Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/235,374

(22) Filed: Aug. 12, 2016

(65) Prior Publication Data
US 2016/0369193 A1    Dec. 22, 2016

Related U.S. Application Data

(63) Continuation of application No. 13/989,467, filed as application No. PCT/AU2011/001530 on Nov. 25, 2011, now Pat. No. 9,447,724.

(30) Foreign Application Priority Data

Nov. 25, 2010 (AU) ................................. 2010905225
Nov. 25, 2010 (AU) ................................. 2010905226

(51) Int. Cl.
*C10L 1/02* (2006.01)
*C10L 1/00* (2006.01)
(Continued)

(52) U.S. Cl.
CPC .............. *C10L 1/026* (2013.01); *C10L 1/003* (2013.01); *C10L 1/10* (2013.01); *C10L 1/125* (2013.01);
(Continued)

(58) Field of Classification Search
CPC .. C10L 1/026; C10L 1/003; C10L 1/10; C10L 1/125; C10L 1/1852;
(Continued)

(56) References Cited

U.S. PATENT DOCUMENTS

| 2,087,411 A | 7/1937 | Lundquist |
| 2,461,580 A | 2/1949 | Wiczer et al. |

(Continued)

FOREIGN PATENT DOCUMENTS

| CA | 1154964 | 10/1983 |
| CA | 1289430 | 9/1991 |

(Continued)

OTHER PUBLICATIONS

International Search Report for PCT/AU2011/001530 dated Mar. 19, 2012.
(Continued)

*Primary Examiner* — Cephia D Toomer
(74) *Attorney, Agent, or Firm* — Fish & Richardson P.C.

(57) ABSTRACT

A diesel engine fuel composition including methanol, at least 5% by weight water, one or more additives selected from the group consisting of: ignition improvers, fuel extenders, combustion enhancers, oxygen absorbing oil, lubricity additives, product colouration additives, flame colour additives, anti corrosion additives, biocides, freeze point depressants, deposit reductants, denaturants, pH controlling agents, and mixtures thereof, and 0% to 20% by weight dimethyl ether. Also provided is a process of powering a compression ignition engine using such a diesel engine fuel.

15 Claims, 15 Drawing Sheets

(51) Int. Cl.
*F02M 25/08* (2006.01)
*C10L 1/10* (2006.01)
*C10L 1/12* (2006.01)
*C10L 1/185* (2006.01)
*C10L 1/32* (2006.01)
*F02B 47/02* (2006.01)
*F02B 43/00* (2006.01)

(52) U.S. Cl.
CPC .............. *C10L 1/1852* (2013.01); *C10L 1/328* (2013.01); *F02B 43/00* (2013.01); *F02B 47/02* (2013.01); *F02M 25/0809* (2013.01); *C10L 2230/18* (2013.01); *C10L 2270/026* (2013.01); *C10L 2290/06* (2013.01); *Y02E 20/14* (2013.01); *Y02T 10/12* (2013.01); *Y02T 10/30* (2013.01)

(58) Field of Classification Search
CPC ........... C10L 2270/026; C10L 2230/18; C10L 1/328; C10L 2290/06; F02M 25/0809; F02B 47/02; F02B 43/00; Y02T 10/121; Y02T 10/32; Y02E 20/14
See application file for complete search history.

(56) References Cited

U.S. PATENT DOCUMENTS

| | | | |
|---|---|---|---|
| 2,991,254 A * | 7/1961 | Oberdorfer, Jr. | C07D 317/36 |
| | | | 44/351 |
| 3,977,376 A | 8/1976 | Reid et al. | |
| 4,316,360 A | 2/1982 | Liu et al. | |
| 4,425,136 A | 1/1984 | Pearson et al. | |
| 4,563,982 A | 6/1986 | Pischinger et al. | |
| 4,603,662 A | 8/1986 | Norton et al. | |
| 4,656,831 A | 4/1987 | Budininkas et al. | |
| 4,802,891 A | 2/1989 | Yamada et al. | |
| 4,805,571 A * | 2/1989 | Humphrey | F01L 1/348 |
| | | | 123/25 C |
| 4,932,979 A | 6/1990 | Thrasher et al. | |
| 4,958,598 A * | 9/1990 | Fosseen | F02B 1/02 |
| | | | 123/1 A |
| 5,097,803 A | 3/1992 | Galvin | |
| 5,133,298 A | 7/1992 | Ahnger | |
| 5,906,664 A | 5/1999 | Basu et al. | |
| 6,270,541 B1 | 8/2001 | Basu et al. | |
| 6,324,827 B1 | 12/2001 | Basu et al. | |
| 6,609,582 B1 | 8/2003 | Botti et al. | |
| 6,637,381 B2 | 10/2003 | Stanglmaier et al. | |
| 6,786,938 B1 | 9/2004 | Cemenska et al. | |
| 7,449,034 B1 | 11/2008 | Mikkelsen et al. | |
| 7,576,442 B2 | 8/2009 | Auer | |
| 7,686,855 B2 | 3/2010 | Sills et al. | |
| 2001/0038934 A1 | 11/2001 | Berlowitz et al. | |
| 2002/0025457 A1 | 2/2002 | Dodd et al. | |
| 2002/0152673 A1 | 10/2002 | Huff et al. | |
| 2003/0060355 A1 | 3/2003 | Yao et al. | |
| 2003/0066497 A1 | 4/2003 | Stanglmaier et al. | |
| 2004/0258597 A1 | 12/2004 | Michalakos et al. | |
| 2005/0050792 A1 | 3/2005 | Corkwell et al. | |
| 2008/0209798 A1 | 9/2008 | Gernon et al. | |
| 2010/0230506 A1 | 9/2010 | Henriksson | |
| 2011/0005501 A1 | 1/2011 | Eberhard | |
| 2012/0047796 A1 | 3/2012 | Stites et al. | |
| 2013/0318946 A1 | 12/2013 | Morris et al. | |
| 2013/0333653 A1 | 12/2013 | Morris et al. | |

FOREIGN PATENT DOCUMENTS

| | | |
|---|---|---|
| CN | 1070675 A | 4/1993 |
| CN | 1079983 | 12/1993 |
| CN | 1156475 | 8/1997 |
| CN | 1230585 | 10/1999 |
| CN | 1335374 | 2/2002 |
| CN | 1434101 | 8/2003 |
| CN | 1206326 | 6/2005 |
| CN | 1654605 | 8/2005 |
| CN | 1699517 | 11/2005 |
| CN | 01834211 | 9/2006 |
| CN | 1837333 | 9/2006 |
| CN | 101113372 A | 1/2008 |
| CN | 101260326 * | 9/2008 |
| CN | 101338226 | 1/2009 |
| CN | 101434874 | 5/2009 |
| CN | 101475857 | 7/2009 |
| CN | 101619245 | 1/2010 |
| CN | 201531315 | 7/2010 |
| CN | 101619249 | 3/2013 |
| DE | 3307091 | 4/1988 |
| EP | 0 032 003 | 7/1981 |
| EP | 0014992 | 5/1983 |
| EP | 0117532 * | 9/1984 |
| EP | 0117532 | 8/1988 |
| IN | 1995 DEL01444 | 9/2013 |
| JP | S59-085469 | 5/1984 |
| JP | S64-29495 | 1/1989 |
| JP | H4-232367 | 8/1992 |
| JP | H05-074955 | 10/1993 |
| JP | H7-126665 | 5/1995 |
| JP | H09-194857 | 7/1997 |
| JP | H10-88156 | 4/1998 |
| JP | 2000-509433 | 7/2000 |
| JP | 2001129373 | 5/2001 |
| JP | 2001-159349 | 6/2001 |
| JP | 2002-309273 | 10/2002 |
| JP | 2005-320938 | 11/2005 |
| JP | 2008-223750 | 9/2008 |
| KR | 10-2006-0021914 | 3/2006 |
| WO | 1990/03421 | 4/1990 |
| WO | 1995/025154 | 9/1995 |
| WO | WO1996/005274 | 2/1996 |
| WO | WO2001/002515 | 1/2001 |
| WO | WO2004024849 * | 3/2004 |
| WO | 2007/088564 | 8/2007 |
| WO | 2011/085657 | 7/2011 |

OTHER PUBLICATIONS

International Search Report for PCT/AU2011/001531 dated Mar. 26, 2012.
C. Green and N. Cockshutt, "Dimethyl ether as a methanol ignition improver: Substitution Requirements and Exhaust Emission Impact", SAE paper 902155, pp. 79-88 (1990).
Supplementary European Search Report and Opinion for EP11843896.9 dated Jan. 24, 2014, 9 pages.
Examination Report for EP11843896.9 dated Dec. 8. 2014, 4 pages.
Examination Report for EP11843896.9 dated Aug. 7. 2015, 4 pages.
Response to Examination Report for EP11843896.9 dated Apr. 9, 2015, 6 pages.
Amendment After Receipt of Search Report for EP11843896.9 dated Aug. 14, 2014, 7 pages.
Examination Report for EP11842584.2 dated Feb. 16, 2015, 6 pages.
Response to Examination Report for EP11842584.2 dated Jun. 12, 2015, 6 pages.
Supplementary European Search Report and Opinion for EP11842584.2 dated Feb. 3, 2014, 11 pages.
Amendment After Receipt of Search Report for EP11842584.2 dated Aug. 26, 2014, 7 pages.
Debnath et al., "A comprehensive review on the application of emulsions as an alternative fuel for diesel engines", Renewable and Sustainable Energy Reviews 42:196-211 (2015).
Ithnin et al., "An overview of utilizing water-in-diesel emulsion fuel in diesel engine and its potential research study", Journal of the Energy Institute, 87:273-233 (2014).
Kumar et al., "Effect of water and methanol fractions on the performance of a CI engine using animal fat emulsions as fuel", Proc. IMechE 219 Part A J. of Power and Energy:583-592 (2005).
Lif and Holmberg, "Water-in-diesel emulsions and related systems", Advances in Colloid and Interface Science, 123-126:231-239 (2006).

(56) References Cited

OTHER PUBLICATIONS

Nadeem et al., "Diesel engine performance and emission evaluation using emulsified fuels stabilized by conventional and gemini surfactants", Science Direct, Fuel 85:2111-2119 (2006).
Japan Patent Office, Office Action for JP Application No. 2017-237630 dated Aug. 6, 2018 in English.
KIPO, Office Action for KR Application No. 10-2013-7016500 dated Apr. 19, 2018 in English.
India Patent Office, Official communication for Indian Patent Application No. 201818025236 dated Nov. 26, 2019 with English translation.
Indian Patent Office, Official communication for Indian Patent Application No. 201818025241, dated Nov. 28, 2019.

* cited by examiner

FUEL AND PROCESS FOR POWERING A COMPRESSION IGNITION ENGINE

CROSS-REFERENCE TO RELATED APPLICATIONS

This application is a continuation of U.S. Utility application Ser. No. 13/989,467, filed on Sep. 6, 2013, which is a U.S. National Phase application under 35 U.S.C. § 371 of International Patent Application No. PCT/AU2011/001530, filed on Nov. 25, 2011, which claims priority from Australian Patent Application Nos. 2010905226 and 2010905225, both filed on Nov. 25, 2010. This application is also related to International Patent Application No. PCT/AU2011/001531, filed on Nov. 25, 2011 and entitled "Process for powering a compression ignition engine and fuel therefor". The specifications of the above-mentioned patent applications are herein incorporated by reference.

TECHNICAL FIELD OF THE INVENTION

The present invention relates to a fuel and process for powering a compression ignition type of internal combustion engine.

BACKGROUND OF THE INVENTION

The pursuit for fuel alternatives to conventional fossil fuels is primarily driven by the need for a 'clean' emissions fuel coupled with low production costs and wide availability. Much attention is paid to the environmental impact of fuel emissions. Research into alternative fuels focuses on fuels that will reduce the amount of particulate matter and oxides produced by fuel combustion as well as fuels that reduce the non-combusted fuel and $CO_2$ emissions and other products of combustion.

The drive for environmentally friendly fuel compositions for transport applications has focused on ethanol. Biomaterials such as organic plant matter can be converted into ethanol, and ethanol produced by such processes has been used as a partial replacement of fuels for spark ignition engines. Whilst this reduces the reliance on non-renewable resources for fuels, the environmental outcomes arising from the use of these fuels in engines has not been substantially improved in an overall sense, with cleaner combustion being offset by continuing use of such fuels in lower efficiency spark ignition engines, and negative environmental impact associated with the use of energy, arable land, fertilisers and irrigation water to create fuel.

Other fuel alternatives for complete or partial replacement of traditional fuels have not become widely used.

One major disadvantage with the complete replacement of traditional fuels, and in particular fuels for compression ignition engines (diesel fuels), with a renewable replacement fuel, relates to the perceived problems associated with the low cetane index of such fuels. Such fuels present problems for achieving ignition in the manner required for efficient operation of the engine.

The present applicants have also recognised that in some remote locations or environments, water is a scarce resource, and in such locations there can be a demand for power generation (such as through diesel engine electricity generation) coupled with water by-product capture for re-use in the local community. In addition moving bulk energy via liquid pipeline is a long standing and cost effective technique for moving large quantities of energy over long distances with minimum visual impact, compared to overhead transmission lines.

The present applicants have also recognised a need in some locations for heat generated in such industrial processes to be captured and re-used in the local community. In some instances this need is coupled to the need for water capture for reuse, referred to above.

In summary, there is a continuing need for alternative fuels for use in internal combustion engines. Fuels that can reduce emissions are of interest, particularly where the improved emissions profile is obtained without a major adverse impact on fuel efficiency and/or engine performance. There is also a need for methods of powering compression ignition engines that enable such engines to be run on diesel replacement fuels containing components not traditionally thought to be suitable for use in such applications. There is additionally a need for diesel engine fuels and engine operation methods that are suited to use in remote locations, or in environmentally sensitive environments (such as in high latitude marine environments particularly in port areas in terms of emissions) or other areas such as remote dry but cold inland areas that can make maximum use of all by-products of the engine operation, including, for example, the heat and water by-products. These objectives are preferably addressed with as little as possible penalty to fuel efficiency and engine performance.

SUMMARY OF THE INVENTION

In accordance with the present invention, there is provided a process of powering a compression ignition engine using a main fuel comprising methanol and water, including:
  fumigating an intake air stream with a fumigant comprising an ignition enhancer;
  introducing the fumigated intake air into a combustion chamber in the engine and compressing the intake air;
  introducing the main fuel into the combustion chamber; and
  igniting the main fuel/air mixture to thereby drive the engine.

According to the present invention there is also provided diesel engine fuel for use in a compression ignition engine which is fumigated with a fumigant comprising an ignition enhancer into an air inlet of the engine, the fuel comprising methanol, water, and one or more additives selected from the group consisting of: ignition improvers, fuel extenders, combustion enhancers, oxygen absorbing oil, lubricity additives, product colouration additives, flame colour additives, anti corrosion additives, biocides, freeze point depressants, deposit reductants, denaturants, pH controlling agents, and mixtures thereof.

The invention can result in simplification and a lower cost of fuel manufacture and reduced environmental impact by elimination of the need for production of high purity components and by-product components, by acceptance of a blend of such components into a fuel according to the methods described herein. Cost and environmental benefit may also arise from the use of fuel in cold climates, since the freezing point of the fuel can readily meet any low temperature environments likely to be encountered.

The exhaust resulting from fuel combustion may contain low impurities, making it ideal for subsequent processing. As one example, the $CO_2$ may be converted back to methanol to directly reduce the greenhouse gas $CO_2$ or high purity $CO_2$ can be used for organic growth such as algae for multiple end uses including methanol manufacture, utilizing energy sources which can include renewable sources, including solar.

In some embodiments, water generated during fuel combustion can be recovered, which is a major advantage for remote areas where water is scarce. In other instances, heat generated in operation of the diesel engine can be utilised for local area heating requirements. Some embodiments accordingly provide systems for power generation through the operation of a diesel engine which utilise the water and/or heat output of the engine in a suitable way.

According to one aspect, there is provided a method for supplying fuel to a compression ignition engine, the method comprising:

supplying a main fuel composition comprising methanol and water to a first tank that is in fluid connection to a combustion chamber of the compression ignition engine, and supplying a secondary fuel component comprising an ignition enhancer to a second tank that is in fluid connection to an air intake of the compression ignition engine.

In accordance with another aspect, there is provided a power generation system comprising:

powering a compression ignition engine using a methanol-water fuel to generate power;

preheating an inlet air stream of the compression ignition engine, and/or fumigating the inlet air stream with an ignition enhancer;

treating engine exhaust to recover exhaust heat and/or water from the engine, and redirecting the heat and/or water for further use.

In accordance with a further aspect, there is provided a method of transporting a two-part pre-fuel composition comprising methanol and ether, including transporting the pre-fuel from a first location to a second location remote from the first location, and separating the ether from the methanol to yield a first fuel part comprising methanol, and a second fuel part comprising ether.

In accordance with a further aspect, there is also provided a pre-fuel composition comprising methanol and up to 10% by weight of an ether.

BRIEF DESCRIPTION OF THE DRAWINGS

Embodiments of the present invention will now be described by way of example with reference to the accompanying drawings, wherein.

DETAILED DESCRIPTION

Figure 1:
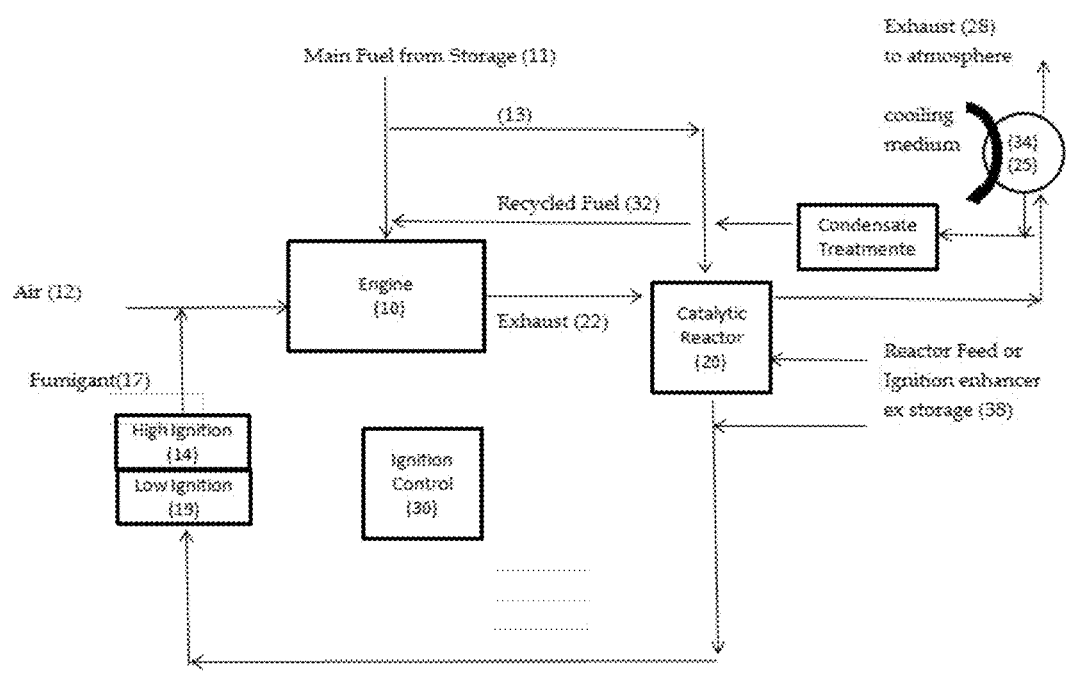
FIG. 1 is a flow chart illustrating a process for powering a compression ignition engine in accordance with an embodiment of the present invention.

The fuel and process described herein is suitable for powering compression ignition (CI) engines. In particular the fuel and process is most suitable, but not limited to, CI engines operating at low speeds such as 1000 rpm or less. The speed of the engine may even be 800 rpm or less, for instance 500 rpm or less. The speed of the engine may even be 300 rpm or less, for instance 150 rpm or less. The fuel is therefore suitable for larger diesel engines such as those operating on ships and trains, and in electrical power generating plants. The slower speeds in larger CI engines allows sufficient time for combustion of the selected fuel composition to be completed and for a sufficiently high percentage of the fuel to be vaporized to achieve efficient operation.

It is however understood that the fuel and process described herein could operate with smaller CI engines operating at higher speeds. In fact, the preliminary test work was conducted on a small CI engine operating at 2000 rpm and 1000 rpm, demonstrating that the fuel is also capable of powering such higher speed engines. In some instances, adjustments may assist the use of the fuel and process on smaller (higher rpm) CI engines, and some of these are elaborated below.

Fuel Composition

The fuel composition that forms the main fuel for the process comprises methanol and water. The fuel is a compression ignition engine fuel, that is, a diesel engine fuel.

To date, methanol has not found commercial application in compression ignition engines. The disadvantages with using methanol as an engine fuel, either neat or blended, is highlighted by its low cetane index, which is in the range of 3 to 5. This low cetane index makes methanol difficult to ignite in a CI engine. Blending water with methanol further reduces the cetane index of the fuel making combustion of the methanol/water blend fuel even more difficult, and thus it would have been considered counter-intuitive to combine water with methanol for use in CI engines. The effect of water following fuel injection is one of cooling as the water heats up and evaporates, further lowering the effective cetane.

However, it has been found that a methanol-water fuel combination can be used in a compression ignition engine in an efficient manner and with cleaner exhaust emissions, provided that the engine is fumigated with a fumigant comprising an ignition enhancer. Further factors elaborated below also contribute to maximising the effective operation of a CI engine with this fuel.

Methanol has been described for use in fuels compositions previously, but as a heating or cooking fuel, where the fuel is burned to generate heat. The principles that apply to diesel engine fuels are very different, since the fuel must ignite under compression in the compression ignition engine. Very little, if anything, can be gleaned from references to the use of methanol and other components in cooking/heating fuels.

The main fuel may be a homogeneous fuel, or a single phase fuel. The fuel is typically not an emulsion fuel comprising separate organic and aqueous phases emulsified together. The fuel may therefore be emulsifier free. The accommodation of additive components in the fuel is assisted by the dual solvency properties of both methanol and water, which will enable dissolution of a wider range of materials across the various water:methanol ratios and concentrations which can be utilised.

All amounts referred to in this document are by reference to weight, unless specified otherwise. Where a percentage amount of a component in the main fuel composition is described, this is a reference to the percentage of that component by weight of the entire main fuel composition.

In broad terms, the relative amount of water to methanol in the main fuel composition may be in the range of from 0.2:99.8 to 80:20 by weight. According to some embodiments, the minimum water level (relative to methanol) is 1:99, such as a minimum ratio of 2:98, 3:97, 5:95, 7:93, 10:90, 15:95, 19:81; 21:79. The upper limit of water (relative to methanol) in the composition according to some embodiments is 80:20, such as 75:25, 70:30, 60:40, 50:50 or 40:60. The relative amount of water in the composition may be considered to be in the "low to medium water" level range, or a "medium to high water" level range. The "low to medium water" level range covers the range from any of the minimum levels indicated above to a maximum of either 18:82, 20:80, 25:75, 30:70, 40:60, 50:50 or 60:40. The "medium to high water" level range covers the range from either 20:80, 21:79, 25:75, 30:70, 40:60, 50:50, 56:44 or 60:40 to a maximum of one of the upper limits indicated above. A typical low/medium water level range is 2:98 to 50:50, and a typical medium/high water level range is from 50:50 to 80:20. A typical low water level range is from 5:95 to 35:65. A typical medium level water range is 35:65 to 55:45. A typical high water level range is 55:45 to 80:20.

Considered in terms of the percentage of water in the entire main fuel composition by weight, the relative amount of water in the main fuel composition may be a minimum of 0.2%, or 0.5%, or 1%, or 3% or 5%, 10%, 12,%, 15%, 20% or 22% by weight. The maximum amount of water in the entire main fuel composition may be 68%, 60%, 55%, 50%, 40%, 35%, 32%, 30%, 25%, 23%, 20%, 15% or 10% by weight. Any of the minimum levels may be combined with a maximum level without limitation, save for the requirement that the minimum level be below the maximum water level.

Based on the test results reported in the Examples, for a desirable brake thermal efficiency (BTE), the amount of water in the fuel composition in some embodiments is between 0.2% and 32% by weight. The optimal zone for a peak in brake thermal efficiency for a methanol-water compression ignition engine fuel is between 12% and 23% water in the main fuel composition, by weight. The range may be incrementally narrowed from the broader to the narrower of these two ranges. In some embodiments, this is combined with an amount of ignition enhancer in the main fuel composition that is not more than 15% by weight of the main fuel composition. Details of ignition enhancers are set out below.

Based on other test results reported in the Examples, for a maximum reduction in NOx emissions, the amount of water in the fuel composition in some embodiments is between 22% and 68% by weight. The optimal zone for a maximum reduction in NOx emissions is between 30% and 60% water by weight of the main fuel composition. The range may be incrementally narrowed from the broader to the narrower of these two ranges. Since NO is the main NOx emission component, reference may be made to NO emissions as being the greater proportion of, or indicative of the overall extent of NOx emissions.

In some embodiments, for a desirable balance of fuel properties and emissions, the main fuel composition comprises between 5% and 40% water by weight of the main fuel composition, such as between 5% and 25% water, between 5% and 22% water. These levels are based on the combination of test results reported in the Examples.

For the operation of the compression ignition engine with the methanol/water main fuel composition and fumigation, but without other ignition enhancement techniques such as air inlet preheating or blowing, the water content in the fuel may be at the low to medium level, preferably at the low water level. Where the water level is at the higher end, the process generally benefits from inlet air and/or main fuel preheating, to overcome the increased cooling effect of the increased water level in the main fuel composition. Preheating can be achieved by a variety of techniques, discussed in more detail further below.

The amount of methanol in the total main fuel composition is preferably at least 20% by weight of the main fuel composition. According to some embodiments, the amount of methanol in the fuel composition is at least 30%, at least 40%, at least 50%, at least 60% or at least 70% of the fuel composition. The amount of water in the total main fuel composition may be at least 0.2%, at least 0.5%, at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 25%, at least 30%, at least 35%, at least 40%, at least 45%, at least 50%, at least 55%, at least 60%, at least 65% or at least 70%. As the weight of water in the main fuel composition increases it is increasingly more surprising that fumigation of the inlet air with a fumigant overcomes the penalty of water in the fuel in terms of igniting, with smooth operation in terms of COV of IMEP and producing net power out.

The combined amount of methanol and water in the total main fuel composition may be at least 75%, such as at least 80%, at least 85%, or at least 90% by weight of the fuel composition. The main fuel composition may comprise one or more additives, in a combined amount of up to 25%, or up to 20% or up to 15% or up to 10% by weight of the main fuel composition. In some embodiments, the total or combined level of additives is not more than 5% of the main fuel composition.

The methanol for use in the production of the main fuel composition may come from any source. As one example, the methanol may be a manufactured or waste methanol, or a coarse or semi-refined methanol, or an unrefined methanol. The coarse or waste or semi-refined methanol could typically contain mainly methanol, with the balance being water and amounts of higher alcohols, aldehydes, ketones or other carbon hydrogen and oxygen molecules arising during the normal course of methanol manufacture. Waste methanol may or may not be suitable depending on the degrees and types of contamination. The references in the above sections to ratios of methanol and water, or amounts of methanol in the fuel composition by weight, refer to the amount of methanol itself in the methanol source. Thus, where the methanol source is a crude methanol containing 90% methanol and other components, and the amount of this crude methanol in the fuel composition is 50%, then the actual amount of methanol is considered to be 45% methanol. The water component in the methanol source is taken into account when determining the amount of water in the fuel composition, and the other impurities are treated as additives when assessing the relative amounts of the components in the products, unless otherwise specified. The higher alcohols, aldehydes and ketones which may be present in the crude methanol may function as soluble fuel extender additives.

According to some embodiments, the main fuel comprises a crude methanol. The term "crude methanol" encompasses low purity methanol sources, such as methanol sources containing methanol, water and may be up to 35% non-water impurities. The methanol content of crude methanol may be 95% or less. The crude methanol may be used directly in the fuel without further refining. Typical non-water impurities include higher alcohols, aldehydes, ketones. The term "crude methanol" includes waste methanol, coarse methanol and semi-refined methanol. It is a particular advantage of this embodiment that crude methanol containing impurities at higher levels can be used directly in the fuel for a CI engine without expensive refining. In this case, the additive (ie crude methanol impurities and other fuel composition additives excluding water) levels may be up to 60% of the main fuel composition (including impurities in the crude methanol). For main fuel compositions using a higher purity methanol (such as 98% or higher % pure methanol) as the source, the total additive level may be lower, such as not more than 25%, not more than 20%, not more than 15% or not more than 10%.

Any water of a suitable quality can be used as the source of water for the production of the main fuel composition. The source of water may be water included as part of un-distilled coarse methanol, or recycled water, or a crude or contaminated water (for example, sea water containing salts) purified by reverse osmosis, purified by activated substances such as activated carbon, or further chemical treatment, deionisation, distillation or evaporative techniques. The water may come from a combination of these sources. As one example, the source of water may be water recovered from the water-rich exhaust of the combustion ignition engine. This water may be recovered via heat exchangers and spray chambers or other similar operations. This recovery and reuse technique enables cleanup of exhaust emissions. The water in this case is recycled back to the engine with or without any captured unburnt fuel, hydrocarbons or particulates or other combustion products being returned to the engine and recycled to extinction via looping combustion steps, or treated by known means of purification. The water may in some embodiments be salt water, such as sea water, which has been purified to remove the salt therefrom. This embodiment is suited to marine applications, such as in marine CI engines, or for the operation of CI engines in remote island locations.

The water quality will impact corrosion through the supply chain up to the point of injection into the engine and engine deposition characteristics, and suitable treatment of main fuel with anti-corrosion additives or other methods may in these circumstances be required.

The amount of additives included in the base fuel may take account of any downstream dilution effects caused by addition of water (for example) to the fuel.

Additives which may be present in the main fuel composition may be selected from one or more of the following categories, but not exclusively so:

1. Ignition improver additives. These may also be referred to as ignition enhancers. An ignition improver is a component that promotes the onset of combustion. Molecules of this type are inherently unstable, and this instability leads to "self start" reaction leading to combustion of the main fuel component (for example, methanol). The ignition improver may be selected from materials known in the art to have ignition enhancing properties, such as, ethers (including C1-C6 ethers such as dimethyl ether), alkyl nitrates, alkyl peroxides, volatile hydrocarbons, oxygenated hydrocarbons, and mixtures thereof.

In addition to the typical ignition enhancers, finely dispersed carbohydrate particles present in the combustion zone following evaporation of the liquid fuel components prior to ignition may or may not have a role as ignition enhancer, however such species present may contribute to more complete and rapid combustion of the total air/fuel mixture.

While additional ignition improvers can be incorporated into the main fuel, the techniques described herein facilitate ignition throughout the engine operating range without such additions. Thus according to some embodiments the main fuel is free of ignition improver additives. In other embodiments, the main fuel is free of DME (although it may contain other ignition improvers). In the case of dimethyl ether as an ignition improver, according to some embodiments, less than 20%, less than 15%, less than 10%, less than 5%, less than 3%, less than 1%, or no dimethyl ether is present in the fuel composition. In some embodiments, the amount of ether (of any type, such as dimethyl or diethyl ether) in the main fuel composition is less than 20%, less than 15%, less than 10%, less than 5%.

In some embodiments, at least 80% of the ignition enhancer present in the main fuel composition is provided by one or at most two specific chemicals, examples being dimethyl ether and diethyl ether. In one embodiment, an ignition enhancer of a single chemical identity is present in the main fuel composition. In one embodiment, at least 80% of the ignition enhancer in the main fuel composition is constituted by an ignition enhancer of a single chemical identity. In each case, the single ignition enhancer that constitutes the ignition enhancer, or the >80% ignition enhancer component may be dimethyl ether. In other embodiments, the ignition enhancer comprises a mixture of three or more ignition enhancers.

The amount of ignition enhancer in the main fuel composition in some embodiments is not more than 20%, such as not more than 10% or not more than 5% of the fuel composition.

2. Fuel Extender. A fuel extender is a material that provides heat energy to drive the engine. Materials used as fuel extenders may have this purpose as the main purpose for its inclusion in the fuel composition, or an additive material may provide this function and another function. Examples of such Fuel Extenders are:

a) Carbohydrates. Carbohydrates include sugars and starch. The carbohydrate may be included for fuel extender purposes, although it may also function as an ignition improver, and/or a combustion improver. The carbohydrate is preferably water/methanol soluble, with higher water levels accommodating greater dissolution of sugar, for example, in the main fuel. An enriched water (single phase) main fuel composition enables dissolution of the carbohydrate, such as sugar, however as the liquid solvent (water/methanol) in the fuel composition evaporates in the engine, the carbohydrate solute can form micro-fine high surface area suspended particles of low LEL (lower explosive limit) composition which will decompose/react under engine conditions, improving the ignitability of the main fuel mixture. To achieve improvement in combustibility of the mixture, an amount of at least 1%, preferably at least 1.5% and more preferably at least 5% of this carbohydrate additive is preferred.

b) Soluble Fuel Extender additives. Fuel extender additives are combustible materials. These additives may be added as separate components or may be part of an undistilled methanol used to produce the main fuel composition. Such additives include C2-C8 alcohols, ethers, ketones, aldehydes, fatty acid esters and mixtures thereof. Fatty acid esters such as fatty acid methyl esters may have a biofuel origin. These may be sourced through any biofuel sources or processes. Typical processes for their production involve transesterification of plant-derived oils, such as rapeseed, palm or soybean oil, amongst others.

There may be opportunity to economically increase the level of fuel extender in the main fuel composition itself for particular markets where such additive can be produced or grown and consumed locally, reducing the need for importation of base fuel and/or additives. Under such conditions an amount, or treat rate, of up to 30%, or up to 40%, or up to 50% of the main fuel composition is preferred, though concentrations of up to 60% total additives including such fuel extender additives can be considered particularly where the methanol source is crude methanol.

3. Combustion enhancers. These may also be referred to as combustion improvers. An example of a combustion enhancer is a nitrated ammonium compound, for example ammonium nitrate. At 200° C. ammonium nitrate breaks down to nitrous oxide according to the following reaction:

$NH_4NO_3 = N_2O + 2H_2O$

The nitrous oxide formed reacts with fuel in the presence of water in a similar way to oxygen, e.g.

$CH_3OH + H_2O = 3H_2 + CO_2$ $H_2 + N_2O = H_2O + N_2$ $CH_3OH + 3N_2O = 3N_2 + CO_2 + 2H_2O$

Other nitrated ammonium compounds that can be used include ethylammonium nitrate and triethylammonium nitrate as examples, though these nitrates may also be regarded as ignition enhancers (cetane) rather than combustion enhancers as their main function in the fuel is ignition enhancement.

Other combustion improvers can include metallic or ionic species, the latter forming by dissociation under pre or post combustion environments.

4. Oxygen absorbing oil. The oxygen absorbing oil is preferably one that is soluble in water methanol mixtures. Oxygen absorbing oils have low auto-ignition point and also have the ability to directly absorb oxygen prior to combustion, in amounts of, for example, 30% by weight of the oil. This rapid condensation of oxygen from a hot gaseous phase into the oil/solid phase after evaporation of the surrounding water will more rapidly heat the oil particle causing ignition of the surrounding evaporated and superheated methanol. An oil ideally suited to this role is linseed oil, in a concentration of about 1-5% in the main fuel mixture. If this additive is utilised in the main fuel composition, the fuel mixture should be stored under an inert gas blanket to minimise decomposition of the oil by oxygen. Linseed oil is a fatty acid-containing oil. Other fatty acid-containing oils can be used instead of or in addition to linseed oil. Preferred oils are those that dissolve in the methanol phase or are miscible in methanol, to produce a homogeneous, single phase composition. However, in some embodiments oils that are not water/methanol miscible may be used, particularly if an emulsification additive is also present in the fuel composition.

5. Lubricity additives. Examples of lubricity additives include diethanolamine derivatives, fluorosurfactants, and fatty acid esters, such as biofuels which are soluble to some extent in water/methanol mixtures, on which the main fuel composition is based.

6. Product colouration additives. Coloration additives assist to ensure that the fuel composition could not be mistaken for a liquid beverage such as water. Any water soluble colourant may be used, such as a yellow, red, blue colourant or a combination of these colourants. The colourant may be a standard accepted industry liquid colourants.

7. Flame colour additives. Non-limiting examples include carbonates or acetates of sodium, lithium, calcium or strontium. The flame colour additives may be selected to achieve the preferred product colour and stability in the final product pH. Engine deposition considerations, if any, may be taken into account in selecting the additive to be used.

8. Anti Corrosion additives. Non-limiting examples of anti-corrosion additives include amines and ammonium derivatives.

9. Biocides. While biocides could be added, these are generally not required because the high alcohol (methanol) content in the main fuel prevents biological growth or biological contamination. Thus according to some embodiments the main fuel is free of biocide.

10. Freeze Point depressant. While freeze point depressants can be incorporated into the main fuel, the methanol (and optional additives such as sugar, added for other purposes) depresses the freezing point of water. Thus according to some embodiments the main fuel is free of an additional dedicated freeze point depressant.

11. Deposit reductant. Non-limiting examples include polyether and triethanolamine.

12. Denaturant if required.

13. pH controlling agent. An agent that raises or lowers the pH to a suitable pH can be used, which is compatible with the fuel.

The additives, and particularly those identified under items 1 and 2 above may be added to the main fuel either as standard industry traded product (i.e. in a refined form) or as semi processed aqueous solution (i.e. in a non-refined form, semi-refined form, or a crude form). The latter option potentially reduces the cost of the additive. A condition of the use of such crude additive sources is that the impurities in the crude forms of such additives, such as crude sugar solution, or sugar syrup, as one example, do not adversely affect the fuel injectors or engine performance.

According to some embodiments, the main fuel comprises at least one additive. According to some embodiments, the main fuel comprises at least two different additives.

Ethers are noted above as being examples of ignition improvers and soluble fuel extender additives. Irrespective of the intended function, in some embodiments, the ether may be present in total at a level of less than 20%, less than 15%, less than 10%, less than 5%, less than 3%, or less than 1% of the fuel composition. The amount may be greater than 0.2%, 0.5%, 1%, 2%, 3%, 4%, 5%, 6%, 7%, 8%, 9%, 10%, 12%. The lower and upper limits can be combined without limitation, provided the lower limit is below the upper limit selected.

In some embodiments, the main fuel composition comprises an ether in an amount of between 0.2% and 10% by weight of the main fuel composition. The ether is preferably a single ether or a combination of two ethers.

Through utilization of an ether as either an ignition improver and/or soluble fuel extender, in a methanol-based fuel, a complete process for the production, transport and utilization of a fuel composition has been developed. The methanol-based fuel may be a water-free fuel or a methanol-water fuel in this instance. This is described in further detail below.

Ignition Enhancer as Fumigant

The fumigant used in the method of embodiments of the invention relying on fumigation comprises an ignition enhancer. The fumigant may further comprise other components, such as one or more of methanol, water and any of the additives outlined above in the context of the main fuel.

As described above, an ignition enhancer is a material that enhances ignition of a combustible material. One of the challenges to the use of methanol as the core fuel component in the main fuel composition for a compression ignition engine is the fact that methanol does not ignite as readily as other fuels. An ignition enhancer is a material that has good ignition properties and can be used to create ignition, following which the methanol in the main fuel composition (and other combustible materials) will combust. The ignition characteristics of a potential fuel component are described by the cetane number (or alternatively cetane index) of that component. The cetane number is a measure of a materials ignition delay, being the time period between the start of injection and start of combustion, i.e. ignition, of the fuel. Suitable ignition enhancers may have a cetane of above 40 (such as DME which has a cetane of 55-57). The cetane number(s) of the ignition enhancer(s) present in the fumigant should be taken into account when determining the relative amounts of ignition enhancers to other components in the fumigant, and also the amount of fumigant compared to the main fuel composition, load and engine speed. The overall cetane of the fumigant will be based on a combination of the proportional contribution of, and the cetane property of each component, the relationship not necessarily being linear.

Some non limiting examples of ignition enhancers which can be included in the fumigant include:
  ethers, such as the lower alkyl (being the C1-C6 ethers), notably dimethyl ether and diethyl ether,
  alkyl nitrates,
  alkyl peroxides,
  and mixtures thereof.

Dimethyl ether is a preferred high ignition characteristic ignition enhancer suitable for use in the fumigant. Diethyl ether is another example of a suitable ignition enhancer.

Methanol in the main fuel can be catalytically converted into dimethyl ether. The dimethyl ether may therefore be catalytically generated from a stream of the main fuel composition, which is then fumigated into the engine separately to the main fuel composition (with the inlet air). In the alternative, a fumigant composition comprising dimethyl ether may be provided by the fuel supplier to the engine owner as a ready-made fumigant composition. In another embodiment, a pre-fuel composition comprising methanol and up to 15% by weight of an ether ignition enhancer (such as dimethyl ether), can be produced at one location and transported (for example, through a pipeline) to another location for use in fueling a compression ignition engine. In some embodiments, the pre-fuel may further comprise water. At the end of the pipeline, part or all of the ether ignition enhancer component in the pre-fuel can be separated from the other components of the pre-fuel composition (notably the methanol, but also other components having a higher boiling point than the ether). The separated ether component can then be fumigated into the compression ignition engine as a fumigant, separately to the remaining part of the pre-fuel composition, which is used as the main fuel composition, either direct (particularly if it contains water), or with further adjustment in composition (for example, to the water content) before use. The amount of ether ignition enhancer in the pre-fuel may be up to 10% by weight, or up to 9% by weight. The upper limit will depend on the choice of ether and the temperature conditions. Further details are set out in the section below detailing CI engine power generation systems.

The ignition enhancer, such as dimethyl ether, suitably comprises a minimum of 5% of the fumigant or a minimum of 10% of the fumigant, such as a minimum 15%, 20%, 30%, 40%, 50%, 60%, 65%, 70%, 75%, 80%, 82%, 84%, 86%, 88% or 90% of the fumigant. There is generally a preference for the ignition enhancer content of the fumigant to be at the upper end of the range, so in some embodiments the ignition enhancer content is above 70% or more. The ignition enhancer may comprise up to 100% of the fumigant, for example, in the case of introducing a pure component from storage or from recovered separated ignition enhancer sourced from a pre-fuel composition. When converted from the main fuel through catalytic reaction of the main fuel (which comprises components in addition to the methanol, from which the DME is formed) or if impure high ignition characteristic component is produced or drawn from storage, the upper limit for such component will be reduced accordingly.

The relative amounts of each component in the fumigant may be kept constant, or may be varied over the time period of operation of the engine. Factors that impact on the relative amounts of components in the fumigant include engine speed (rpm), level and variability of load, engine configuration, and the specific properties of the individual components of the fumigant. In other embodiments, the fumigant composition may be kept relatively constant, and instead the relative amount of fumigant (grams per second fumigated into the engine) compared to the main fuel composition injected into the engine (grams per second) is adjusted during the different stages of operation of the engine.

When it is desired to operate the CI engine with different fumigant compositions for different engine operation conditions (speed, load, configuration), the fumigant composition can be varied to suit by computer control of the fumigant composition, or by any other form of control. The adjustments may be sliding adjustments based on an algorithm that calculates the desired fumigant composition to match the prevailing engine operation conditions, or may be step-wise adjustments. For example, a higher overall cetane index fumigant (such as 100% DME) could be fumigated into the engine at a high weight % with respect to the fuel for operation in some conditions, and then the fumigant could be switched to a second composition containing a lower % of DME and some lower cetane index components. In another embodiment the composition may be stable and the air/fumigant ratio varied.

The target % of non-water components other than the ignition enhancer or enhancers in the fumigant is suitably not more than 40%, such as between 5-40% or 10-40% or 20-40% 30-40%. Adjustments may be made to these percentages based on the cetane number of other ignition enhancers and combustible components, and specific engine configuration. Additionally in some embodiments water may be present in the fumigant either as product of a conversion reaction (e.g., methanol to DME) or as a carry through from a water containing reactor feed, or added in a separate stream.

Examples of components that may be present in the fumigant in addition to the ignition enhancer include methanol, water, the additives outlined above, and alkane gases (typically straight-chained alkanes, including lower alkanes such as the C1-C6 alkanes, notably methane, ethane, propane or butane, and longer chain alkanes (C6 and above).

In some embodiments, the fumigant comprises at least 60% of a single component, one example being dimethyl ether. The amount of the single main component of the fumigant may be above 62%, 65%, 68%, 70%, 72%, 75%, 78% or 80%.

The fumigant, or secondary fuel, may be obtained in a pure form directly from storage, or may be supplied as a fumigant to the engine in a pure form after processing the main fuel (though catalytic conversion of methanol to DME, followed by purification to yield a fumigant consisting of DME). Alternatively, the fumigant may comprise an ignition enhancer and other components (i.e. the fumigant is not in pure form) after processing the main fuel or from storage. In this case the impurities are still compatible with the desired outcome of fumigation i.e. the fumigant may also include water and methanol, or may contain other materials (such as C1-C8 alcohols) which are compatible with the application.

The main fuel composition and the fumigant may be supplied as a two-part fuel, or may be delivered as a "kit" of two fuel parts. In this context, the fumigant may be described as a "secondary fuel component" of the two-part fuel, and thus the description of the fumigant above also applies to the second fuel component. The main fuel composition and the secondary fuel component may be pumped into separate storage tanks associated with the compression ignition engine.

Thus, according to one embodiment, there is provided a two-part fuel for use in operating a compression ignition engine, the fuel composition comprising:
 a main fuel composition comprising methanol and water and
 a secondary fuel component comprising an ignition enhancer.

In the use of this two-part fuel, the main fuel is introduced into the combustion chamber of the compression ignition engine, and the secondary fuel is fumigated into the air intake of the compression ignition engine.

According to another embodiment, there is provided a method for supplying fuel to a compression ignition engine, the method comprising:
 supplying a main fuel composition comprising methanol and water to a first tank that is in fluid connection to a combustion chamber of the compression ignition engine, and
 supplying a secondary fuel component comprising an ignition enhancer to a second tank that is in fluid connection to an air intake of the compression ignition engine.

As described above, the secondary fuel may be prepared fully or partially in situ through catalytic conversion of a portion of the main fuel into the ignition enhancer. This is particularly suited to situations where dimethyl ether is the ignition enhancer.

The present invention also provides for the use of a two-part fuel in the operation of a combustion ignition engine, wherein the two-part fuel comprises:
 a main fuel composition comprising methanol and water, and
 a secondary fuel component comprising an ignition enhancer.

The present invention further provides a pre-fuel composition comprising methanol and up to 10% by weight of an ether. The ether may be dimethyl ether. In some embodiments, the pre-fuel may further comprise water. As noted above, the ether component can be separated from the remainder of the pre-fuel composition for use as the secondary fuel component, and the balance of the pre-fuel composition can be used as the main fuel composition. This balance may be used direct as the entire main fuel composition (particularly if it contains water), or the composition can be adjusted to yield the main fuel composition, for example, through addition of water. In this embodiment, therefore, the pre-fuel might not contain water, and water can be added to generate the main fuel composition after removal of the ether. In some embodiments, water may not be required for use in the main fuel composition, when the fuel is used in one of the power generation systems described further below.

The present invention also provides a method of transporting a two-part fuel composition comprising methanol on the first part, and an ether on the second part, from one location to another location, comprising transporting a pre-fuel composition comprising methanol and ether from one location to a second location, and separating the ether from the methanol to yield a first fuel part comprising methanol, and a second fuel part comprising ether. The transporting may be by way of piping through a pipeline. The first location may be a methanol production plant location, and the other location (the second location) is a location remote from the first location. The remote location would typically be at least 1 kilometer away, and perhaps many kilometers away. The remote location may be the location of a compression ignition engine for electricity generation, or a shipping port, or a train siding or any other suitable location where the two-part fuel is required.

Engine Operation Details

FIG. 1 illustrates a flow chart outlining the process of using a main fuel 11 of methanol/water mix in a CI engine 10. The process includes fumigating an intake air stream 12 with an ignition enhancer 14 and then introducing the fumigated air, through an ignition control 30, into the combustion chamber of the engine 10 before introducing the main fuel 11 into the combustion chamber and igniting the main fuel/fumigated air mixture by compression ignition in order to drive the engine.

The intake air 12 is fumigated with a fumigant 17 comprising the ignition enhancer 14. The fumigated intake air 12 is then injected into the combustion chamber before or during the initial stage of the compression stroke of the engine so as to compress the air before the main fuel is injected into the combustion chamber. Compression of the air raises the temperature in the combustion chamber to provide favorable ignition conditions for the main fuel when it is sprayed into the chamber during the last stage of compression.

Fumigating the intake air 12 with an ignition enhancer 14 encourages a further increase in temperature of the compressing air making it even more combustible at the point of fuel injection due to pre-combustion of fumigating material, and the presence of breakdown species which aids the onset of combustion of methanol.

Fumigation as described above allows pre-combustion to occur in the combustion chamber prior to fuel injection. This two-step ignition process, or 'kindled' operation, relies on the compression stroke of the engine piston to raise the temperature of the fumigated air to the point of ignition. In turn, this enhances the ignition conditions in the combustion chamber to provide a sufficiently hot environment for the methanol and water fuel, when injected towards the end of the compression stroke, to undergo accelerated ignition under increased temperature conditions, rapidly vaporizing the methanol and evaporating the water in the fuel and producing high thermal efficiency.

The temperature contribution by fumigant for stable engine operation at low water levels is 50 to 100° C. At the point of main fuel injection for low water level fuels this contribution results in a combustion chamber temperature comparable to the temperature in known combustion ignition engines. As water levels increase in the fuel the amount of fumigant may be adjusted to offset the cooling effect of the water. The resultant brake thermal efficiencies are comparable to those of diesel fuels, with net efficiency outcomes being dependent on various factors such as the size of the engine and its configuration.

Efficient and complete combustion of the methanol and water fuel in this manner minimizes un-burnt or modified hydrocarbons and particulates in the exhaust emissions resulting in cleaner emissions. This is particularly evident in larger CI engines with slower speeds where the efficiency of the combustion process is maximized because sufficient time is allowed for the commencement and completion of the two steps in a kindled operation.

The term "fumigation" in relation to the intake air refers to the introduction of a material or mixture, in this case a fumigant comprising an ignition enhancer, into the intake air stream to form a vapor or gas through which the ignition enhancer is well distributed. In some embodiments the material is introduced in a small amount, generally through spraying a fine spray of the material into the intake air stream or injected as a gas.

The kindled operation has the effect of pre-heating the intake air during the compression stroke. The nature of a water methanol mixture is that less sensible heat is generated in the reaction products after combustion, heat being required to evaporate the water present. This means that compared to a diesel engine operating on hydrocarbon fuels more severe engine conditions can be accommodated at the point of injection while keeping within the engine's design limitations. These more severe conditions arise through fumigant combustion or increased air temperature (through directly heating the air) and/or increased pressure and temperature through the use of modified engine configurations, such as turbocharging or supercharging.

The amount of ignition enhancer(s) may be controlled relative to the mix of methanol to water contained in the main fuel in order to produce conditions within the combustion chamber where ignition of the main fuel is achieved in a timely manner, and thereby deliver the best possible thermal efficiency from the engine. Where the ratio of ignition enhancer to fuel mix is not controlled combustion could initiate significantly before TDC, such as 25-30° before TDC, and as such the use of an ignition enhancer could have a neutral effect and make a minimal or no contribution to the thermal efficiency of the engine. In a preferred operation of the engine ignition of the fumigant/air mixture is timed to delay the combustion of this fuel as late as possible (to avoid unnecessarily working against the power stroke of the engine) and to be consistent with good combustion of the main fuel after injection. This means that the secondary fuel should ignite before the main fuel injection commences, but not so much before that the energy contained in the secondary fuel makes a minimal or nil contribution to the thermal efficiency of the engine.

Ignition of the main fuel can be controlled, at the ignition control 30 illustrated in FIG. 1, to be as close as possible to the ideal timing by using one or a combination of the following ratio ignition controls:

1. Controlling the amount of fumigant introduced into the air intake relative to the main fuel.
2. Controlling the percentages of ignition enhancer(s) to other components in the fumigant (recognizing that water and other components such as methanol may also be present).
3. Controlling 1 and 2 above, depending on engine operating at high loads (50% to 100%) or low loads (below 50%) across the rpm operating range of the engine.

Although the relative amounts of fumigant to main fuel introduced into the engine (either through the air intake, or into the combustion chamber, respectively), will vary depending on the engine operation conditions that apply, it is generally desired for the amount of ignition enhancer in the fumigant during steady state operation at mid or high load to be a relatively low percentage by weight of the main fuel composition. For a fumigant comprising 100% ignition enhancer (such as DME), the relative amounts of fumigant to main fuel by weight is desirably up to 20% by weight, up to 18%, up to 15%, up to 13%, up to 10%, up to 8%, up to 7%, up to 6%, up to 5%. The fumigant level is preferably at least 0.2%, at least 0.5%, at least 1% or at least 2% by weight of the main fuel composition. These figures are based on weight, assuming the fumigant comprises 100% ignition enhancer, and can be adjusted proportionally for a reduced ignition enhancer content in the fumigant by weight. These may be measured by reference to the amount introduced into the engine in grams per second, or any other suitable corresponding measure for the engine size. An upper limit of around 10% or less (such as 8% or 7%) is additionally advantageous, as a pre-fuel composition containing up to the required amount of ether as ignition enhancer (such as 10%, 8% or 7% ignition enhancer, respectively) can be delivered to the compression ignition engine location, and the ignition enhancer flashed off and recovered in a quantity corresponding to the needs of the engine operating with fumigation at the same target level. In other embodiments, there can be top-up of the fumigant level to a higher level at the engine location (for example, through top-up from separate storage of ignition enhancer, such as ether).

Ignition control 30 controls the above ratios to control the nature of the intake air entering the engine 10. Specifically, and with reference to FIG. 1, ignition control 30 controls the amount and relative proportions of air 12, fumigant 17 including concentration of ignition enhancer 14 in the fumigant 17, and other components 19 in the fumigant 17.

In relation to paragraph 2 above, the target % of non-water components other than the ignition enhancer in the total fumigant/air flow may be not more than 40%, such as between 5-40% or 10-40% 20-40% or 30-40%, with the balance being ignition enhancer, for example, DME (which has a cetane of 55-57). Adjustments may be made to these percentages based on the cetane number of other ignition enhancers and specific engine configuration. All percentages are by weight. Water may be present in any amount consistent with smooth operation of the engine, such water may arise from the fumigant, for example if made catalytically from the fuel, or as part of the ambient air inlet flow to the engine, or may be added by other means.

FIG. 1 illustrates a portion 13 of the main fuel 11 being diverted away from the engine 11 and toward a catalytic reactor 20 in which the catalytic dehydration of methanol to DME is effected. The DME produced is used as an ignition enhancer in fumigant 17 for fumigating the intake air 12. Other embodiments described herein utilize other techniques for generating the dimethyl ether, when used as the ignition enhancer of the fumigant. In some such embodiments, the DME may be generated at the location of methanol generation, and delivered as a part of a pre-fuel composition to the engine site.

The catalytic reactor 20 operates under standard industry conditions as are known by those practiced in the art in order to effect dehydration of the methanol in the methanol/water fuel. As illustrated in FIG. 1 the source of heat for operating the catalytic reactor 20 is the exhaust gas 22 from the engine 10 which transfers through a heat exchanger (not shown) to heat the diverted part of the main fuel in the catalytic reactor 20. Exhaust gas temperatures can range between 200° C. to over 500° C. and are usually dependent on the load of the engine, namely a higher engine load will produce higher exhaust temperatures.

FIG. 1 shows that after harnessing the heat from exhaust gases or other heat sources as required to power the catalytic reactor the engine exhaust gas 22 is cooled after transferring through the heat exchanger in the catalytic reactor, exhausts to atmosphere 28. Alternatively, or additionally, as illustrated in FIG. 1, the exhaust gas can be treated with a portion condensed and recycled back to the main fuel as recycled fuel 32 that has been treated through a condenser 25, (where any cooling medium may be used) that in the embodiment illustrated includes a salt water/water heat sink 34 (heat exchanger), which is suitable for use on ships. Additional exhaust treatment steps utilising condensate or other means can be also be taken to reduce targeted pollutants to low levels in the exhaust gas to atmosphere (28). In another embodiment components such as any unburnt fuel can be adsorbed onto an active surface and later desorbed using standard techniques, and included as main fuel or fumigant component to further reduce pollution. Alternatively a catalyst can be employed to catalytically react any oxidisable species such as unburnt fuel, increasing the exhaust temperature and providing an additional source of heat which may be utilized.

Additionally, if multiple engines are operating, for example to produce electricity, the aggregated exhaust gas can treated as a single stream to be treated/condensed with the recycle fuel from the exhaust being directed to one or more of such engines.

A second fuel storage 38 provides fuel for either direct use as a secondary fuel, namely the fuel is a fumigant comprising an ignition enhancer, or for conversion into a secondary fuel through the catalytic reactor 20. The fuel in the second fuel storage 38 may be used as an alternative to obtaining a portion 13 of the main fuel 11 for conversion through the catalytic reactor 20, or may be used in combination with the portion 13 of main fuel.

The poor cetane characteristic of methanol/water fuel, particularly those having a medium to high water level, can also be offset by preheating either the main fuel and/or the intake air. Preheating can be achieved by a variety of techniques including any one or a combination of the following:

1. Waste heat Pre-heater—Using the CI engine exhaust, or other waste heat, to preheat the intake air and/or main fuel through heat exchange. A fan may be introduced to optimise the pressure profile of intake air through the engine cycle.
2. Supercharger/blower—or other air compressing means driven by the engine to force induction of intake air into the combustion chamber, and heating intake air through increase in air pressure.
3. Turbocharger—or other air compressing mechanism driven by engine exhaust or other waste heat to force induction of intake air into combustion chamber, and heating intake air through increase in air pressure.
4. Using direct methods to heat the air, such as electrically heating via elements or combustion of fuel to generate the required temperature increase. Such methods may be useful during startup and at low engine loads.
5. Glowplugs (or hot bulbs)—directing heat into the engine cylinders.

Option 1 (without a fan) above would result in a lower power output from the engine due to a lower mass flow of air (compared to options 2 to 3 where the mass flow of air is not reduced), however this loss of maximum power may be offset in part by a higher efficiency in combustion in the hotter conditions at the point of fuel injection and a lower requirement of excess air compared to petroleum based diesel fuels. A compensating pressure fan can offset the reduced mass flow of air under conditions of increased air temperature.

The temperature required at the point of fuel injection and therefore the level of preheat required to ignite a water/methanol mixture depends on the amount of water present. At low to medium water level, and subject to specific formulation this can be achieved by an air preheat temperature of 50-150° C. However, with a medium to high water level, e.g., a 50%/50% water/methanol mixture, an air preheat of 150-300° C. can be used.

In another embodiment heating of the main fuel according to known techniques can assist the ignition process.

The preheat option in combination with a medium to high water low methanol fuel alters the engine cycle from being a constant volume cycle during the ignition and combustion and initial expansion phase, to directionally more of a constant temperature expansion (where the heat from the methanol is in significant part evaporating water) in a timeframe most suitable to maximise engine performance.

Some adjustment to the fuel and process described above may be required to optimise operation and efficiency in smaller CI engines operating at higher engine speeds, for example at 1000 to 3000 rpm, and above. In addition to fumigating the air intake stream with a fumigant comprising an ignition enhancer, the following operational aspects may be used separately or in combination for engines operating at higher speeds:

- pre-heating air intake as described above including by direct heating (from an independent heat source), heat exchange with exhaust gases, supercharger or turbocharger.
- heating the combustion chamber using, for example, glowplugs.
- pre-heating main fuel intake.
- adding additives to the main and/or secondary fuels that improve ignition and combustion of the fuels. Some of these additives are discussed above.
- selecting the appropriate water level in the main fuel composition as discussed above, such as a low to medium water level range.
- selecting the water level in fumigant to a suitable level consistent with the engine configuration.

These options can additionally be utilized if desired when operating a larger CI engine at lower engine speeds, such as 1000 rpm or less.

CI Engine Power Generation Systems

Using the methanol/water mix fuels described herein and the related systems (also referred to as processes) for powering a compression ignition engine, power generation systems and structures can be developed to efficiently generate power at reduced emission levels, and which can also treat the engine exhaust to capture and then re-use or re-direct heat and water from exhaust gases. The re-use, or recycling, of heat and water promotes increased system efficiencies and overall reduced waste products and emissions. The re-direction of heat and water can find use in a range of unrelated applications involving heating and cooling localities/quarters and the regeneration of water for use by communities or as part of other systems.

FIGS. 3A to 6B illustrate examples of power generation systems incorporating the processes and fuels described herein for powering a compression ignition engine. It is understood that the fuel represented in these processes is a methanol based fuel that may contain various amounts of water, and may contain water in the amount of 0% to 80%.

Figure 3A:
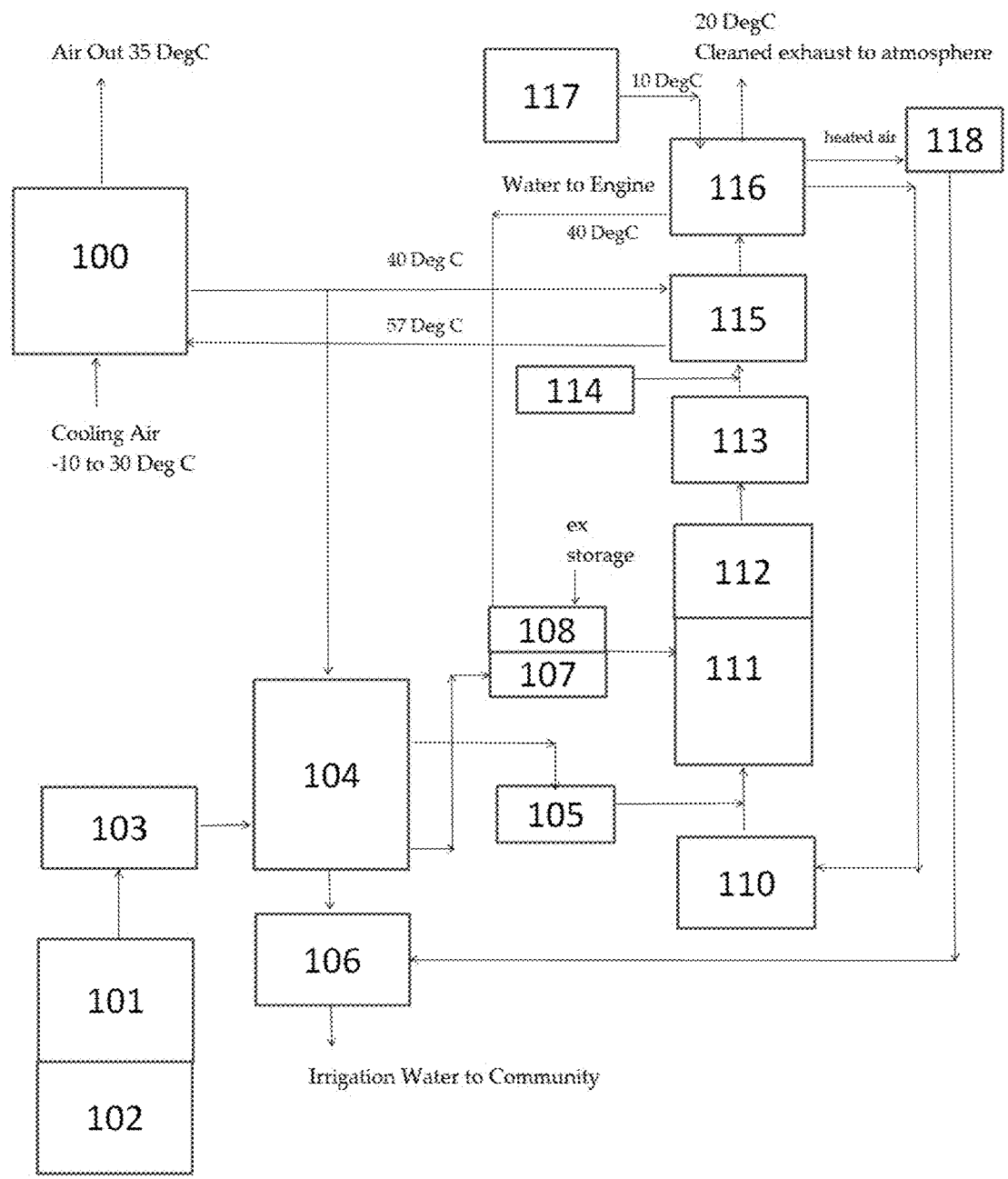
FIG. 3A is a flow chart illustrating a process for powering a compression ignition engine and treating engine exhaust, with waste heat used as a separate heating source through a hot water loop.
Figure 3B:
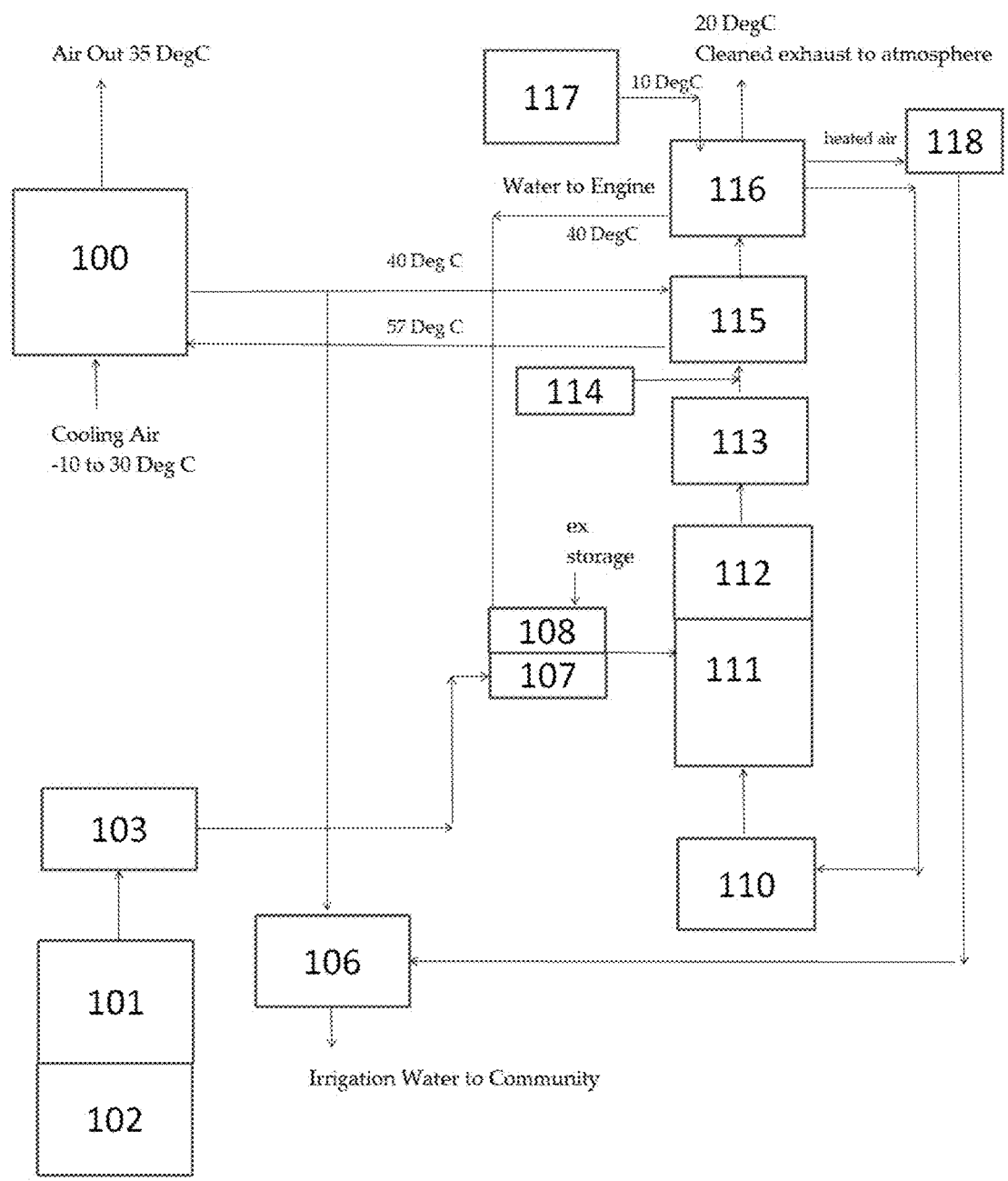
FIG. 3B is a flow chart similar to FIG. 3A but excluding the step of fumigating the engine intake air.

FIGS. 3A and 3B show a process for producing and supplying a methanol fuel to an IC engine 111 (also referred to as a diesel engine) to produce output power but to also include an engine exhaust treatment that reduces emissions, that harnesses engine exhaust to recycle water and that also incorporates a Hot Water Loop (HWL) 113a, 113b (see FIGS. 4A and 4B) to provide heat to a local community. Output power produced by the engine can also be used to service the locality in which the power generating plant is located, and for example can be used to generate electricity for a community. FIGS. 3A and 3B differ in that FIG. 3A shows the process utilizing air fumigation into the engine, while the process shown in FIG. 3B omits the step of fumigating inlet air.

FIGS. 3A and 3B illustrate a fuel manufacturing plant 101 and the remote supply of that fuel through a supply grid 103. The fuel manufacturing plant may be a conventional methanol manufacturing plant using electricity generated from steam produced from conventional boilers in large remote coal plant 102. Such a plant produces a coal fired emissions profile. Alternatively, the electricity generating plant 102 could incorporate a combustion engine using a methanol fuel as described herein to generate the electricity required to produce the methanol fuel. This would provide a cleaner alternative with lower emissions to those produced by a coal plant.

Methanol based fuel is manufactured in plant 101 and may largely contain methanol, a methanol-water mix or a methanol-ether mix or a methanol-water-ether mix. In one embodiment the fuel comprises a "Whole Fuel" Methanol and DME mixture in a 90-99.5% blend of methanol and DME as a non-boiling liquid at atmospheric pressure which may be used directly with the engine 111. In the mix of methanol and DME the DME is provided in a stable quantity suitable for transmission as a liquid and to avoid transition of the ether into the gas phase. The quantity will depend on the pressure and temperature at which the fuel is transmitted in the pipelines 103, but will generally be less than 10% of the total fuel amount, and in the range of 7%-8%.

Alternatively fuel having a higher DME proportion under pressurised conditions may be supplied. In another alternative, a fuel containing a high methanol content approaching 100% methanol (e.g., chemical grade) could be transmitted for subsequent part conversion to DME near the demand centre (namely the power generation plant). This form of pre-fuel composition comprising a high % of methanol may contain a water component of around 0.2% or more. In a further alternative, the fuel or pre-fuel transmitted in the pipelines may be a methanol-water fuel. The water in the methanol-water fuel can either be associated with the methanol, such as in crude methanol, or may be sourced from a surplus of water in the manufacturing area that may be cost effectively used for this purpose. Some additive addition of lubricity and corrosion improver may be included in the transmitted fuel depending on the materials of construction in the transmission grid and to enhance engine/process operation.

Transmission of large amounts of energy in flammable liquids over long distances in pipelines in regional grids is established technology. Such infrastructure as pipelines 103 can be also used to deliver the methanol fuel to distant locations safely and cost effectively.

After being transmitted through pipelines 103 the fuel arrives at a power generating plant including the compression ignition engine 111, a pre-processing stage 104 and exhaust treatment 113, 115, 116 118. The fuel may be used in the engine 111 immediately as is, or optional pre-treatment of the fuel may be carried out to ensure safe and reliable operation through the plant operating range. Storage of a start-up and shutdown fuel can also be contemplated for system integrity reasons, for example, an ether component could be stored.

At the pre-processing stage 104 the fuel may be split by flashing into two rich phases, one a methanol rich 107 and one an ether rich part 105, such as DME. DME is particularly suited to this flashing process due to its low boiling point. Low level waste heat from engine exhaust from a hot water stream having a temperature of 50° C.-60° C. can be used to flash separate low boiling point DME from methanol. In some embodiments the methanol rich phase may include low amounts of DME, with most DME being flashed off. In other embodiments a high proportion of DME may be retained in the liquid phase with only sufficient DME to ensure good and complete combustion being vaporised and utilised as fumigant 105. For example if the fuel from the manufacturing plant includes 7% DME, 5% of this may be retained in the liquid phase with 2% being used as fumigant 105 for adding to heated combustion air 110 entering engine 111.

Pre-processing may include a conversion option to supplement the supply of DME or other fumigant. Alternatively, the required quantity of ignition improving agent, such as DME, may be obtained from storage. Other such agents are also possible such as DEE and other ignition improvers described herein.

The pre-processing stage may also include processing part of the transmitted fuel to not only separate DME to be used as a fumigant but also to produce excess DME for use as liquid fuel ingredient for other processes. For example, surplus DME could benefit a nearby community by providing surplus heat to the HWL. Alternatively or additionally, the DME could be integrated with generator plant processes. Methanol fuel, whether before or after processing, could also be removed from the power generating system and used for local chemical manufacture.

Transmission to the generating plant of crude methanol is also possible, saving capex and opex costs in an upstream manufacturing plant. Such a fuel feed to the power generating plant would suit the option above of splitting out part of the crude methanol for DME production, with the remaining fuel being directed into the engine. In terms of energy and capex, this option would replace a distillation unit at the manufacturing plant 101 with most product being distilled and going "over the top" by a much smaller unit at the power generating plant with a relatively low amount going "over the top". This option would also make available local DME near demand centres, and namely near the power generating plant.

The pre-treatment of fuel at the pre-processing stage 104 can also heat the methanol fuel 107 prior to entry into the engine, with cool water, derived from the venturi scrubber 115 return line exiting the pre-processing stage 104 as irrigation-quality water 106. Cooled irrigation-quality water 106 may mix with condensate from condenser 116, and if necessary a cooler could be used to ensure acceptable effluent temperature.

In the example shown for power generation with a HWL, the diesel engine would be used generating power from 1 MW and above. This does not exclude power below 1 MW which could serve smaller users and have a low NOX, SOX and particulate outcome. A diesel engine is particularly suited to post combustion treatment because it provides the driving force of air pressure needed to move exhaust through cleanup and heat exchange equipment at only a small cost on engine efficiency.

The nature of some of the fuel mixtures described herein means that large diameter pistons are preferred over smaller pistons due to inherent thermal benefits at engine size being increased. Larger pistons also reduce the risk of impact of injected fuel on the piston walls, ensuring the fuel combusts properly and does not interfere with the lubricant film.

While the experiments mentioned further below demonstrate fuel tested in an engine running above 1000 rpm, as previously suggested the fuel can be successfully used in slower speed engines, normally operating at just below 100 rpm up to 1000 rpm, which is the range normally described as being the low to medium speed range. This speed range allows more time for volatile ignition improvers to get into the vapour space as vapour and commence their chemical reactions with the hot compressed air during the compression stroke. This greater time allowance during the combustion phase will allow more complete combustion of fuel and reduce the level of unburnt fuel and other components in the engine-out exhaust. The greater time allowance will also allow for more time to completely combust the fuel in the cylinder through the contact of water and oxygen molecules, allowing lower lambda to be used and in so doing increasing the concentration of water in the engine out exhaust.

Power is generated at engine 111 by a mixture of methanol 107 and water 108 entering engine 111 together with air 100, which can be pre-heated and in the example shown in FIGS. 3A and 3B is pre-heated by engine exhaust gases through a condenser 116. A suitable pre-heated temperature could be between 40° C. and 50° C. Water in the fuel may be sourced from a water storage or from water recycled from exhaust gas through condenser 116 (explained in more detail below).

Treatment of exhaust gas includes passing engine exhaust through a catalytic converter 112 using catalysts targeting CO2 and oxygenated compounds. This will cause marginal heating of the exhaust gas where that heat may be available for the HWL, or for other processes described further below in relation to FIGS. 5A, 5B, 6A and 6B. The catalytic converter 112 also reduces any fuel or combustion products to an appropriate level. A final stage activated carbon or similar can optionally be employed to clean up. Additionally, the methanol fuel described herein burns clean with low soot, which improves catalyst performance.

Figure 4A:
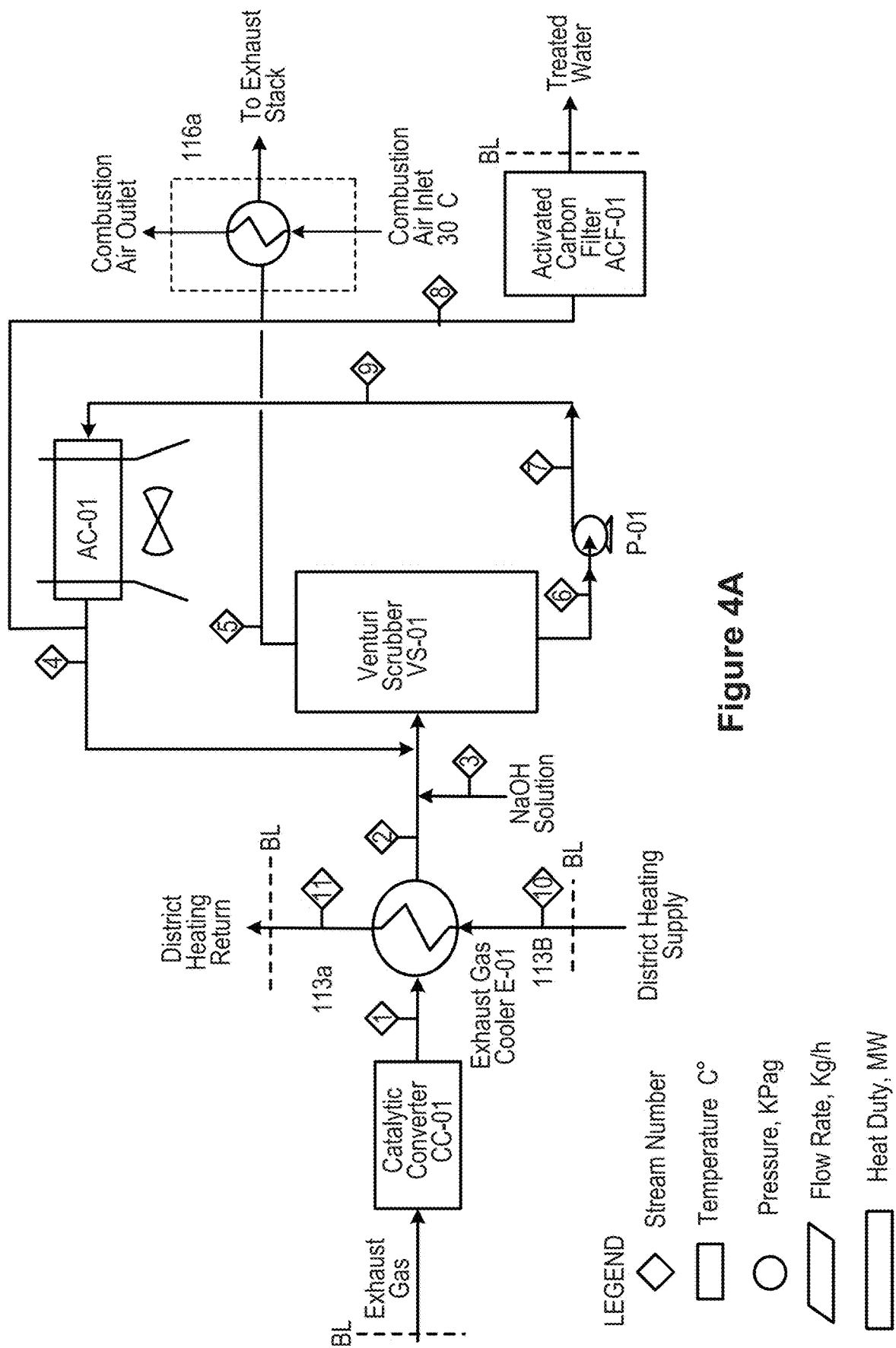
FIG. 4A is a more detailed view in the flow chart of FIGS. 3A and 3B of the exhaust treatment.
Figure 4B:
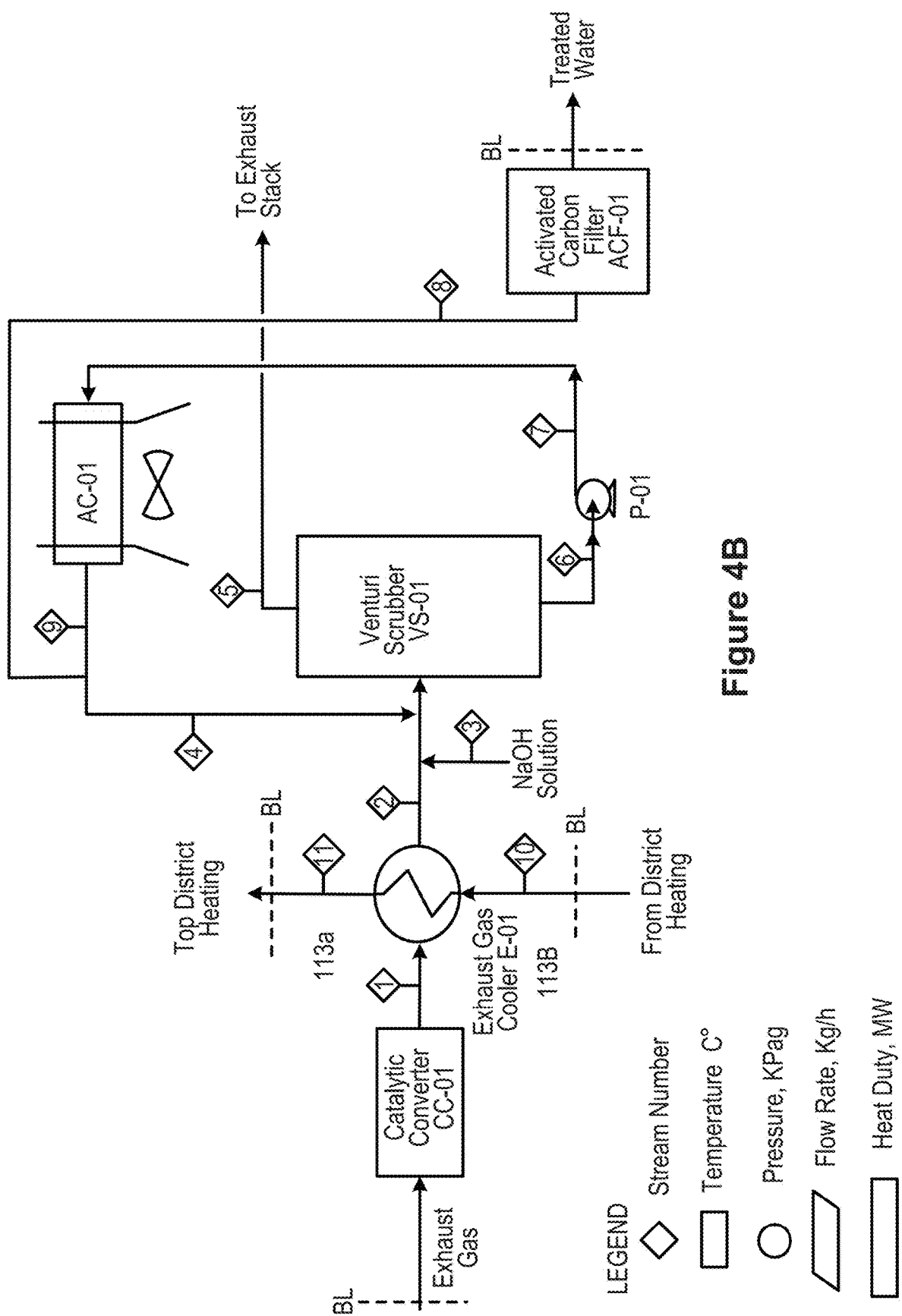
FIG. 4B is a similar view to FIG. 4A, but without a final exhaust air exchange condenser.

The HWL carries heat to a local-based destination such as a residential community through a loop of pumped water. FIGS. 4A and 4B illustrate the HWL supply line 113a and return line 113b at the HWL heat exchanger 113. Harnessing heat by-product from the power generation process can be used to provide low cost heating to residential and commercial quarters. The water pumped through the HWL is heated through a HWL heat exchanger 113 downstream from the catalytic converter 112. The heat exchanger 113 is a standard unit operating at temperatures on return of the HWL of 40° C. with a design dispatch temperature of 80° C. to the HWL. The relatively cool HWL return temperature and efficient exchanger design in terms of required surface area will ensure sufficient cool down of the exhaust.

Exhaust treatment additives are added at caustic injector 114, which injects any caustic chemicals, and other suitable acid neutralising agents, into the exhaust gas for a desired outcome. For example, to eliminate acidic compounds from the final exhaust a low dose of a basic liquid (eg 50% caustic soda and water) will be injected into the exhaust stream, used to nullify trace acids and control the pH of the irrigation water flowing from the plant. Final pH will be controlled to a level that best meets local conditions.

A venturi scrubber 115, or other suitable mixing device, is illustrated downstream of the HWL exchanger 113. This unit has several functions, the first being to intimately mix the exhaust gases with a circulating water flow, the effect of the water flow being to cool down the exhaust from 85-90° C. out of the HWL exchanger to approximately 55-60° C. out of the venturi scrubber. Such cool down will create condensed water from the exhaust gas and collect particulates that can be treated using known methods, or ultimately form part of the final irrigation water leaving the plant for return to the ground. The de-acidified and clean exhaust leaving the scrubber 115 produces a higher purity exhaust out of the final condenser.

Water is pumped between the venturi scrubber 115 and a fin fan heat exchanger 100. The fin fan heat exchanger, or other suitable equipment, is another gas/liquid exchange that takes the heat from exhaust gas through the venturi scrubber and rejects that heat to air, which is driven to flow through the heat exchanger 100 by one or more fans. One advantage of heat rejection in this manner is that the heat is rejected at low temperature, and therefore does not have a large impact on the overall efficiency of the process.

Alternative to expelling heat to atmosphere, heated air from the fin fan exhaust may be used directly into the engine as heated combustion air 110, in which case some pressure may be applied from the fan to offset the heating effect on mass flow of air. Another alternative to expelling heat to atmosphere is to dissipate heat through a cooling pond or other water system capable of dissipating a large amount of heat in a responsible and environmentally acceptable way.

FIG. 4A illustrates a final large exhaust gas/combustion air exchanger, namely condenser 116 that recovers water in high water recovery systems. In systems where high water recovery is not necessary, condenser 116 is not included. FIG. 4B illustrates a medium water recovery system similar to that of FIG. 4A but with the omission of condenser 116.

The final (optional) condenser 116 cools the exhaust from the venturi scrubber 115 down from approximately 50-60° C. to within about 5-20° C. of ambient temperature. In lowering the temperature by this amount the water produced recovered from the plant is significantly increased. In addition to producing water for irrigation, or re-use outside the power generation plant, the condensate from the condenser 116 may optionally be useful within the power generation process.

Condensate may be injected in with the pre-processed fuel to reduce NOX formation and associated acidity issues in the downstream equipment, such as in the HWL exchanger. The condensate may also form a source of water to be used in the combustion of particular fuel blends as an alternative or in addition to stored water. Furthermore, the higher grade water from the condenser may be further treated into potable water, or may be added to the irrigation quality water produced by the venturi scrubber and to re-circulate between the venturi scrubber 115 and fin fan heat exchanger 100.

The heat from cooling the exhaust is not wasted, but can be exchanged with inlet air into the engine 111. Aside from the benefit that recycling waste heat and water makes to the fuel required and emissions produced in the process, recovery of water and heat tends to also stabilise engine operation. Colder inlet air to the engine allows more heat to be recovered.

FIG. 3B differs from FIG. 3A in that it illustrates the process for producing and supplying a methanol fuel to engine 111 without fumigating intake air with an ignition improver. Methanol fuel from the manufacturing plant 101 is transported through the pipeline infrastructure 103 for direct use with the engine 111, where the intake air 110 is pre-heated. Pre-processing to flash separate an ether from the transported fuel is not required as fumigant is not required. Pre-processing may still however take place to prepare the fuel for combustion and/or to separate ethers for separate use outside the power generation plant. It is also understood that in relation to FIG. 3A, the step of pre-heating the intake air with exhaust heat is not essential and could be omitted. It is however useful to make use of exhaust heat and recycle exhaust particles to improve engine efficiency and reduce emissions. Alternatively the water from the venturi scrubber to the fin fan could in principle be used for the purpose of heating the inlet air.

In the process illustrated in FIG. 3B, intake air can be preheated by various means including using the heat transferred from exhaust gas, for example through condenser 116 or from heat taken from exhaust earlier in the post-combustion process such as at the catalytic conversion stage. Alternatively, intake air is pre-heated using other techniques described herein including direct heating with electrical heating elements, glow plugs, and indirect heating such as by way of superchargers or turbochargers.

Figure 5A:
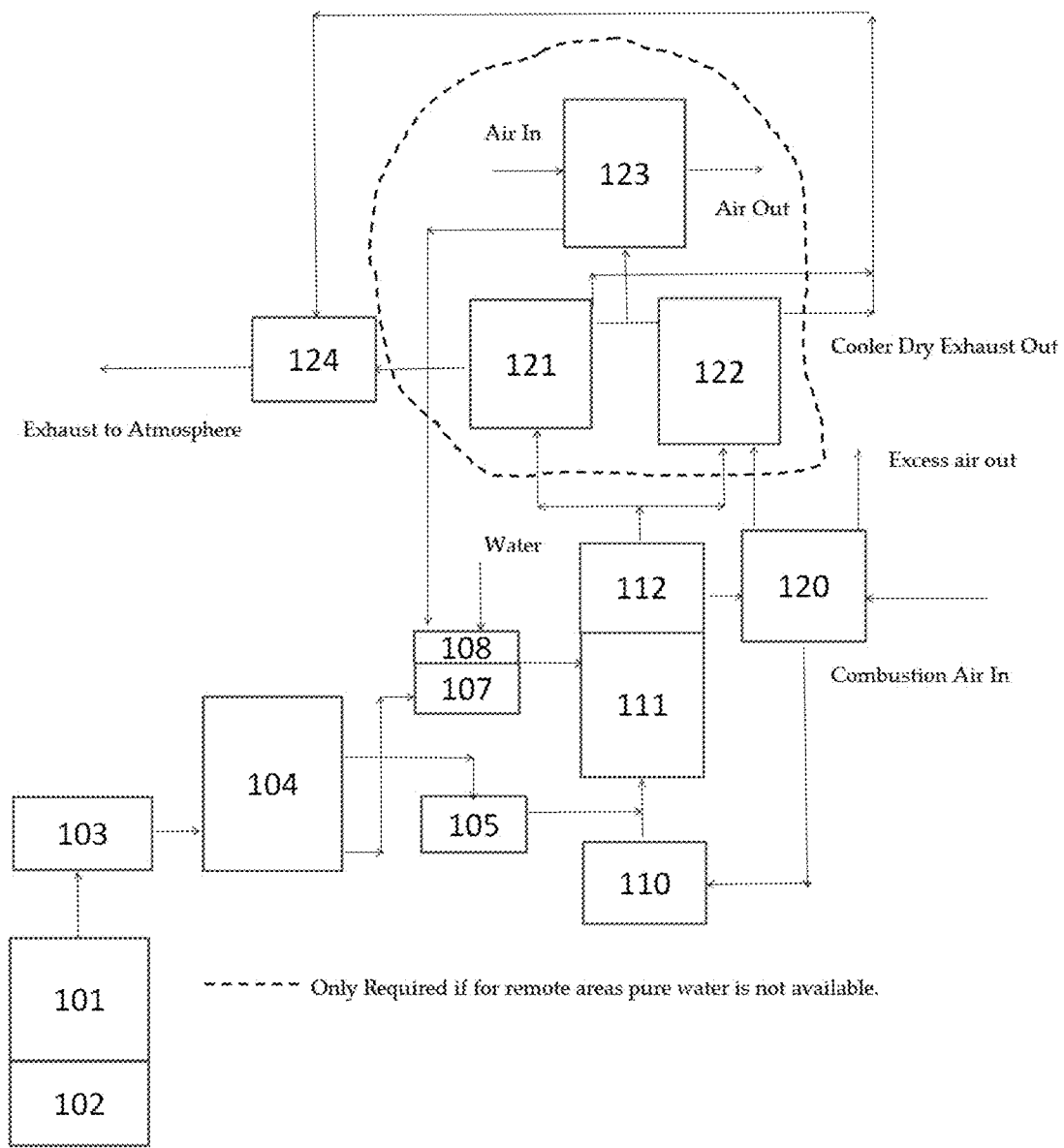
FIG. 5A is a flow chart illustrating a process for powering a compression ignition engine to drive a rail vehicle and treating engine exhaust.
Figure 5B:
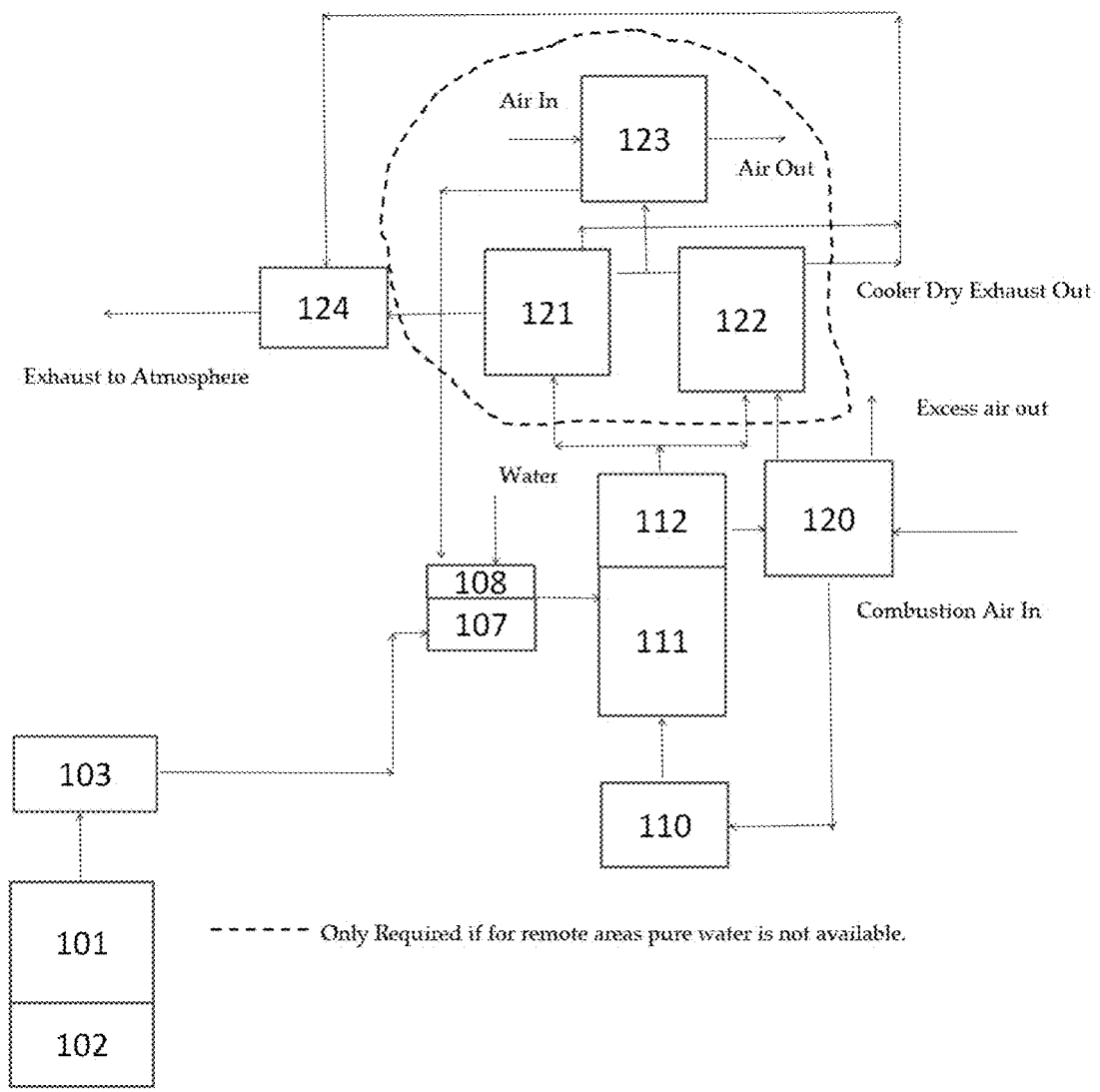
FIG. 5B is a flow chart similar to FIG. 5A but excluding the step of fumigating the engine intake air.

FIGS. 5A and 5B illustrate how the concept of the power generation using the technology and fuel described herein can be applied to power a rail vehicle. Reference numbers in FIGS. 5A and 5B correspond to the same numbers and items used in relation to FIGS. 3A and 3B. Any pre-processing 104 of the fuel and the use of the fuel through the engine 111 is the same. Exhaust air is cooled after exiting the catalytic converter 112 through a first heat exchanger 120 that uses ambient air to cool exhaust and heat combustion air 110.

The exhaust treatment on a rail vehicle differs from that of the HWL process in separating water from other exhaust material. Exhaust gas exiting the catalytic converter is passed through an activated Alumina water adsorbing cycle 121 and an activated Alumina water evolving cycle 122 to produce clean hot and dry exhaust to atmosphere with the recapture of water from exhaust gas through a water condenser 123. Recaptured water can be supplied back into the pre-process stage or used for non-potable rail vehicle use. The cooler dry exhaust exiting the activated alumina cycles can be used through a second heat exchanger 124 to provide heating or cooling on the rail vehicle.

The manufacture of fuel at the methanol plant 101 would lead in one embodiment to potentially two components being stored on the rail vehicle: (1) a water methanol mix designed to provide the correct NOX/performance outcome, and (2) a fumigant component in separate pressurised storage. Rail weight penalties are not large compared to shipping weight penalties.

FIG. 5B, similar to FIG. 3B, illustrates the rail vehicle power generation process without the use of fumigant, and relying only on pre-heating. The same comments on the merit of the HWL process without fumigant apply for the process described in relation to FIG. 5B.

Figure 6A:
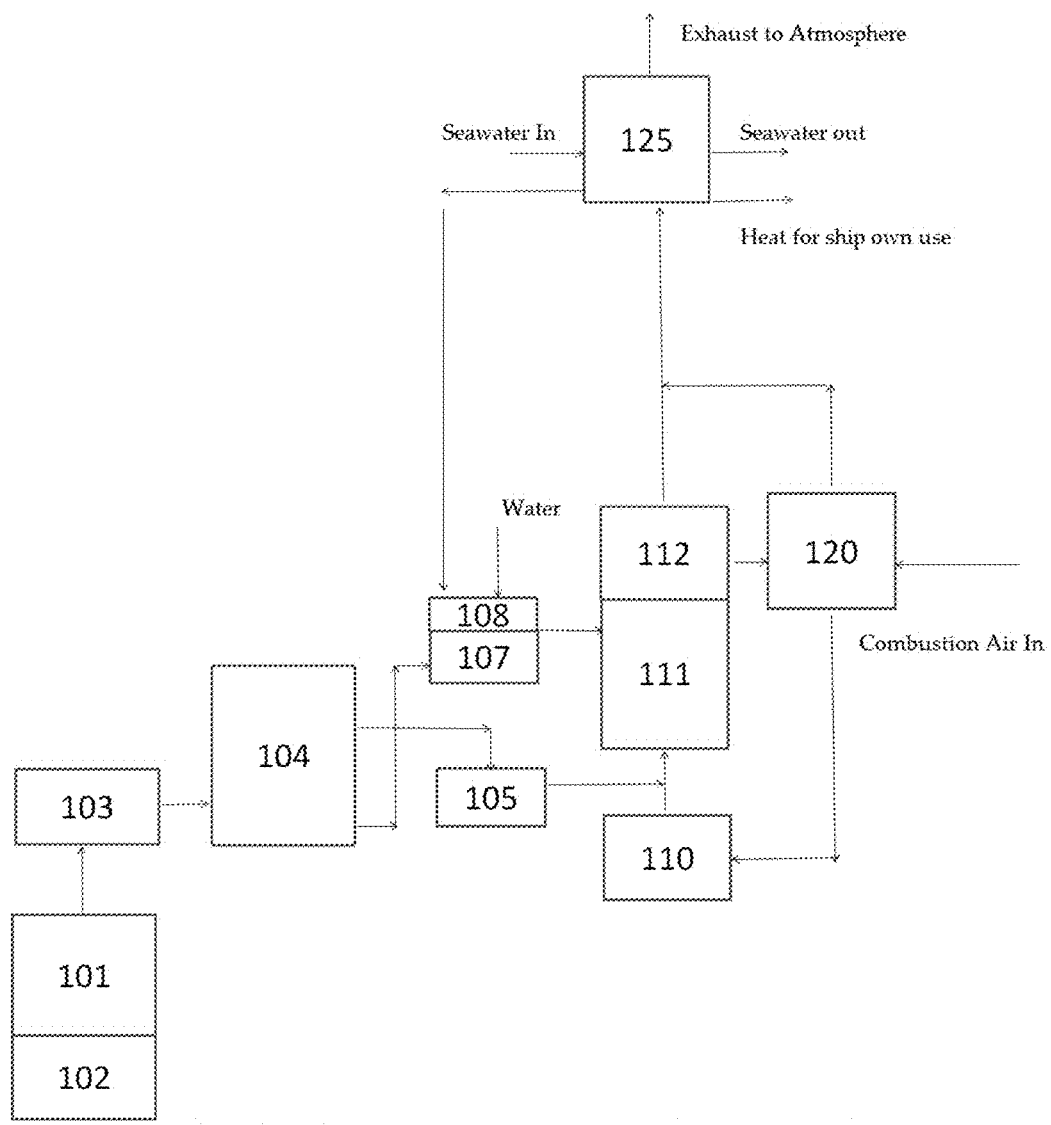
FIG. 6A is a flow chart illustrating a process for powering a compression ignition engine to drive a marine vehicle and treating engine exhaust.
Figure 6B:
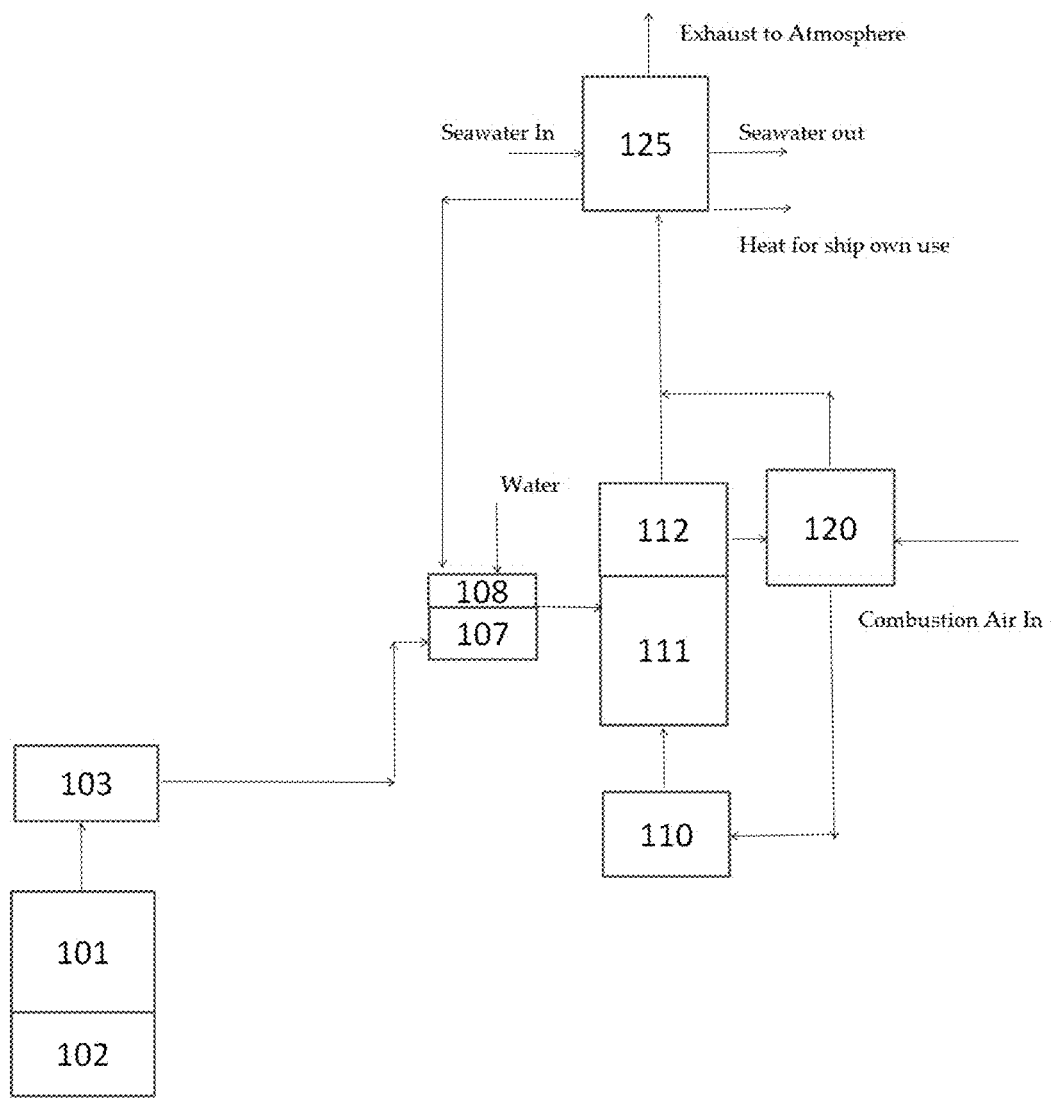
FIG. 6B is a flow chart similar to FIG. 6A but excluding the step of fumigating the engine intake air.

FIGS. 6A and 6B illustrate the concept of the power generation process used for marine purposes, and for example on a ship. Similar to the HWL power generation process example, a methanol manufacturing plant sized for a ship can be provided on the ship in order to supply methanol based fuel to one or more engines 111 that power the ship. Similar to the examples above, FIG. 6A illustrates a process using fumigant ignition enhancer in the intake air while FIG. 6B illustrates the process without fumigant. The process could instead include no pre-heat or pre-heat of intake air.

A first heat exchanger 120 on the marine vehicle cools exhaust air using cooler ambient air. A portion of that exhaust air can be re-circulated back to become heated combustion air 110. The remaining cooled exhaust air is then passed on to a desalinator 125 and other heat exchange equipment in order to maximise exhaust heat recovery for the vehicle's needs such as tank and vehicle heating. The desalinator makes use of seawater readily available to marine vehicles The general advantage associated with the processes and fuels described herein when used in the applications described above is that it enables the simultaneous delivery of several benefits to energy and resource constrained communities and quarters. Specific advantages include:

Development of remote resources that may otherwise remain undeveloped due to unsuitability (e.g., high sulphur).

Provide seamless options for efficient biomass co-processing to reduce CO2.

Earliest co-use of biomass would extend the life of existing resources.

The integration of other renewable is also a possibility, such as wind and sun

Provide electricity to demand centres on a combined heat and power (CHP) or combined cooling heat and power (CCHP) basis.

To virtually eliminate all non-CO2 pollutants arising from the production stage of electric power.

To capture hydrogen from resources to the maximum extent possible and convert these resources to water for use by demand centres (1 part hydrogen converts in reaction with oxygen to 9 parts of water by weight). Under such arrangements a fossil fuel resource can also be regarded in part as a water resource with potential "free carry" effect, as the fuel delivery mechanism will in any case absorb its own distribution costs. This water will be treated with activated alumina or other suitable adsorption material or technology to remove breakthroughs which pass the catalytic converter which treats the hot engine exhaust.

Provide waste heat to local communities by a hot water loop (HWL) cooling down the exhaust and exchanging this major source of heat energy with local demand centres for heat, for heating or refrigeration purposes. The clean exhaust from utilising the technology described herein allows proximity of power generation to market, a feature not normally available to coal fired power generation in particular.

Efficiently recovering water and heat. Other heat transfer approaches can be used, with increased recovery though at higher cost, and combustion air can also optionally be heated by, for example, the circulating water prior to the fin fan cooler (in the example of FIGS. 3A and 3B).

High recovery of water may be obtained, in the vicinity of 0.7 to 1 tonne irrigation water per tonne of methanol consumed, or higher if justifiable on economic and engineering grounds.

Provide pH neutral irrigation water for direct use by local communities

Provide a water washed exhaust which neutralises acids and removes particulates down to low levels. Other pollutants such as SOX and hydrocarbons in the exhaust will also be low.

The technology described herein with water production, HWL heat integration and emissions outcomes will come at a cost in terms of engine efficiency, however this aspect is in many cases expected be offset by supply chain benefits and the benefits mentioned above.

EXAMPLES

Example 1

Experimental Program to Investigate Methanol Water Fuel Compositions for Compression Ignition Engines 1.1 Summary This report summarises the results obtained during an experimental programme undertaken by the University of Melbourne on the performance and engine-out emissions of different methanol based fuels in a compression ignition engine.

The fuels tested were mixtures of methanol, water, dimethyl ether (DME) and diethyl ether (DEE). As methanol is not normally a compression ignition fuel, two ignition promoter systems were used. The first consisted of an inlet air pre-heater. By heating the engine inlet air to up to 150 deg C. (an imposed safety limit), higher temperatures are reached near the end of the compression stroke, at which point the main fuel charge is injected. In some cases, these temperatures were high enough such that compression ignition of the injected fuel occurred.

The second system for promoting ignition involved the continuous injection (i.e. fumigation) of gaseous di-methyl ether (DME) into the engine's inlet port. Because DME has a relatively low ignition temperature and a high cetane number, the DME auto-ignites as the air/fumigant mixture is compressed during the compression stroke, thus releasing thermal energy that in turn can ignite the main fuel charge.

The tests were conducted on a modified 1D81 Hatz, single cylinder diesel engine, mounted on an in-house built motoring/absorbing dynamometer facility. In its unmodified state, this naturally aspirated engine produces up to 10 kW of shaft power from a single cylinder of approximately 670 cc volume. It is very likely that the absolute performance of all fuels tested will be better in larger engines, as it is commonly known in the engine community that peak engine efficiency increases with engine size due to fundamental physical laws.

As such, it is considered that the engine performance for the non-diesel fuels in the current test programme should be viewed relative to the diesel fuelled result on this same engine. Specifically, if comparable or better performance is achieved with a given alternative fuel relative to diesel in this engine, it is likely that this relative performance can also be achieved on a larger engine. Of course, maximising the absolute performance of a given fuel on a given engine requires further optimisation, and which should improve engine performance.

The general observations from this experimental programme are as follows.

1. Fumigated Engine Tests

These results show that at the more efficient operating conditions, the fumigated engine produced comparable efficiency, lower NO emissions and much lower particulate emissions than the diesel engine.

2. Heated Inlet Air Tests

These results show that engine out NO emissions were comparable to the diesel engine. As with the fumigated engine runs, much lower particulate emissions than the diesel engine were again observed. Further work is required to improve the efficiency of the engine in this mode of operation.

1.2 Experimental Methods

Figure 10:
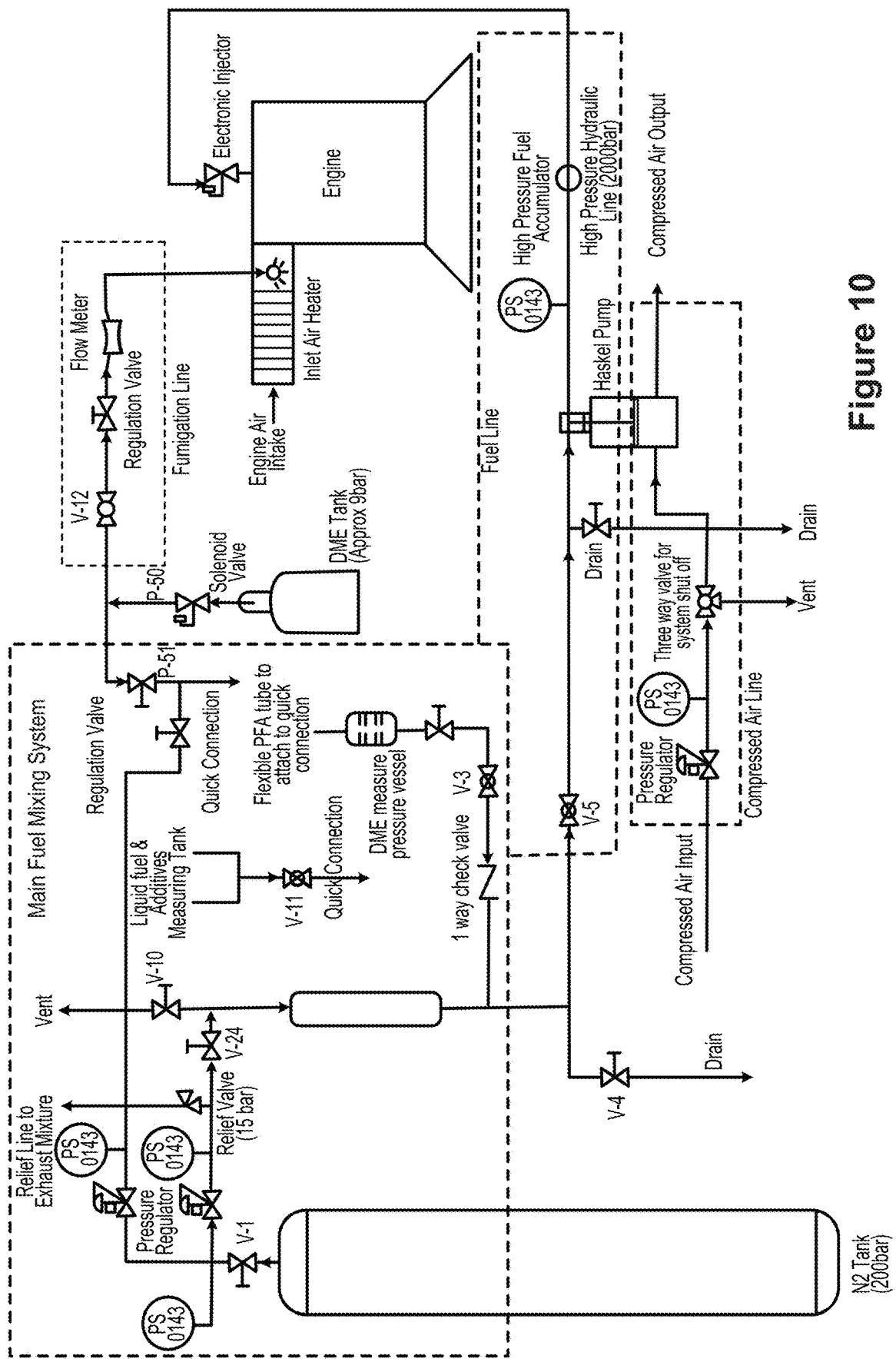
FIG. 10 is a schematic diagram of the process and instrumentation of the testing facility used in obtaining the results of Example 1.
Figure 11:
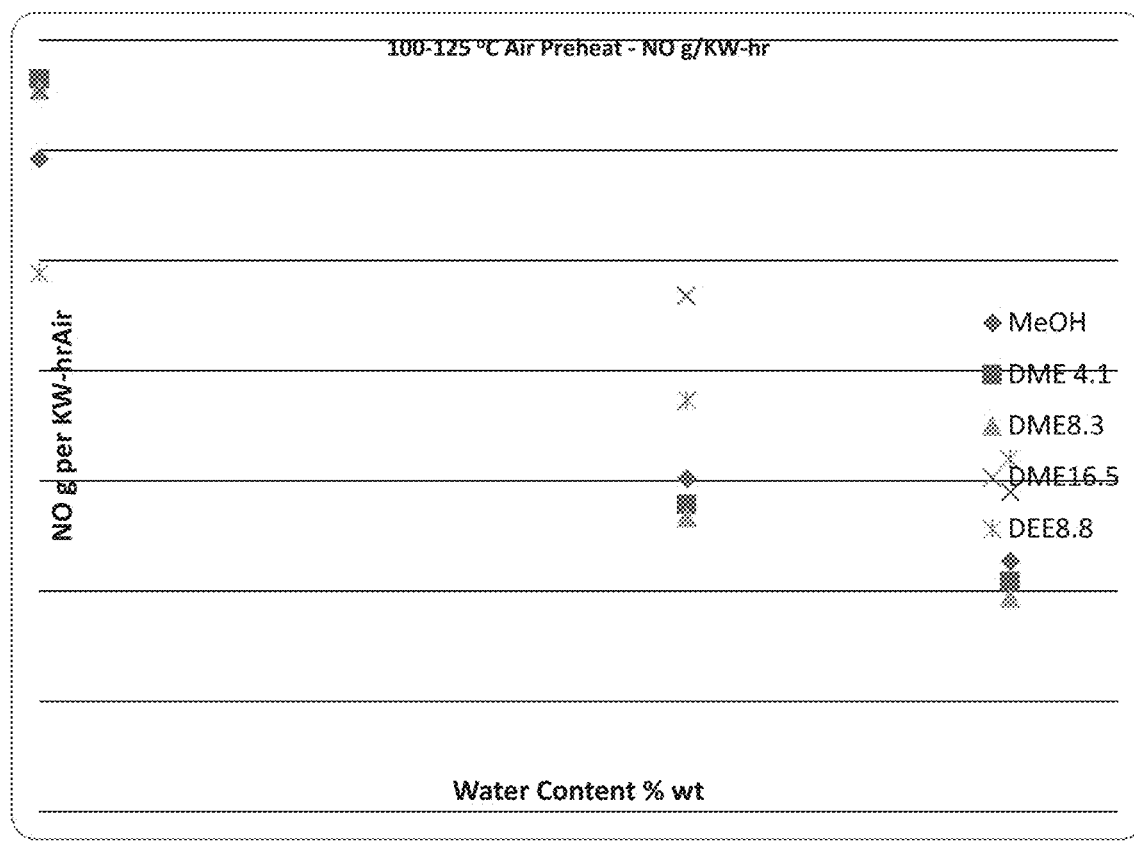
FIG. 11 is a graph illustrating the reduction in NO exhaust output of a compression ignition engine by increasing the amount of water in the methanol-water fuel.

The tests were conducted on a modified 1D81 Hatz diesel engine, mounted on an in-house built motoring/absorbing dynamometer facility. FIG. 10 sets out a Process and Instrumentation Diagram for the facility. The unmodified engine specifications are detailed on Table 1 below. These specifications were not changed during the engine testing.

The modifications made to the engine consisted of the following.

Replacement of the mechanical fuel injector and fuel pump with a solenoidally driven injection system and separate fuel pump and injection system.

An electronically commanded common rail diesel injector was used to fuel the system. This injector (Bosch, model 0 445 110 054-RE) delivered a significantly higher volume flow rate than the injector on the unmodified engine, such that the highest water containing fuels in Table 2 could be delivered whilst achieving the same air/fuel ratio as both the diesel and pure methanol fuels.

This injector is oversized for this engine, and so should result in a significant reduction in engine performance even when running on the same diesel fuel as the unmodified engine. As a result, the proper reference for testing the alternative fuels listed in Table 2 is the same, modified system running on diesel, the results of which are listed in Tables 3, 4 and 5. It is anticipated that further testing, specifically of fuels with the lower water content, will enable use of a smaller injector and thus significant improvements in engine performance.

As FIG. 10 shows, the fuels were mixed into a pressurised storage vessel such that the DME did not transition into the gas phase prior to injection into the engine. This vessel was always at between 5 and 10 bar during testing. The liquid fuel leaving this vessel was then pressurised by a Haskel, air drive pump, up to 800 bar before being injected into the engine. A high pressure accumulator was used to ensure that the fuel line pressure remained constant during the tests.

The fuel flow rate was measured by suspending the pressurised storage vessel on a load cell, and measuring the rate of change of the vessel's mass during each test.

Extension of the inlet manifold.
This was done to connect both the inlet air pre-heater and the DME fumigation inlet. Both systems were used as ignition promoters of the main fuel charge.

Extension of the exhaust manifold to connect all the emission analysis systems.

A Kistler piezoelectric pressure transducer.
Installed on the engine's cylinder head in order to record the in-cylinder pressure.

Use of Shell Helix Racing 10W60 oil for all tests.
This is a synthetic oil.

The exhaust out emissions were analysed using a number of independent systems.

A MAHA particulate matter meter.
This device gives a gravimetric measure of the particulate matter in the engine exhaust.

A Bosch UEGO sensor.
This is a production device that measures the air-fuel ratio. Whilst it has been developed for hydrocarbon fuels, comparison with the measured air-fuel ratio from the ADS9000 emissions bench demonstrated that it functioned well for all fuels tested other than those with greater than 50% water content (FIG. 4).

An ADS9000 emissions bench.
This device measured the engine out emissions of NO. Prior to sampling, the exhaust sample is passed through unheated lines and a water trap, and thus the water content of the sampled gases should be close to saturated at ambient conditions. The ADS9000 was calibrated before and during the test programme using calibration gases for all measured quantities and a gas divider.

A Gasmet FTIR emissions analyser.
This device was calibrated using appropriate calibration gases and zeroed with high purity nitrogen as per the supplier's instruction.

Each fuel was tested at the steady state speed of 2000 rpm and a lambda value of 2 (i.e. 100% excess air). The unmodified engine operated at a lambda of approximately 1.5. The leaner operation was chosen since the first tests at lambda 1.5 with pure methanol resulted in engine seizure due to an over-advanced injection in one instance. No further engine seizures were experienced at lambda 2.

The overall test engine procedure was as follows.

1. Heated Inlet Runs.

The inlet air was first increased to 150° C.

The injection duration was set by the lambda value of 2, and the start of injection set to top-dead-centre. The heater controller then reduced the inlet temperature whilst the engine ran, until positive engine torque was no longer sustained. The heater inlet controller then set the inlet temperature to a degree higher than when operation ceased.

The start of injection was then advanced with the dynamometer controller maintaining constant engine speed, until the engine torque reached so-called 'maximum brake torque (MBT)'. MBT is the most efficient operating condition at a constant engine speed and air/fuel ratio.

The resulting injection timing (start and duration) and other measured quantities were logged at this operating condition.

2. Fumigated Inlet Runs.

The engine was established at a smooth running condition with a high DME flow rate.

The main fuel injection duration was set by the lambda value of 2 and the start of injection timing was set at top-dead-centre.

The DME flow rate was then reduced whilst increasing the main fuel flow rate to maintain constant lambda, until the brake torque reached a maximum.

The start-of-injection timing was then advanced until MBT timing was achieved, whilst continuing to adjust the main fuel flow rate to maintain lambda if required.

The resulting injection timing (start and duration) and other measured quantities were logged at this operating condition.

3. Diesel Engine Run.

The start-of-injection timing was advanced to MBT whilst maintaining lambda at 2 via the injection duration.

The specifications of the fuels were as follows.

Methanol, 99.8%+ purity

De-ionised water, 99.8%+ purity dimethyl ether (DME), 98%+ purity di-ethyl ether (DEE), 98%+ purity 1.3 Results The results of the test work are presented in the tables below.

TABLE 1

| unmodified engine specifications | | |
| --- | --- | --- |
| Technical Data | Units | 1D81 |
| Number of Cylinders | | 1 |
| Bore × stroke | [mm] | 100 × 85 |
| Displacement | [L] | 0.667 |
| Mean piston speed at 3000 rpm | [m/s] | 8.5 |
| Compression ratio | | 20.5 |

TABLE 2 schedule of fuels tested (those in bold did not produce net work output even with inlet air at 150 deg C.)

| With Fumigation Main fuel composition (% by volume) | | | | With Heater Main fuel composition (% by volume) | | | | With Fumigation Main fuel composition (% by volume) | | | | With Heater Main fuel composition (% by volume) | | | |
|---|---|---|---|---|---|---|---|---|---|---|---|---|---|---|---|
| MeOH | Water | DME | DEE | MeOH | water | DME | DEE | MeOH | Water | DME | DEE | MeOH | water | DME | DEE |
| 100 | 0 | 0 | 0 | 100 | 0 | 0 | 0 | 40 | 50 | 10 | 0 | 40 | 50 | 10 | 0 |
| 95 | 5 | 0 | 0 | 85 | 15 | 0 | 0 | 25 | 65 | 10 | 0 | 25 | 65 | 10 | 0 |
| 90 | 10 | 0 | 0 | 77.5 | 22.5 | 0 | 0 | 80 | 0 | 20 | 0 | 80 | 0 | 20 | 0 |
| 70 | 30 | 0 | 0 | 70 | 30 | 0 | 0 | 75 | 5 | 20 | 0 | 65 | 15 | 20 | 0 |
| 50 | 50 | 0 | 0 | 50 | 50 | 0 | 0 | 70 | 10 | 20 | 0 | 57.5 | 22.5 | 20 | 0 |
| 35 | 65 | 0 | 0 | 35 | 65 | 0 | 0 | 50 | 30 | 20 | 0 | 50 | 30 | 20 | 0 |
| 95 | 0 | 5 | 0 | 95 | 0 | 5 | 0 | 30 | 50 | 20 | 0 | 30 | 50 | 20 | 0 |
| 90 | 5 | 5 | 0 | 80 | 15 | 5 | 0 | 15 | 65 | 20 | 0 | 15 | 65 | 20 | 0 |
| 85 | 10 | 5 | 0 | 72.5 | 22.5 | 5 | 0 | 90 | 0 | 0 | 10 | 90 | 0 | 0 | 10 |
| 65 | 30 | 5 | 0 | 65 | 30 | 5 | 0 | 85 | 5 | 0 | 10 | 75 | 15 | 0 | 10 |
| 45 | 50 | 5 | 0 | 45 | 50 | 5 | 0 | 80 | 10 | 0 | 10 | 67.5 | 22.5 | 0 | 10 |
| 30 | 65 | 5 | 0 | 30 | 65 | 5 | 0 | 60 | 30 | 0 | 10 | 60 | 30 | 0 | 10 |
| 90 | 0 | 10 | 0 | 90 | 0 | 10 | 0 | 40 | 50 | 0 | 10 | 40 | 50 | 0 | 10 |
| 85 | 5 | 10 | 0 | 75 | 15 | 10 | 0 | 25 | 65 | 0 | 10 | 25 | 65 | 0 | 10 |
| 80 | 10 | 10 | 0 | 67.5 | 22.5 | 10 | 0 | | | | | | | | |
| 60 | 30 | 10 | 0 | 60 | 30 | 10 | 0 | | | | | | | | |

TABLE 3

Diesel performance data

| | | | | | | | | | | | | |
|---|---|---|---|---|---|---|---|---|---|---|---|---|
| Diesel LHV (MJ/kg) | Tin °C. | Tout °C. | Injection Time DBTDC | Inj. Duration CAD | Lambda — | Speed rpm | Torque Nm | Power kW | Airflow g/s | Main Fuel g/s | DME Fum g/s | BTE % |
| 43 | 22.4 | 401 | 4 | 10 | 2.13 | 1975 | 22.1 | 4.6 | 13.1 | 0.46 | 0 | 23.0% |

TABLE 4

Diesel ADS9000 emissions data
Maha and ADS 9000 (calculated wet) Emissions

| Particulate mg/m^3 | NO ppm | NO g/kWh | Lambda — |
|---|---|---|---|
| 140 | 440 | 4.9 | 1.9 |

TABLE 5 performance data with DME fumigation

| With Fumigation Main fuel composition (% by volume) | | | | LHV MJ/kg | Tin °C. | Tout °C. | Inj. Time CAD BTDC | Inj. Duration CAD | Lambda UEGO | Speed rpm | Torque Nm | Power kW | Airflow g/s | Main Fuel g/s | DME g/s | BTE % |
|---|---|---|---|---|---|---|---|---|---|---|---|---|---|---|---|---|
| MeOH | water | DME | DEE | | | | | | | | | | | | | |
| 100 | 0 | 0 | 0 | 20.0 | 27 | 339 | 6 | 16 | 2.1 | 1977 | 18.4 | 3.8 | 12.8 | 0.69 | 0.168 | 20.3% |
| 95 | 5 | 0 | 0 | 18.8 | 26 | 318 | 6 | 18 | 2.1 | 1981 | 18.8 | 3.9 | 12.9 | 0.74 | 0.168 | 20.9% |
| 90 | 10 | 0 | 0 | 17.5 | 27 | 327 | 6 | 19 | 2.1 | 1985 | 17.9 | 3.7 | 12.9 | 0.75 | 0.168 | 20.7% |
| 70 | 30 | 0 | 0 | 13.0 | 26 | 301 | 6 | 22 | 2.1 | 1984 | 16.4 | 3.4 | 12.9 | 0.89 | 0.210 | 19.3% |
| 50 | 50 | 0 | 0 | 8.8 | 25 | 241 | 10 | 26 | 2.2 | 1984 | 12.5 | 2.6 | 12.9 | 1.01 | 0.252 | 16.0% |
| 35 | 65 | 0 | 0 | 6.0 | 25 | 191 | 28 | 34 | 2.1 | 1982 | 10.0 | 2.1 | 12.9 | 1.32 | 0.280 | 12.9% |
| 95 | 0 | 5 | 0 | 20.4 | 27 | 367 | 8 | 21 | 2.1 | 1981 | 20.5 | 4.3 | 12.9 | 0.77 | 0.168 | 20.7% |
| 90 | 5 | 5 | 0 | 19.1 | 27 | 349 | 12 | 21 | 2.1 | 1984 | 20.9 | 4.3 | 12.9 | 0.80 | 0.168 | 21.5% |
| 85 | 10 | 5 | 0 | 17.9 | 26 | 337 | 12 | 22 | 2.1 | 1980 | 20.0 | 4.1 | 12.9 | 0.80 | 0.168 | 21.7% |
| 65 | 30 | 5 | 0 | 13.3 | 24 | 296 | 16 | 28 | 2.1 | 1977 | 18.7 | 3.9 | 12.8 | 1.03 | 0.182 | 20.3% |
| 45 | 50 | 5 | 0 | 9.1 | 24 | 251 | 20 | 33 | 2.1 | 1979 | 14.8 | 3.1 | 12.8 | 1.20 | 0.238 | 17.2% |
| 30 | 65 | 5 | 0 | 6.2 | 24 | 194 | 30 | 34 | 2.0 | 1980 | 10.4 | 2.2 | 12.8 | 1.32 | 0.252 | 13.9% |
| 90 | 0 | 10 | 0 | 20.8 | 24 | 354 | 10 | 21 | 2.0 | 1979 | 21.7 | 4.5 | 12.8 | 0.80 | 0.168 | 20.9% |
| 85 | 5 | 10 | 0 | 19.5 | 24 | 352 | 12 | 23 | 2.0 | 1977 | 22.1 | 4.6 | 12.8 | 0.85 | 0.168 | 21.4% |

TABLE 5-continued performance data with DME fumigation

| With Fumigation Main fuel composition (% by volume) | | | | LHV | Tin | Tout | Inj. Time CAD | Inj. Duration | Lambda | Speed | Torque | Power | Airflow | Main Fuel | DME | BTE |
|---|---|---|---|---|---|---|---|---|---|---|---|---|---|---|---|---|
| MeOH | water | DME | DEE | MJ/kg | °C. | °C. | BTDC | CAD | UEGO | rpm | Nm | kW | g/s | g/s | g/s | % |
| 80 | 10 | 10 | 0 | 18.2 | 23 | 335 | 16 | 21 | 2.0 | 1977 | 21.7 | 4.5 | 12.8 | 0.83 | 0.168 | 22.3% |
| 60 | 30 | 10 | 0 | 13.6 | 24 | 294 | 18 | 25 | 2.0 | 1979 | 18.6 | 3.9 | 12.8 | 0.98 | 0.182 | 20.8% |
| 40 | 50 | 10 | 0 | 9.4 | 24 | 258 | 20 | 30 | 2.0 | 1983 | 15.6 | 3.2 | 12.9 | 1.18 | 0.238 | 18.0% |
| 25 | 65 | 10 | 0 | 6.4 | 24 | 180 | 30 | 32 | 2.3 | 1976 | 8.3 | 1.7 | 12.8 | 1.19 | 0.266 | 11.2% |
| 80 | 0 | 20 | 0 | 21.6 | 24 | 353 | 10 | 19 | 2.0 | 1980 | 22.0 | 4.6 | 12.8 | 0.72 | 0.210 | 21.1% |
| 75 | 5 | 20 | 0 | 20.2 | 26 | 352 | 10 | 19 | 2.1 | 1981 | 21.1 | 4.4 | 12.9 | 0.69 | 0.210 | 21.8% |
| 70 | 10 | 20 | 0 | 19.0 | 24 | 327 | 10 | 18 | 2.1 | 1977 | 19.6 | 4.1 | 12.8 | 0.73 | 0.210 | 20.3% |
| 50 | 30 | 20 | 0 | 14.2 | 23 | 300 | 16 | 23 | 2.1 | 1976 | 17.4 | 3.6 | 12.8 | 0.86 | 0.238 | 18.9% |
| 30 | 50 | 20 | 0 | 9.9 | 23 | 271 | 18 | 30 | 2.0 | 1978 | 15.0 | 3.1 | 12.8 | 1.09 | 0.266 | 16.8% |
| 15 | 65 | 20 | 0 | 6.9 | 22 | 204 | 30 | 46 | 2.2 | 1978 | 10.7 | 2.2 | 12.8 | 1.27 | 0.308 | 12.6% |
| 90 | 0 | 0 | 10 | 21.3 | 33 | 377 | 6 | 16 | 2.1 | 1987 | 19.2 | 4.0 | 12.9 | 0.69 | 0.168 | 20.4% |
| 85 | 5 | 0 | 10 | 20.1 | 32 | 381 | 6 | 20 | 2.0 | 1986 | 19.5 | 4.1 | 12.9 | 0.74 | 0.168 | 20.6% |
| 80 | 10 | 0 | 10 | 18.8 | 31 | 344 | 10 | 20 | 2.1 | 1987 | 19.1 | 4.0 | 12.9 | 0.77 | 0.168 | 20.6% |
| 60 | 30 | 0 | 10 | 14.1 | 30 | 313 | 12 | 24 | 2.1 | 1987 | 17.9 | 3.7 | 12.9 | 0.93 | 0.182 | 20.2% |
| 40 | 50 | 0 | 10 | 9.9 | 30 | 279 | 16 | 32 | 1.9 | 1985 | 16.6 | 3.4 | 12.9 | 1.34 | 0.224 | 17.4% |
| 25 | 65 | 0 | 10 | 7.0 | 30 | 210 | 30 | 38 | 2.1 | 1989 | 11.3 | 2.4 | 12.91 | 1.34 | 0.266 | 13.8% |

TABLE 6 performance data with heated inlet air

| With Heater Main fuel composition (% by volume) | | | | LHV | Tin | Tout | Inj. Time CAD | Inj. Duration | Lambda | Speed | Torque | Power | Airflow | Main Fuel | DME | BTE |
|---|---|---|---|---|---|---|---|---|---|---|---|---|---|---|---|---|
| MeOH | water | DME | DEE | (MJ/kg) | °C. | °C. | BTDC | CAD | UEGO | rpm | Nm | kW | g/s | g/s | g/s | % |
| 100 | 0 | 0 | 0 | 20.0 | 100.0 | 377 | 10 | 16 | 2.01 | 1988 | 12.2 | 2.5 | 10.4 | 0.73 | 0 | 17.5% |
| 85 | 15 | 0 | 0 | 16.4 | 107.5 | 334 | 14 | 18 | 2.08 | 1992 | 10.6 | 2.2 | 10.3 | 0.79 | 0 | 17.2% |
| 77.5 | 22.5 | 0 | 0 | 14.6 | 126.1 | 307 | 16 | 19 | 2.10 | 1991 | 7.4 | 1.5 | 9.8 | 0.84 | 0 | 12.5% |
| 95 | 0 | 5 | 0 | 20.4 | 106.8 | 357 | 10 | 14 | 2.10 | 1987 | 10.6 | 2.2 | 10.3 | 0.61 | 0 | 17.7% |
| 80 | 15 | 5 | 0 | 16.7 | 108.3 | 348 | 12 | 18 | 2.04 | 1983 | 10.6 | 2.2 | 10.2 | 0.74 | 0 | 17.7% |
| 72.5 | 22.5 | 5 | 0 | 15.0 | 120.5 | 339 | 16 | 20 | 1.94 | 1981 | 9.5 | 2.0 | 9.9 | 0.83 | 0 | 15.8% |
| 90 | 0 | 10 | 0 | 20.8 | 114.0 | 381 | 10 | 17 | 1.99 | 1988 | 11.1 | 2.3 | 10.1 | 0.65 | 0 | 17.2% |
| 75 | 15 | 10 | 0 | 17.0 | 113.6 | 333 | 12 | 17 | 2.13 | 1987 | 10.1 | 2.1 | 10.1 | 0.72 | 0 | 17.1% |
| 67.5 | 22.5 | 10 | 0 | 15.28 | 105.9 | 347 | 14 | 20 | 2.03 | 1989 | 11.2 | 2.3 | 10.3 | 0.86 | 0 | 17.8% |
| 80 | 0 | 20 | 0 | 21.6 | 113.4 | 378 | 10 | 15 | 2.10 | 1989 | 10.6 | 2.2 | 10.1 | 0.60 | 0 | 17.1% |
| 65 | 15 | 20 | 0 | 17.7 | 106.5 | 337 | 14 | 18 | 2.11 | 1990 | 10.7 | 2.2 | 10.3 | 0.71 | 0 | 17.7% |
| 57.5 | 22.5 | 20 | 0 | 15.9 | 117.8 | 336 | 16 | 20 | 2.05 | 1991 | 9.5 | 2.0 | 10.0 | 0.78 | 0 | 16.0% |
| 90 | 0 | 0 | 10 | 21.3 | 100.7 | 365 | 10 | 16 | 2.04 | 1984 | 12.0 | 2.5 | 10.4 | 0.67 | 0 | 17.5% |
| 75 | 15 | 0 | 10 | 17.6 | 111.9 | 327 | 12 | 17 | 2.15 | 1990 | 9.9 | 2.1 | 10.1 | 0.72 | 0 | 16.3% |
| 67.5 | 22.5 | 0 | 10 | 15.9 | 124.6 | 320 | 14 | 18 | 2.03 | 1988 | 8.4 | 1.8 | 9.8 | 0.76 | 0 | 14.6% |

TABLE 7

MAHA and ADS 9000 (calculated wet) emissions with DME fumigation

| With Fumigation Main fuel composition (% by volume) | | | | Maha and ADS 9000 (calculated wet) Emissions | | | |
|---|---|---|---|---|---|---|---|
| | | | | Particulate | NO | NO | Lambda |
| MeOH | water | DME | DEE | mg/m^3 | ppm | g/kWh | — |
| 100 | 0 | 0 | 0 | 1 | 106 | 1.5 | 2.0 |
| 95 | 5 | 0 | 0 | 1 | 89 | 1.2 | 2.0 |
| 90 | 10 | 0 | 0 | 1 | 37 | 0.5 | 2.0 |
| 70 | 30 | 0 | 0 | 1 | 12 | 0.2 | 2.1 |
| 50 | 50 | 0 | 0 | 1 | 11 | 0.2 | 2.2 |
| 35 | 65 | 0 | 0 | 1 | 18 | 0.5 | 2.2 |
| 95 | 0 | 5 | 0 | 1 | 57 | 0.7 | 1.9 |
| 90 | 5 | 5 | 0 | 1 | 141 | 1.7 | 1.9 |
| 85 | 10 | 5 | 0 | 1 | 83 | 1.1 | 2.0 |
| 65 | 30 | 5 | 0 | 1 | 19 | 0.3 | 2.0 |
| 45 | 50 | 5 | 0 | 1 | 19 | 0.4 | 2.1 |
| 30 | 65 | 5 | 0 | 1 | 21 | 0.6 | 2.3 |
| 90 | 0 | 10 | 0 | 1 | 99 | 1.2 | 1.9 |
| 85 | 5 | 10 | 0 | 1 | 97 | 1.1 | 1.9 |
| 80 | 10 | 10 | 0 | 1 | 192 | 2.3 | 1.9 |
| 60 | 30 | 10 | 0 | 1 | 17 | 0.2 | 2.0 |

TABLE 7-continued

MAHA and ADS 9000 (calculated wet) emissions with DME fumigation

| With Fumigation Main fuel composition (% by volume) | | | | Maha and ADS 9000 (calculated wet) Emissions | | | |
|---|---|---|---|---|---|---|---|
| | | | | Particulate | NO | NO | Lambda |
| MeOH | water | DME | DEE | mg/m^3 | ppm | g/kWh | — |
| 40 | 50 | 10 | 0 | 1 | 12 | 0.2 | 2.1 |
| 25 | 65 | 10 | 0 | 1 | 28 | 0.9 | 2.4 |
| 80 | 0 | 20 | 0 | 1 | 111 | 1.3 | 1.9 |
| 75 | 5 | 20 | 0 | 1 | 153 | 1.8 | 1.9 |
| 70 | 10 | 20 | 0 | 1 | 88 | 1.1 | 2.0 |
| 50 | 30 | 20 | 0 | 1 | 54 | 0.8 | 2.0 |
| 30 | 50 | 20 | 0 | 1 | 9 | 0.2 | 2.0 |
| 15 | 65 | 20 | 0 | 1 | 15 | 0.4 | 2.2 |
| 90 | 0 | 0 | 10 | 1 | 92 | 1.2 | 1.9 |
| 85 | 5 | 0 | 10 | 1 | 72 | 0.9 | 1.9 |
| 80 | 10 | 0 | 10 | 1 | 65 | 0.9 | 1.9 |
| 60 | 30 | 0 | 10 | 1 | 21 | 0.3 | 2.0 |
| 40 | 50 | 0 | 10 | 1 | 15 | 0.2 | 2.0 |
| 25 | 65 | 0 | 10 | 1 | 20 | 0.5 | 2.2 |

TABLE 8

MAHA and ADS 9000 (calculated wet) emissions with heated inlet air

| With Heater Main fuel composition (% by volume) | | | | Maha and ADS 9000 (calculated wet) Emissions | | | |
|---|---|---|---|---|---|---|---|
| | | | | Particulate | NO | NO | Lambda |
| MeOH | water | DME | DEE | mg/m^3 | ppm | g/kWh | — |
| 100 | 0 | 0 | 0 | 1 | 355 | 5.93 | 2.0 |
| 85 | 15 | 0 | 0 | 1 | 158 | 3.02 | 2.0 |
| 77.5 | 22.5 | 0 | 0 | 1 | 85 | 2.27 | 2.1 |
| 95 | 0 | 5 | 0 | 1 | 356 | 6.65 | 2.1 |
| 80 | 15 | 5 | 0 | 1 | 146 | 2.79 | 2.0 |
| 72.5 | 22.5 | 5 | 0 | 1 | 100 | 2.09 | 2.0 |
| 90 | 0 | 10 | 0 | 1 | 371 | 6.55 | 2.0 |
| 75 | 15 | 10 | 0 | 1 | 136 | 2.67 | 2.1 |
| 67.5 | 22.5 | 10 | 0 | 1 | 106 | 1.94 | 2.1 |
| 80 | 0 | 20 | 0 | 1 | 358 | 6.54 | 2.1 |
| 65 | 15 | 20 | 0 | 1 | 249 | 4.68 | 2.0 |
| 57.5 | 22.5 | 20 | 0 | 1 | 139 | 2.90 | 2.0 |
| 90 | 0 | 0 | 10 | 1 | 290 | 4.89 | 2.0 |
| 75 | 15 | 0 | 10 | 1 | 187 | 3.73 | 2.1 |
| 67.5 | 22.5 | 0 | 10 | 1 | 139 | 3.20 | 2.1 |

TABLE 9 combustion analysis data with DME fumigation

| With Fumigation Main fuel composition (% by volume) | | | | Combustion Analysis | | | | | | |
|---|---|---|---|---|---|---|---|---|---|---|
| | | | | IMEP | PMEP | PP | LPP | PPRR | LPPRR | CoV |
| MeOH | water | DME | DEE | kPa | kPa | kPa | DATDC | kPa/deg | CA | % |
| 100 | 0 | 0 | 0 | 717.5 | −28.0 | 8466.5 | 6.5 | 357.4 | −12.4 | 2.33% |
| 95 | 5 | 0 | 0 | 723.3 | −28.6 | 9195.1 | 5.3 | 390.1 | −2.2 | 3.93% |
| 90 | 10 | 0 | 0 | 701.9 | −27.9 | 8277.2 | 5.9 | 355.4 | −12.5 | 2.39% |
| 70 | 30 | 0 | 0 | 666.2 | −27.2 | 8194.6 | 6.4 | 388.3 | −12.9 | 4.10% |
| 50 | 50 | 0 | 0 | 577.2 | −27.1 | 9624.9 | 3.3 | 490.6 | −14.3 | 3.82% |
| 35 | 65 | 0 | 0 | 535.3 | −25.5 | 10573.9 | 2.9 | 430.2 | −6.0 | 3.67% |
| 95 | 0 | 5 | 0 | 776.4 | −29.3 | 8457.0 | 5.7 | 319.4 | −11.5 | 3.75% |
| 90 | 5 | 5 | 0 | 773.3 | −29.0 | 9387.6 | 5.1 | 465.8 | −0.8 | 4.16% |
| 85 | 10 | 5 | 0 | 756.3 | −28.5 | 9340.8 | 4.9 | 431.3 | −1.1 | 4.66% |
| 65 | 30 | 5 | 0 | 740.4 | −28.9 | 9931.3 | 4.2 | 483.6 | −1.4 | 3.46% |
| 45 | 50 | 5 | 0 | 670.0 | −27.7 | 9767.1 | 4.8 | 395.5 | −12.9 | 4.29% |
| 30 | 65 | 5 | 0 | 570.1 | −26.9 | 10951.5 | 2.5 | 466.6 | −4.5 | 4.37% |
| 90 | 0 | 10 | 0 | 775.3 | −29.4 | 9003.2 | 5.5 | 344.9 | −9.3 | 3.94% |
| 85 | 5 | 10 | 0 | 771.7 | −29.0 | 9320.6 | 4.9 | 405.6 | −1.7 | 3.47% |
| 80 | 10 | 10 | 0 | 781.8 | −28.5 | 10387.8 | 4.0 | 548.1 | −5.3 | 4.24% |
| 60 | 30 | 10 | 0 | 708.4 | −25.1 | 10361.1 | 3.3 | 580.2 | −4.0 | 3.73% |
| 40 | 50 | 10 | 0 | 656.1 | −25.2 | 10675.0 | 2.5 | 502.5 | −4.5 | 2.41% |
| 25 | 65 | 10 | 0 | 583.6 | −26.8 | 10161.1 | 4.1 | 373.3 | −11.5 | 2.92% |
| 80 | 0 | 20 | 0 | 796.8 | −29.3 | 9159.7 | 5.4 | 352.4 | −10.3 | 2.93% |
| 75 | 5 | 20 | 0 | 802.3 | −29.9 | 9286.8 | 5.4 | 366.5 | −12.5 | 3.09% |
| 70 | 10 | 20 | 0 | 755.6 | −27.9 | 9425.7 | 5.2 | 394.6 | −13.1 | 4.05% |
| 50 | 30 | 20 | 0 | * | | | | | | |
| 30 | 50 | 20 | 0 | * | | | | | | |
| 15 | 65 | 20 | 0 | * | | | | | | |
| 90 | 0 | 0 | 10 | 738.6 | −30.2 | 7752.5 | 5.7 | 345.2 | −13.0 | 4.62% |
| 85 | 5 | 0 | 10 | 747.2 | −29.9 | 8036.1 | 5.6 | 334.5 | −12.9 | 3.67% |
| 80 | 10 | 0 | 10 | 738.3 | −28.5 | 8916.7 | 5.4 | 344.0 | −9.3 | 3.24% |
| 60 | 30 | 0 | 10 | 708.2 | −28.3 | 9197.5 | 4.7 | 365.3 | −8.1 | 3.90% |
| 40 | 50 | 0 | 10 | 664.7 | −26.6 | 9777.8 | 3.7 | 417.9 | −14.2 | 3.90% |
| 25 | 65 | 0 | 10 | 572.4 | −24.5 | 10794.8 | 2.9 | 468.6 | −3.8 | 4.35% |

* These entries were unavailable due to failure of the pressure transducer during testing.

TABLE 10 combustion analysis data with heated inlet air

| With Heater Main fuel composition (% by volume) | | | | Combustion Analysis | | | | | | |
|---|---|---|---|---|---|---|---|---|---|---|
| | | | | IMEP | PMEP | PP | LPP | PPRR | LPPRR | CoV |
| MeOH | water | DME | DEE | kPa | kPa | kPa | DATDC | kPa/deg | DATDC | % |
| 100 | 0 | 0 | 0 | 523.4 | −21.5 | 7614.1 | 5.9 | 373.2 | −0.4 | 4.72% |
| 85 | 15 | 0 | 0 | 517.1 | −21.3 | 7900.8 | 5.7 | 481.3 | 0.5 | 4.42% |
| 77.5 | 22.5 | 0 | 0 | 431.0 | −17.0 | 7420.6 | 5.6 | 390.8 | 0.0 | 4.11% |
| 95 | 0 | 5 | 0 | 531.3 | −20.4 | 7402.2 | 6.4 | 370.7 | 0.9 | 4.36% |
| 80 | 15 | 5 | 0 | 556.3 | −21.7 | 7440.5 | 5.8 | 382.4 | 1.6 | 5.22% |
| 72.5 | 22.5 | 5 | 0 | 505.6 | −19.8 | 7963.9 | 4.9 | 524.1 | −1.1 | 3.90% |
| 90 | 0 | 10 | 0 | 528.6 | −20.3 | 7391.3 | 6.0 | 381.6 | 1.7 | 5.22% |
| 75 | 15 | 10 | 0 | 505.3 | −20.3 | 7408.9 | 5.7 | 399.9 | 0.9 | 4.20% |
| 67.5 | 22.5 | 10 | 0 | 486.5 | −19.4 | 7595.2 | 5.6 | 440.6 | 0.1 | 4.64% |
| 80 | 0 | 20 | 0 | 535.7 | −19.9 | 7089.4 | 5.9 | 328.3 | −0.8 | 4.08% |
| 65 | 15 | 20 | 0 | 554.7 | −20.2 | 7807.8 | 5.8 | 466.6 | −0.3 | 4.17% |
| 57.5 | 22.5 | 20 | 0 | 489.6 | −18.8 | 7861.2 | 4.7 | 509.5 | −1.4 | 4.54% |
| 90 | 0 | 0 | 10 | 557.2 | −21.6 | 7493.1 | 6.5 | 384.3 | 1.6 | 3.75% |
| 75 | 15 | 0 | 10 | 511.9 | −20.9 | 7585.1 | 6.6 | 406.1 | 2.8 | 4.66% |
| 67.5 | 22.5 | 0 | 10 | 478.7 | −20.3 | 7636.8 | 5.2 | 464.9 | −0.9 | 3.50% |

1.5 Further Test Work

Further test work was conducted to explore additional fuel and fumigant combinations, and the results of those tests are summarized in Tables 11 and 12 below. Of note is the following:

Overall, the engine efficiencies at 1000 rpm are lower than for the same or similar fuels at higher engine speeds. This is based on the fact that the unmodified Hatz engine had a peak efficiency at approximately 2000 rpm, and was to be expected. When used in larger engines designed for peak efficiency at a lower rpm, the efficiencies using the fuels would be improved.

Emissions of NO using the ADS9000 device are not presented due to failure of this sensor during this testing programme.

The fuel injector failed during test number 25. The data logged for this test still appeared to be reasonable, as the failure was late in the test, and so is included in this Addendum. Of note is the comparative performance of runs 25 and 27, which have very similar main fuel composition, other than the additives.

TABLE 11 performance data with DME fumigation

| | Fumigated | | | | | | | | | | | | | | | |
|---|---|---|---|---|---|---|---|---|---|---|---|---|---|---|---|---|
| Run | Main % by Vol | | | Additives by weight | | | | | Main fuel composition with additives (% by mass) | | | | | | | LHV |
| No | MeOH | EthOH | water | DME | DEE | Formal. | Aspro. | Other | MeOH | EthOH | water | DME | DEE | Formal. | Aspro. | Other | (MJ/kg) |
| 22 | 70 | 0 | 30 | 0 | 0 | 0 | 0 | 0 | 64.9 | 0.0 | 35.1 | 0 | 0 | 0 | 0 | 0 | 13.0 |
| 23 | 70 | 0 | 30 | 0 | 0 | 0 | 0 | 0 | 64.9 | 0.0 | 35.1 | 0 | 0 | 0 | 0 | 0 | 13.0 |
| 24 | 70 | 0 | 30 | 0 | 0 | 0 | 0 | 0 | 64.9 | 0.0 | 35.1 | 0 | 0 | 0 | 0 | 0 | 13.0 |
| 25 | — | — | — | 0 | 0 | 0 | 2.5 | 0.4 | 93.2 | 0.0 | 3.9 | 0 | 0 | 0 | 2.5 | 0.4 | 18.6 |
| 27 | — | — | — | 0 | 0 | 2 | 0 | 0.4 | 93.7 | 0.0 | 3.9 | 0 | 0 | 2 | 0 | 0.4 | 18.7 |
| 28 | — | — | — | 0 | 0 | 0 | 0 | 0.4 | 79.7 | 0.0 | 19.9 | 0 | 0 | 0 | 0 | 0.4 | 15.9 |
| 29 | — | — | — | 0 | 0 | 0 | 0 | 0 | 40 | 0.0 | 60.0 | 0 | 0 | 0 | 0 | 0.0 | 8.0 |
| 30 | — | — | — | 0 | 0 | 0 | 0 | 0 | 93 | 0.0 | 7.0 | 0 | 0 | 0 | 0 | 0.0 | 18.6 |
| 24rep | 70 | 0 | 30 | 0 | 0 | 0 | 0 | 0 | 64.9 | 0.0 | 35.1 | 0 | 0 | 0 | 0 | 0 | 13 |

| | | | Performance Data | | | | | | | |
|---|---|---|---|---|---|---|---|---|---|---|
| Run No | Tin deg C. | Tout deg C. | Injection Time CAD BTDC | Lambda UEGO | Speed rpm | Torque Nm | Power kW | Airflow g/s | Main Fuel g/s | DME g/s | BTE % |
| 22 | 39 | 209 | 0 | 2.1 | 1000 | 9.1 | 1.0 | 6.3 | 0.41 | 0.047 | 14.4% |
| 23 | 56 | 214 | 0 | 2.0 | 998 | 8.3 | 0.9 | 5.9 | 0.41 | 0.039 | 13.4% |
| 24 | 81 | 216 | 0 | 2.1 | 999 | 4.8 | 0.5 | 5.5 | 0.38 | 0.032 | 8.6% |
| 25 | 32 | 228 | 0 | 2.0 | 992 | 12.1 | 1.3 | 6.4 | 0.31 | 0.05 | 17.5% |
| 27 | 26 | 233 | 0 | 2.1 | 994 | 12.3 | 1.3 | 6.5 | 0.32 | 0.043 | 17.6% |
| 28 | 26 | 220 | 0 | 2.1 | 993 | 10.8 | 1.1 | 6.5 | 0.34 | 0.056 | 16.0% |
| 29 | 26 | 193 | 0 | 2.1 | 990 | 7.0 | 0.7 | 6.5 | 0.52 | 0.102 | 10.2% |
| 30 | 78 | 339 | 0 | 2.1 | 1978 | 11.1 | 2.3 | 11.0 | 0.67 | 0.106 | 14.7% |
| 24rep | 83 | 224 | 0 | 2.0 | 995 | 5.9 | 0.6 | 5.5 | 0.39 | 0.031 | 10.4% |

TABLE 11-continued performance data with DME fumigation

| | Maha and ADS 9000 (calculated wet) Emissions | | | |
|---|---|---|---|---|
| Run No | Particulate mg/m^3 | NO ppm | NO g/kWh | Lambda — |
| 22 | 1 | — | — | 2.1 |
| 23 | 1 | — | — | 2.2 |
| 24 | 1 | — | — | 2.1 |
| 25 | 1 | — | — | 1.9 |
| 27 | 1 | — | — | 2.1 |
| 28 | 1 | — | — | 2.1 |
| 29 | 1 | — | — | 2.1 |
| 30 | 1.2 | — | — | 2.1 |
| 24rep | 1 | — | — | 2.0 |

TABLE 12 performance data with heated inlet air

| | With Heater | | | | | | | | | | | | | | | | |
|---|---|---|---|---|---|---|---|---|---|---|---|---|---|---|---|---|---|
| Run | Main % by Vol | | | | | | | Main fuel composition with additives (% by mass) | | | | | | | | LHV |
| No | MeOH | EthOH | water | DME | DEE | Formal. | Aspro. | Other | MeOH | EthOH | water | DME | DEE | Formal. | Aspro. | Other | (MJ/kg) |
| 3 | 70 | 0 | 30 | 5 | 0 | 0 | 0 | 0 | 61.7 | 0.0 | 33.3 | 5 | 0 | 0 | 0 | 0 | 13.8 |
| 6 | 70 | 0 | 30 | 0 | 8 | 0 | 0 | 0 | 59.7 | 0.0 | 32.3 | 0 | 8 | 0 | 0 | 0 | 14.7 |
| 7 | 70 | 0 | 30 | 0 | 20 | 0 | 0 | 0 | 51.9 | 0.0 | 28.1 | 0 | 20 | 0 | 0 | 0 | 17.2 |
| 8 | 70 | 0 | 30 | 20 | 0 | 0 | 0 | 0 | 51.9 | 0.0 | 28.1 | 20 | 0 | 0 | 0 | 0 | 16.2 |
| 11 | 70 | 0 | 30 | 0 | 0 | 4 | 0 | 0 | 62.3 | 0.0 | 33.7 | 0 | 0 | 4 | 0 | 0 | 12.5 |
| 18 | 70 | 0 | 30 | 0 | 0 | 1 | 0 | 0 | 64.3 | 0.0 | 34.7 | 0 | 0 | 1 | 0 | 0 | 12.9 |
| 21 | 20 | 50 | 30 | 5 | 0 | 0 | 0 | 0 | 17.5 | 44.3 | 33.2 | 5 | 0 | 0 | 0 | 0 | 16.9 |

| | Performance Data | | | | | | | | | | |
|---|---|---|---|---|---|---|---|---|---|---|---|
| Run No | Tin deg C. | Tout deg C. | Injection Time DBTDC | Lambda UEGO | Speed rpm | Torque Nm | Power kW | Airflow g/s | Main Fuel g/s | DME Fum g/s | BTE % |
| 3 | 141.1 | 229.2 | 0 | 2.06 | 995 | 3.4 | 0.4 | 4.7 | 0.41 | — | 6.5% |
| 6 | 154.7 | 229 | 0 | 2.08 | 993 | 2.0 | 0.2 | 4.6 | 0.33 | — | 4.2% |
| 7 | 155.4 | 237 | 0 | 2.09 | 991 | 2.3 | 0.2 | 4.5 | 0.29 | — | 4.7% |
| 8 | 149.6 | 244 | 0 | 2.02 | 996 | 3.2 | 0.3 | 4.6 | 0.32 | — | 6.3% |
| 11 | | | | | Did not fire | | | | | | |
| 18 | | | | | Did not fire | | | | | | |
| 21 | 150.8 | 246 | 0 | 2.03 | 994 | 3.2 | 0.3 | 4.6 | 0.28 | — | 7.0% |

| | Maha and ADS 9000 (calculated wet) Emissions | | | |
|---|---|---|---|---|
| Run No | Particulate mg/m^3 | NO ppm | NO g/kWh | Lambda — |
| 3 | 1 | — | — | 2.0 |
| 6 | 1 | — | — | 2.2 |
| 7 | 1 | — | — | 2.2 |
| 8 | 1 | — | — | 2.1 |
| 11 | — | — | — | — |
| 18 | — | — | — | — |
| 21 | 1 | — | — | 2.1 |

1.5 Comparison Tables Between % Volume and % Mass in Fuel Compositions

The tables in the test results outlined at 1.1 to 1.4 above are based on relative amounts of components in the main fuel composition measured by volume. The following tables 13 and 14 enable a conversion to be made between volume and weight % for the fuel compositions.

TABLE 13

Comparison tables between % volume and % mass - Fumigation

| With Fumigation Main fuel composition (% by volume) | | | | Main fuel composition (% by mass) | | | |
|---|---|---|---|---|---|---|---|
| MeOH | water | DME | DEE | MeOH | water | DME | DEE |
| 100 | 0 | 0 | 0 | 100.0 | 0.0 | 0.0 | 0.0 |
| 95 | 5 | 0 | 0 | 93.8 | 6.2 | 0.0 | 0.0 |

TABLE 13-continued

Comparison tables between % volume and % mass - Fumigation

| With Fumigation Main fuel composition (% by volume) | | | | Main fuel composition (% by mass) | | | |
|---|---|---|---|---|---|---|---|
| MeOH | water | DME | DEE | MeOH | water | DME | DEE |
| 90 | 10 | 0 | 0 | 87.7 | 12.3 | 0.0 | 0.0 |
| 70 | 30 | 0 | 0 | 64.9 | 35.1 | 0.0 | 0.0 |
| 50 | 50 | 0 | 0 | 44.2 | 55.8 | 0.0 | 0.0 |
| 35 | 65 | 0 | 0 | 29.9 | 70.1 | 0.0 | 0.0 |
| 95 | 0 | 5 | 0 | 95.8 | 0.0 | 4.2 | 0.0 |
| 90 | 5 | 5 | 0 | 89.5 | 6.3 | 4.2 | 0.0 |
| 85 | 10 | 5 | 0 | 83.4 | 12.4 | 4.1 | 0.0 |
| 65 | 30 | 5 | 0 | 60.7 | 35.4 | 3.9 | 0.0 |
| 45 | 50 | 5 | 0 | 40.0 | 56.2 | 3.8 | 0.0 |
| 30 | 65 | 5 | 0 | 25.8 | 70.6 | 3.6 | 0.0 |
| 90 | 0 | 10 | 0 | 91.4 | 0.0 | 8.6 | 0.0 |
| 85 | 5 | 10 | 0 | 85.2 | 6.3 | 8.5 | 0.0 |
| 80 | 10 | 10 | 0 | 79.1 | 12.5 | 8.3 | 0.0 |
| 60 | 30 | 10 | 0 | 56.4 | 35.7 | 7.9 | 0.0 |
| 40 | 50 | 10 | 0 | 35.8 | 56.6 | 7.6 | 0.0 |
| 25 | 65 | 10 | 0 | 21.6 | 71.1 | 7.3 | 0.0 |
| 80 | 0 | 20 | 0 | 82.6 | 0.0 | 17.4 | 0.0 |
| 75 | 5 | 20 | 0 | 76.4 | 6.4 | 17.2 | 0.0 |
| 70 | 10 | 20 | 0 | 70.3 | 12.7 | 16.9 | 0.0 |
| 50 | 30 | 20 | 0 | 47.7 | 36.2 | 16.1 | 0.0 |
| 30 | 50 | 20 | 0 | 27.3 | 57.4 | 15.3 | 0.0 |
| 15 | 65 | 20 | 0 | 13.2 | 72.1 | 14.8 | 0.0 |
| 90 | 0 | 0 | 10 | 90.9 | 0.0 | 0.0 | 9.1 |
| 85 | 5 | 0 | 10 | 84.7 | 6.3 | 0.0 | 9.0 |
| 80 | 10 | 0 | 10 | 78.7 | 12.4 | 0.0 | 8.9 |
| 60 | 30 | 0 | 10 | 56.1 | 35.5 | 0.0 | 8.4 |
| 40 | 50 | 0 | 10 | 35.6 | 56.3 | 0.0 | 8.0 |
| 25 | 65 | 0 | 10 | 21.5 | 70.7 | 0.0 | 7.8 |

TABLE 14

Comparison tables between % volume and % mass - Inlet Air Preheating

| With Heater Main fuel composition (% by volume) | | | | Main fuel composition (% by mass) | | | |
|---|---|---|---|---|---|---|---|
| MeOH | water | DME | DEE | MeOH | water | DME | DEE |
| 100 | 0 | 0 | 0 | 100.0 | 0.0 | 0.0 | 0.0 |
| 85 | 15 | 0 | 0 | 81.8 | 18.2 | 0.0 | 0.0 |
| 77.5 | 22.5 | 0 | 0 | 73.2 | 26.8 | 0.0 | 0.0 |
| 95 | 0 | 5 | 0 | 95.7 | 0.0 | 4.3 | 0.0 |
| 80 | 15 | 5 | 0 | 77.6 | 18.3 | 4.1 | 0.0 |
| 72.5 | 22.5 | 5 | 0 | 69.0 | 27.0 | 4.0 | 0.0 |
| 90 | 0 | 10 | 0 | 91.4 | 0.0 | 8.6 | 0.0 |
| 75 | 15 | 10 | 0 | 73.3 | 18.5 | 8.2 | 0.0 |
| 67.5 | 22.5 | 10 | 0 | 64.7 | 27.2 | 8.1 | 0.0 |
| 80 | 0 | 20 | 0 | 82.6 | 0.0 | 17.4 | 0.0 |
| 65 | 15 | 20 | 0 | 64.5 | 18.8 | 16.8 | 0.0 |
| 57.5 | 22.5 | 20 | 0 | 55.9 | 27.6 | 16.4 | 0.0 |
| 90 | 0 | 0 | 10 | 90.9 | 0.0 | 0.0 | 9.1 |
| 75 | 15 | 0 | 10 | 72.9 | 18.4 | 0.0 | 8.8 |
| 67.5 | 22.5 | 0 | 10 | 64.3 | 27.1 | 0.0 | 8.6 |

1.6 Observations on the Test Results Reported in Sections 1.1 to 1.5.

Water and Ether Plus DME Fumigant:

The work reported above demonstrates that that water has some key properties which make it a useful addition to a methanol fuel:

1. If injected with the combustible methanol fuel, up to a point, the efficiency does not decrease but rather increases to an optimal point, and then decreases as the proportion of water continues to rise. It has been postulated by the applicants that the increase in efficiency may be due to a combination of factors such as the following factors:
   a. the spectral properties of water such as emissivity and absorption coefficient are superior relative to methanol across the heating (eg infrared IR) band, which assists in the uptake of radiant heat into the droplets of mixed fuel and water, as the methanol evaporates from the droplet at an accelerated rate, since methanol would share this higher rate of heat uptake and vaporise first. The emissivity of water is reported in the literature is between 0.9 and 1.0 ie nearly a blackbody to infrared radiation, while methanol is less than half that value at close to 0.4.
   b. The thermal conductivity of water is greater than methanol
   c. The thermal diffusivity of water is greater than methanol.
   d. Points b. and c. above would lead to greater transfer of heat within a droplet with water present, again accelerating the conversion of liquid phase methanol to gas as methanol concentration decreases as the droplets shrink:

| | THERMAL DIFFUSIVITY MM2/SEC | THERMAL CONDUCTIVITY W/K · M |
|---|---|---|
| 100% METHANOL | 0.103 | 0.199 |
| 75% METHANOL | 0.102 | 0.250 |
| 50% METHANOL | 0.106 | 0.340 |
| 25% METHANOL | 0.118 | 0.470 |
| 100% WATER | 0.149 | 0.605 |

Taken from Thermochimica Acta 492 (2009) p95-100

Figure 7:
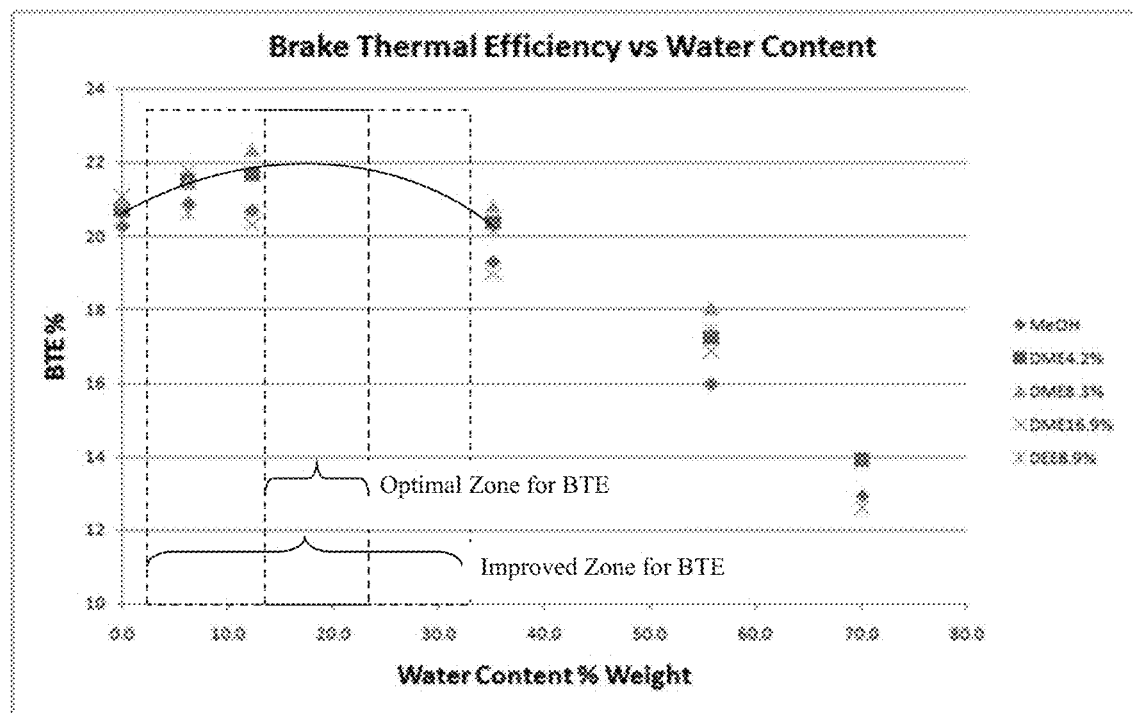
FIG. 7 is a graph illustrating the Brake Thermal Efficiency of a compression ignition engine with fumigation of DME using main fuels containing varying amounts of water and amounts of methanol, DME and DEE in the liquid phase.

2. The work reported above provides evidence of the viability of a water methanol fuel through the demonstration of its smooth operation when running even at high water levels with a suitable amount of ignition assistance in terms of fumigant. From the data presented in FIG. 7, which is derived from the work reported above, it is shown that there is a peak of break thermal efficiency achieved when the water content is in the range of about 12% to 23% by weight of the main fuel composition. The zone of improved BTE is for water contents between 2% and 32%, with an optimum being achieved in the region of close to 16-18% with DME fumigant. This was a surprising result. It was unexpected that injecting such high levels of water into the combustion chamber would enable a compression ignition engine to operate with acceptable operation in terms of COV of IMEP (coefficient of variation of indicated mean effective pressure).

From the experimental data reported above, a lower ranking BTE performer in most cases was undiluted methanol, with good performance obtained by mixtures which included DME in the 4-9% weight range.

As the water content went beyond approximately 30% by weight in fuels which contained the amounts of DME mentioned previously, the efficiency dropped back to levels that were consistent with the fuels being combusted with no water present.

It was of note that the fuels of about 70% water combusted in the engine, albeit at half the efficiency due in part to the higher exhaust water content.

Figure 8:
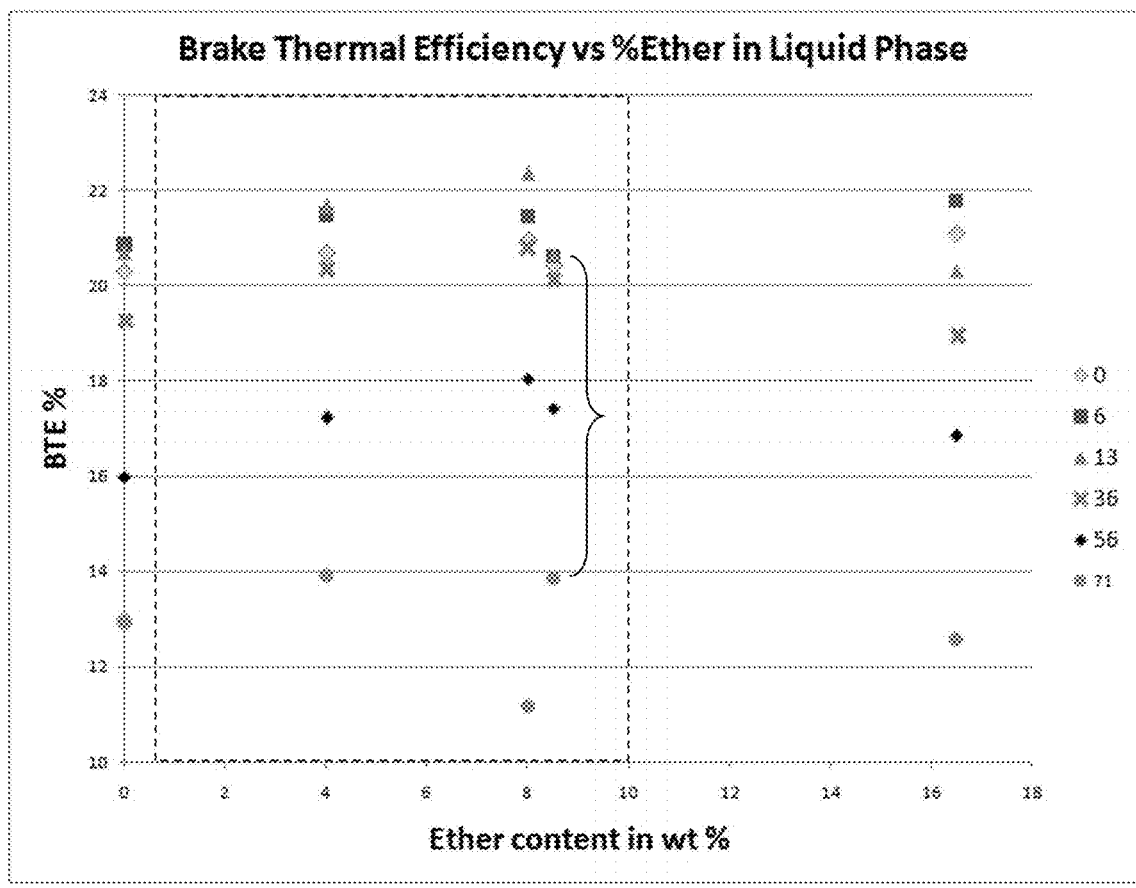
FIG. 8 is a graph illustrating the Brake Thermal Efficiency of a compression ignition engine using main fuels containing varying amounts of ether as ignition enhancer, and utilizing DME as fumigant.

FIG. 8 provides a graphical representation of the ether content of the main fuel, in weight %, and the consequent BTE of the fuel. The bracket (}) is used to mark the points relating to the use of diethylether as the ether component in the fuel composition, whereas the ether used in the other plotted points was dimethyl ether. FIG. 8 indicates a lift in BTE of some 1.5% by introducing 4% DME to the liquid phase at approximately 16% water content, compared to the undiluted methanol case. In general, the results provided through the use of an amount of ether within the box shown by a dashed line provides advantages to the main fuel composition. Increasing the ether content above the 10% level (i.e. outside the box to the right of the figure) introduces additional cost without a corresponding process improvement or advantage.

At low water levels the benefits of 16% DME compared to 4% were small, and 4% DME outperformed 16% DME at water contents higher than about 6%. Approximately 8% DME by weight had slightly higher BTE than 4% DME throughout the water content range, the difference averaging about 0.3% up to a maximum of about 36% water in fuel.

Di ethyl ether (DEE, bracketed points) in fuel showed a weaker BTE in the lower water ranges where the performance was similar to neat methanol, however as the water content in fuel rose above about 25% DEE at approximately 8% improved its performance to match that of DME.

In terms of brake thermal efficiency DEE might not be chosen ahead of DME in a methanol water fuel unless other reasons such as volatility or vapour pressure prevailed.

Figure 9:
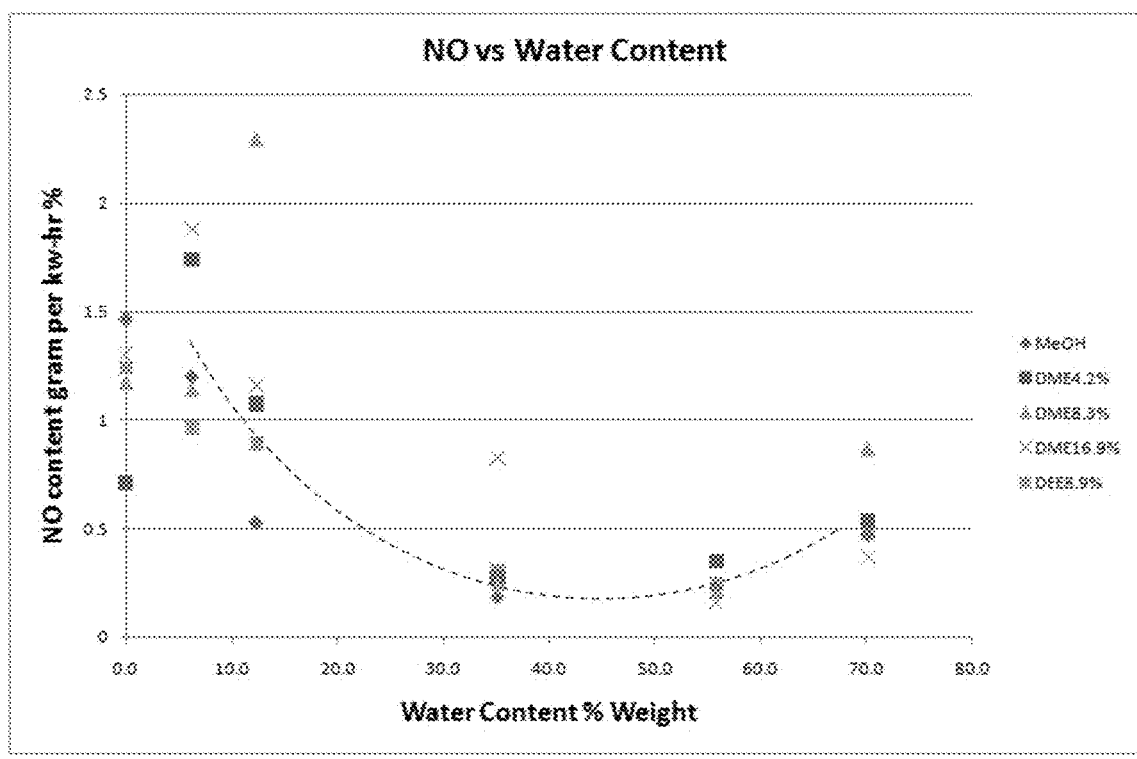
FIG. 9 is a graph illustrating the NO exhaust output of a compression ignition engine using main fuels containing varying amounts of water and utilizing DME as fumigant.

Effect of Water and Fumigant on NO:

In a fumigated environment where a coolant such as water is applied, it could not be predicted that a reduction of NO would be achieved and the extent of NO reduction could not be predicted. The test work shows that the NO reduction was quite dramatic as water levels increased, showing a trough of 0.2 grams/kw-hr at 36% wt water, as shown in the FIG. 9.

FIG. 10 provides another illustration of the effect that increasing the water content has on NOX in the exhaust. The 4% and 8% DME lines showed the best response to NOX formation even at high inlet air temperatures. The same trend can be seen in the case of fumigation, case of decreasing NOX as water levels increase 16.5% DME and 8.8% DEE showed higher levels of NO compared to the low DME cases. All heated runs with no water produced higher NO than diesel fuel without preheat.

From the above data and accompanying Figures it is evident that one operating zone of merit involves the use of a main fuel composition comprising methanol and 20-22% by weight water and 4-6% wt DME in the main fuel composition, with fumigation. This fuel would achieve good efficiency and low NO. The desirable fuel operation zone can be further expanded with acceptable operation of the CI engine, as described in detail in other sections of this application.

Diesel fuel on the same engine by contrast achieved 4.9 grams/kw-hr at lambda 2 and 2000 rpm (the lambda and speed of all fumigation tests in these graphs).

Fumigant:

The use of a fumigant (or fumigation) has not been considered previously with complex fuel compositions, particularly with fuel compositions comprising water and methanol, and optionally with other additives such as DME. Certainly there have been no reports of commercial uptake of such techniques. This may be due to the fact that it might have been considered that such a fuel would be unlikely to work well at all, given the low heating value of methanol, which is further impaired by mixing it with a high latent heat diluent such as water. The use of a fuel containing a large water component is also counter-intuitive as water is normally used to put out fires rather than help them burn.

To investigate this space a single cylinder engine with similar capacity of a cylinder of a 5 litre V8 engine was used, with larger injectors installed to overcome the low heating value per litre of some of the fuels to be tested.

These larger injectors had the effect of reducing the engine efficiency, however as a comparison between fuels, provided mirror conditions applied, the validity of the comparisons has been acknowledged by engine testing professionals.

Oversized injectors were required in the specific operating conditions of the test, and the engine was operated at high rpm due to the small engine size, but further work would enable modification of these factors this with a consequent reduction in the relative amount of fumigant (ignition enhancer) injected into the inlet air of the engine. The experimental work carried out to support this application was carried out at 2000 rpm and 1000 rpm, the latter being the lowest operable speed of the Hatz engine used for the programme.

Example 2

30%:70% Water:Methanol Fuel with Fumigation

A fuel containing 70% methanol and 30% water, is introduced into the combustion ignition engine schematically represented in FIG. 1.

During different stages of operation of the engine (start-up, steady state at low load, steady state at 50%-100% full load, idle, and so forth), different fumigant compositions may be used for fumigating the air inlet into the engine.

At start-up and initial idle, a larger weight % of fumigant with respect to the main fuel is fumigated into the air inlet. One suitable fumigant for this stage of operation comprises 100% DME.

After the engine is running and load/rpm increased, the fumigant % amount and/or the amount of ignition enhancer in the fumigant can be decreased.

Figure 2:
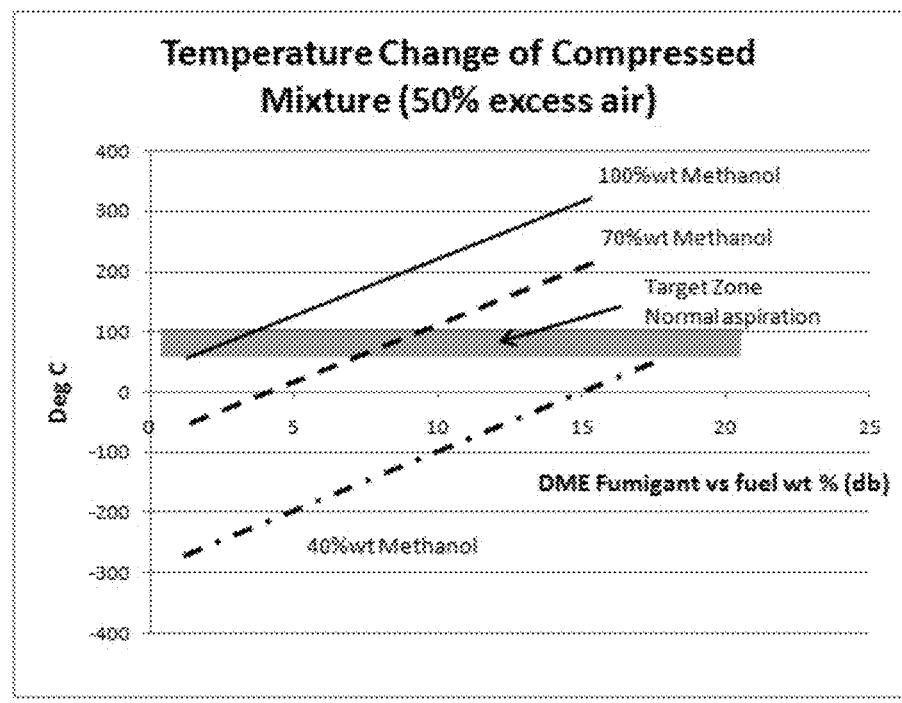
FIG. 2 is a graph of the weight % of dimethyl ether (DME), as ignition enhancer, to be fumigated into an engine (compared to the weight of the main fuel), plotted against the temperature change of the compressed main fuel/fumigant/air mixture, for three main fuel compositions (100% methanol, 70% methanol:30% water and 40% methanol: 60% water). The plot relates to the situation in the absence of other ignition enhancement techniques.

As the engine speed and load increases to full load, the weight % of this fumigant composition with respect to the main fuel can be decreased, for example to 7-9% (refer FIG. 2 graph) by weight of the main fuel (100% DME in the fumigant, or dry basis (db)).

This enables operation of the engine to overcome the presence of water at the 30% level in the main fuel composition.

Example 3

5%:95% Water:Methanol Fuel with Fumigant

Example 2 is repeated but with a 95% methanol to 5% water composition. Due to the higher methanol content, at the different stages of operation of the engine, the weight % of fumigant, or the % of DME in the fumigant, can be decreased as compared to Example 2, for example to 2-3% of fuel intake at full load (as 100% DME).

Example 4

1%:99% Water:Methanol Fuel with Fumigant

Example 2 is repeated but with a 99% methanol to 1% water composition. Due to the higher methanol content, at the different stages of operation of the engine, the weight % of fumigant, or the % of DME in the fumigant, can be decreased as compared to Example 2, for example to 0.5% to 2% of fuel intake at full load (as 100% DME).

Example 5

30%:70% Water:Methanol Fuel with Fumigation and Heat Method

Example 2 is repeated, but with preheating of the combustion air utilizing the methods described previously to 140° C. This modification decreases the fumigant required to 2-3% by weight compared to the 7-9% for Example 2.

Example 6

74:26% Water:Methanol with Fumigation and Heat Method

Example 3 is repeated but with a 26% methanol, 74% water fuel composition. This fuel composition is suitable for use in marine applications—for operating ship CI engines. In this case, sea water can be used as the heat sink if required to obtain the required level of condensation from the exhaust gas. In a marine situation, to ensure safety in enclosed spaces via the presence of a non-flammable vapour phase on spillage, the water level in the fuel composition is about 74% (or more), with 26% (or less) of the fuel being methanol. This high water content avoids the risk of ignition causing engine room fires.

The fuel in the Example may be pumped into the main fuel storage tank in a composition ready for use (i.e., with 74% water in the methanol composition). Alternatively, a pre-mix having a lower water level (compared to the in-use composition) may be pumped into the storage tank, and the water level increased through water dilution of the pre-mix final between storage and charging into the engine. The water source may be any water source, and may for example be recycled water, or desalinated water. This option has advantages with respect to the weight of the fuel composition carried on the vessel.

The combustion of this fuel requires heat via the methods described above. DME vapour or spray is also fumigated into the air inlet to provide sufficient means to ignite the fuel.

The amount of water in the exhaust gas can be calculated to be between about 10-50%. This is based on the original water in the fuel and water coming from combustion of the methanol, and DME, as well as water in the inlet air. This surprisingly high result arises from the high hydrogen content of methanol (which contains more hydrogen on a volume basis than cryogenic liquid hydrogen), combined with the high content of water in the fuel, water vapour in the air inlet and water combustion products from the fuels (methanol and DME).

With this combustion reaction there will be an excess of water generated and the opportunity exists to capture a portion of this for recycle and mixing with a lower-water content pre-mix fuel stored in the storage tank. In some embodiments it is advantageous to reduce supply chain logistics costs associated with the presence of water in the fuel by transporting a higher methanol content base fuel, and meeting target engine quality at higher water levels by the capture of water from the engine exhaust.

A heat exchange and spray chamber arrangement using water that may have been purified with optional additives for selected species removal in the final phase can be configured to ensure that non $CO_2$ pollution from the combustion of methanol is close to nil. In addition a final cleanup of the exhaust gas may be obtained by adsorption of for example, unburnt methanol onto activated surfaces, for later desorption and recycle to the engine within the process using known techniques, or for incorporating as part of the fumigant or main fuel.

In terms of SOX the exhaust gas in this case may have the following analysis:

SOX<0.1 ppm.

In general the emissions of other pollutants such as NOX particulates will be much lower compared to oil based diesel fuels.

Any small amounts of NOX and SOX formed in the combustion phase, and the absorption of $CO_2$ in the water phase, can result in weak acidification of the water returning to mix with the fuel. The returning water mix may need chemical treatment or mechanical adjustment to offset this weak acidification.

The exhaust gas resulting from such cleanup has improved emissions compared to diesel fuel in terms of hydrocarbon, particulate, NOX and SOX emissions, which is environmentally advantageous.

$CO_2$ Recovery

The exhaust resulting from the high water fuel contains almost no impurities, making it ideal for subsequent processing. In particular, the $CO_2$ is converted back to methanol to directly reduce the greenhouse gas $CO_2$ or high purity $CO_2$ can be used for organic growth such as algae for multiple end uses including methanol manufacture, utilizing energy sources which can include renewable sources, such as solar, and so forth.

By separating or purifying the oxygen level in air, nitrogen can be reduced or eliminated from the engine with the resultant reduction or elimination of NOX potential from the oxidation of nitrogen. Recycling of exhaust $CO_2$ to the engine $O_2$ intake would allow optimization of oxygen level entering the engine and the generation of a largely pure $CO_2$ and water vapour exhaust. This $CO_2$ is ideal for further processing to methanol or the above-mentioned applications if desired.

Example 7

Fuel Comprised of 10% Water:5% DME:85% Methanol by Weight with Fumigant

Fumigant as 100% DME required at full load may be reduced to 1 to 2% range.

Example 8

Fuel Compositions and Fumigant Combinations

In the following table examples of methanol/water fuel compositions and corresponding fumigant levels, which enable the smooth operation of combustion ignition engines, are outlined. The table is in two parts—the main fuel of each numbered line pairs with a suitable fumigant on the same numbered line, although pairings between neighbouring fuels and fumigants are possible. Regarding the identity of the fuel extenders, lubricants, ignition improvers and other additives, these are selected from the examples provided in the detailed description above. The % amount referred to in the table for these additives refers to the amount of a single additive of that description, or the total of the additives of that description when a combination of more than one such additive of that class is used. Specific examples utilise sugar or fatty acid ester as fuel extender, fatty acid ester or ethanolamine derivate as lubricity additive, ether as ignition enhancer, and product colour and flame colour additives as the additional additive.

Various fumigants are indicated in the tables, some lower in their ignition properties than those classed as higher ignition components. The components listed are not exhaustive, other suitable components listed elsewhere in this document and known to those skilled in the art may also be used.

| | Whole Fuel Basis (% Wt) | | | Additives Class 1 | Additives | Additives Class 3 | Additives |
|---|---|---|---|---|---|---|---|
| | Water % | Methanol % | Additives % | Fuel Extenders | Class 2 Lubricants | Ignition Improvers | Class 4 Other |
| | | | MAIN FUEL | | | | |
| 1. | 0.2 | 91.15 | 8.65 | 0.15 | 1.5 | 5 | 2 |
| 2. | 0.2 | 89.65 | 10.15 | 0.15 | 3 | 5 | 2 |
| 3. | 0.2 | 87.65 | 12.15 | 0.15 | 5 | 5 | 2 |
| 4. | 0.2 | 91.15 | 8.65 | 0.15 | 1.5 | 5 | 2 |
| 5. | 0.2 | 89.65 | 10.15 | 0.15 | 3 | 5 | 2 |
| 6. | 0.2 | 81.65 | 18.15 | 0.15 | 5 | 10 | 3 |
| 7. | 0.2 | 85.15 | 14.65 | 0.15 | 1.5 | 10 | 3 |
| 8. | 0.2 | 83.65 | 16.15 | 0.15 | 3 | 10 | 3 |
| 9. | 0.2 | 81.65 | 18.15 | 0.15 | 5 | 10 | 3 |
| 10. | 0.2 | 85.15 | 14.65 | 0.15 | 1.5 | 10 | 3 |
| 11. | 1 | 82.85 | 16.15 | 0.15 | 3 | 10 | 3 |
| 12. | 1 | 94.35 | 4.65 | 1.15 | 1.5 | 0 | 2 |
| 13. | 1 | 90.85 | 8.15 | 2.15 | 3 | 0 | 3 |
| 14. | 1 | 88.85 | 10.15 | 3.15 | 5 | 0 | 2 |
| 15. | 1 | 90.35 | 8.65 | 4.15 | 1.5 | 0 | 3 |
| 16. | 1 | 88.85 | 10.15 | 5.15 | 3 | 0 | 2 |
| 17. | 1 | 79.85 | 19.15 | 6.15 | 5 | 5 | 3 |
| 18. | 1 | 83.35 | 15.65 | 7.15 | 1.5 | 5 | 2 |
| 19. | 1 | 79.85 | 19.15 | 8.15 | 3 | 5 | 3 |
| 20. | 1 | 75.85 | 23.15 | 9.15 | 5 | 5 | 4 |
| 21. | 5 | 73.35 | 21.65 | 10.15 | 1.5 | 5 | 5 |
| 22. | 5 | 90.35 | 4.65 | 1.15 | 1.5 | 0 | 2 |
| 23. | 5 | 87.85 | 7.15 | 2.15 | 3 | 0 | 2 |
| 24. | 5 | 84.85 | 10.15 | 3.15 | 5 | 0 | 2 |
| 25. | 5 | 82.35 | 12.65 | 4.15 | 1.5 | 5 | 2 |
| 26. | 5 | 79.85 | 15.15 | 5.15 | 3 | 5 | 2 |
| 27. | 5 | 70.85 | 24.15 | 6.15 | 5 | 10 | 3 |
| 28. | 5 | 73.35 | 21.65 | 7.15 | 1.5 | 10 | 3 |
| 29. | 5 | 65.85 | 29.15 | 8.15 | 3 | 15 | 3 |
| 30. | 5 | 62.85 | 32.15 | 9.15 | 5 | 15 | 3 |
| 31. | 10 | 55.35 | 34.65 | 10.15 | 1.5 | 20 | 3 |
| 32. | 10 | 82.85 | 7.15 | 1.15 | 3 | 0 | 3 |
| 33. | 10 | 84.35 | 5.65 | 2.15 | 1.5 | 0 | 2 |
| 34. | 10 | 80.85 | 9.15 | 3.15 | 3 | 0 | 3 |
| 35. | 10 | 73.85 | 16.15 | 4.15 | 5 | 5 | 2 |
| 36. | 10 | 75.35 | 14.65 | 5.15 | 1.5 | 5 | 3 |
| 37. | 10 | 68.85 | 21.15 | 6.15 | 3 | 10 | 2 |
| 38. | 10 | 64.85 | 25.15 | 7.15 | 5 | 10 | 3 |
| 39. | 10 | 63.35 | 26.65 | 8.15 | 1.5 | 15 | 2 |
| 40. | 10 | 59.85 | 30.15 | 9.15 | 3 | 15 | 3 |
| 41. | 15 | 45.85 | 39.15 | 10.15 | 5 | 20 | 4 |
| 42. | 15 | 77.35 | 7.65 | 1.15 | 1.5 | 0 | 5 |
| 43. | 15 | 79.35 | 5.65 | 2.15 | 1.5 | 0 | 2 |
| 44. | 15 | 76.85 | 8.15 | 3.15 | 3 | 0 | 2 |
| 45. | 15 | 68.85 | 16.15 | 4.15 | 5 | 5 | 2 |
| 46. | 15 | 71.35 | 13.65 | 5.15 | 1.5 | 5 | 2 |
| 47. | 15 | 63.85 | 21.15 | 6.15 | 3 | 10 | 2 |
| 48. | 15 | 59.85 | 25.15 | 7.15 | 5 | 10 | 3 |
| 49. | 15 | 57.35 | 27.65 | 8.15 | 1.5 | 15 | 3 |
| 50. | 15 | 54.85 | 30.15 | 9.15 | 3 | 15 | 3 |
| 51. | 20 | 41.85 | 38.15 | 10.15 | 5 | 20 | 3 |
| 52. | 20 | 74.35 | 5.65 | 1.15 | 1.5 | 0 | 3 |
| 53. | 20 | 71.85 | 8.15 | 2.15 | 3 | 0 | 3 |
| 54. | 20 | 73.35 | 6.65 | 3.15 | 1.5 | 0 | 2 |
| 55. | 20 | 64.85 | 15.15 | 4.15 | 3 | 5 | 3 |
| 56. | 20 | 62.85 | 17.15 | 5.15 | 5 | 5 | 2 |
| 57. | 20 | 59.35 | 20.65 | 6.15 | 1.5 | 10 | 3 |
| 58. | 20 | 57.85 | 22.15 | 7.15 | 3 | 10 | 2 |
| 59. | 20 | 48.85 | 31.15 | 8.15 | 5 | 15 | 3 |
| 60. | 20 | 52.35 | 27.65 | 9.15 | 1.5 | 15 | 2 |
| 61. | 25 | 38.85 | 36.15 | 10.15 | 3 | 20 | 3 |
| 62. | 25 | 64.85 | 10.15 | 1.15 | 5 | 0 | 4 |
| 63. | 25 | 66.35 | 8.65 | 2.15 | 1.5 | 0 | 5 |
| 64. | 25 | 68.35 | 6.65 | 3.15 | 1.5 | 0 | 2 |
| 65. | 25 | 60.85 | 14.15 | 4.15 | 3 | 5 | 2 |
| 66. | 25 | 57.85 | 17.15 | 5.15 | 5 | 5 | 2 |
| 67. | 25 | 55.35 | 19.65 | 6.15 | 1.5 | 10 | 2 |
| 68. | 25 | 52.85 | 22.15 | 7.15 | 3 | 10 | 2 |
| 69. | 25 | 43.85 | 31.15 | 8.15 | 5 | 15 | 3 |

| | | | | | | | |
|---|---|---|---|---|---|---|---|
| 70. | 25 | 46.35 | 28.65 | 9.15 | 1.5 | 15 | 3 |
| 71. | 30 | 33.85 | 36.15 | 10.15 | 3 | 20 | 3 |
| 72. | 30 | 60.85 | 9.15 | 1.15 | 5 | 0 | 3 |
| 73. | 30 | 63.35 | 6.65 | 2.15 | 1.5 | 0 | 3 |
| 74. | 30 | 60.85 | 9.15 | 3.15 | 3 | 0 | 3 |
| 75. | 30 | 57.35 | 12.65 | 4.15 | 1.5 | 5 | 2 |
| 76. | 30 | 53.85 | 16.15 | 5.15 | 3 | 5 | 3 |
| 77. | 30 | 46.85 | 23.15 | 6.15 | 5 | 10 | 2 |
| 78. | 30 | 48.35 | 21.65 | 7.15 | 1.5 | 10 | 3 |
| 79. | 30 | 41.85 | 28.15 | 8.15 | 3 | 15 | 2 |
| 80. | 30 | 37.85 | 32.15 | 9.15 | 5 | 15 | 3 |
| 81. | 40 | 26.35 | 33.65 | 10.15 | 1.5 | 20 | 2 |
| 82. | 40 | 38.85 | 21.15 | 5.15 | 3 | 10 | 3 |
| 83. | 40 | 29.85 | 30.15 | 6.15 | 5 | 15 | 4 |
| 84. | 40 | 26.35 | 33.65 | 7.15 | 1.5 | 20 | 5 |
| 85. | 50 | 27.85 | 22.15 | 5.15 | 5 | 10 | 2 |
| 86. | 50 | 24.35 | 25.65 | 6.15 | 1.5 | 15 | 3 |
| 87. | 50 | 17.85 | 32.15 | 7.15 | 3 | 20 | 2 |
| 88. | 60 | 16.85 | 23.15 | 5.15 | 5 | 10 | 3 |
| 89. | 60 | 18.35 | 21.65 | 6.15 | 1.5 | 10 | 4 |
| 90. | 60 | 17.85 | 22.15 | 7.15 | 5 | 5 | 5 |
| 91. | 10 | 55.35 | 34.65 | 10.15 | 1.5 | 20 | 3 |
| 92. | 10 | 82.85 | 7.15 | 1.15 | 3 | 0 | 3 |
| 93. | 10 | 84.35 | 5.65 | 2.15 | 1.5 | 0 | 2 |
| 94. | 10 | 80.85 | 9.15 | 3.15 | 3 | 0 | 3 |
| 95. | 10 | 73.85 | 16.15 | 4.15 | 5 | 5 | 2 |
| 96. | 10 | 75.35 | 14.65 | 5.15 | 1.5 | 5 | 3 |
| 97. | 10 | 68.85 | 21.15 | 6.15 | 3 | 10 | 2 |
| 98. | 10 | 64.85 | 25.15 | 7.15 | 5 | 10 | 3 |
| 99. | 10 | 63.35 | 26.65 | 8.15 | 1.5 | 15 | 2 |
| 100. | 10 | 59.85 | 30.15 | 9.15 | 3 | 15 | 3 |
| 101. | 15 | 45.85 | 39.15 | 10.15 | 5 | 20 | 4 |
| 102. | 15 | 77.35 | 7.65 | 1.15 | 1.5 | 0 | 5 |
| 103. | 15 | 79.35 | 5.65 | 2.15 | 1.5 | 0 | 2 |
| 104. | 15 | 76.85 | 8.15 | 3.15 | 3 | 0 | 2 |
| 105. | 15 | 68.85 | 16.15 | 4.15 | 5 | 5 | 2 |
| 106. | 15 | 71.35 | 13.65 | 5.15 | 1.5 | 5 | 2 |
| 107. | 15 | 63.85 | 21.15 | 6.15 | 3 | 10 | 2 |
| 108. | 15 | 59.85 | 25.15 | 7.15 | 5 | 10 | 3 |
| 109. | 15 | 57.35 | 27.65 | 8.15 | 1.5 | 15 | 3 |
| 110. | 15 | 54.85 | 30.15 | 9.15 | 3 | 15 | 3 |
| 111. | 20 | 41.85 | 38.15 | 10.15 | 5 | 20 | 3 |
| 112. | 20 | 74.35 | 5.65 | 1.15 | 1.5 | 0 | 3 |
| 113. | 20 | 71.85 | 8.15 | 2.15 | 3 | 0 | 3 |
| 114. | 20 | 73.35 | 6.65 | 3.15 | 1.5 | 0 | 2 |
| 115. | 20 | 64.85 | 15.15 | 4.15 | 3 | 5 | 3 |
| 116. | 20 | 62.85 | 17.15 | 5.15 | 5 | 5 | 2 |
| 117. | 20 | 59.35 | 20.65 | 6.15 | 1.5 | 10 | 3 |
| 118. | 20 | 57.85 | 22.15 | 7.15 | 3 | 10 | 2 |
| 119. | 20 | 48.85 | 31.15 | 8.15 | 5 | 15 | 3 |
| 120. | 20 | 52.35 | 27.65 | 9.15 | 1.5 | 15 | 2 |
| 121. | 25 | 38.85 | 36.15 | 10.15 | 3 | 20 | 3 |
| 122. | 25 | 64.85 | 10.15 | 1.15 | 5 | 0 | 4 |
| 123. | 25 | 66.35 | 8.65 | 2.15 | 1.5 | 0 | 5 |
| 124. | 25 | 68.35 | 6.65 | 3.15 | 1.5 | 0 | 2 |
| 125. | 25 | 60.85 | 14.15 | 4.15 | 3 | 5 | 2 |
| 126. | 25 | 57.85 | 17.15 | 5.15 | 5 | 5 | 2 |
| 127. | 25 | 55.35 | 19.65 | 6.15 | 1.5 | 10 | 2 |
| 128. | 25 | 52.85 | 22.15 | 7.15 | 3 | 10 | 2 |
| 129. | 25 | 43.85 | 31.15 | 8.15 | 5 | 15 | 3 |
| 130. | 25 | 46.35 | 28.65 | 9.15 | 1.5 | 15 | 3 |
| 131. | 30 | 33.85 | 36.15 | 10.15 | 3 | 20 | 3 |
| 132. | 30 | 60.85 | 9.15 | 1.15 | 5 | 0 | 3 |
| 133. | 30 | 63.35 | 6.65 | 2.15 | 1.5 | 0 | 3 |
| 134. | 30 | 60.85 | 9.15 | 3.15 | 3 | 0 | 3 |
| 135. | 30 | 57.35 | 12.65 | 4.15 | 1.5 | 5 | 2 |
| 136. | 30 | 53.85 | 16.15 | 5.15 | 3 | 5 | 3 |
| 137. | 30 | 46.85 | 23.15 | 6.15 | 5 | 10 | 2 |
| 138. | 30 | 48.35 | 21.65 | 7.15 | 1.5 | 10 | 3 |
| 139. | 30 | 41.85 | 28.15 | 8.15 | 3 | 15 | 2 |
| 140. | 30 | 37.85 | 32.15 | 9.15 | 5 | 15 | 3 |
| 141. | 40 | 23.85 | 36.15 | 10.15 | 3 | 20 | 3 |
| 142. | 40 | 50.85 | 9.15 | 1.15 | 5 | 0 | 3 |
| 143. | 40 | 53.35 | 6.65 | 2.15 | 1.5 | 0 | 3 |
| 144. | 40 | 50.85 | 9.15 | 3.15 | 3 | 0 | 3 |
| 145. | 40 | 47.35 | 12.65 | 4.15 | 1.5 | 5 | 2 |
| 146. | 40 | 43.85 | 16.15 | 5.15 | 3 | 5 | 3 |
| 147. | 40 | 36.85 | 23.15 | 6.15 | 5 | 10 | 2 |
| 148. | 40 | 38.35 | 21.65 | 7.15 | 1.5 | 10 | 3 |

-continued

| | | | | | | | |
|---|---|---|---|---|---|---|---|
| 149. | 40 | 31.85 | 28.15 | 8.15 | 3 | 15 | 2 |
| 150. | 40 | 27.85 | 32.15 | 9.15 | 5 | 15 | 3 |
| 151. | 50 | 13.85 | 36.15 | 10.15 | 3 | 20 | 3 |
| 152. | 50 | 40.85 | 9.15 | 1.15 | 5 | 0 | 3 |
| 153. | 50 | 43.35 | 6.65 | 2.15 | 1.5 | 0 | 3 |
| 154. | 50 | 40.85 | 9.15 | 3.15 | 3 | 0 | 3 |
| 155. | 50 | 37.35 | 12.65 | 4.15 | 1.5 | 5 | 2 |
| 156. | 50 | 33.85 | 16.15 | 5.15 | 3 | 5 | 3 |
| 157. | 50 | 26.85 | 23.15 | 6.15 | 5 | 10 | 2 |
| 158. | 50 | 28.35 | 21.65 | 7.15 | 1.5 | 10 | 3 |
| 159. | 50 | 21.85 | 28.15 | 8.15 | 3 | 15 | 2 |
| 160. | 50 | 17.85 | 32.15 | 9.15 | 5 | 15 | 3 |
| 161. | 60 | 15.85 | 24.15 | 10.15 | 3 | 8 | 3 |
| 162. | 60 | 30.85 | 9.15 | 1.15 | 5 | 0 | 3 |
| 163. | 60 | 33.35 | 6.65 | 2.15 | 1.5 | 0 | 3 |
| 164. | 60 | 30.85 | 9.15 | 3.15 | 3 | 0 | 3 |
| 165. | 60 | 27.35 | 12.65 | 4.15 | 1.5 | 5 | 2 |
| 166. | 60 | 23.85 | 16.15 | 5.15 | 3 | 5 | 3 |
| 167. | 60 | 16.85 | 23.15 | 6.15 | 5 | 10 | 2 |
| 168. | 60 | 18.35 | 21.65 | 7.15 | 1.5 | 10 | 3 |
| 169. | 60 | 16.85 | 23.15 | 8.15 | 3 | 10 | 2 |
| 170. | 60 | 17.85 | 22.15 | 9.15 | 5 | 5 | 3 |
| 171. | 70 | 18 | 12 | 1 | 3 | 5 | 3 |
| 172. | 70 | 20.85 | 9.15 | 1.15 | 5 | 0 | 3 |
| 173. | 70 | 23.35 | 6.65 | 2.15 | 1.5 | 0 | 3 |
| 174. | 70 | 20.85 | 9.15 | 3.15 | 3 | 0 | 3 |
| 175. | 70 | 18.35 | 11.65 | 4.15 | 1.5 | 4 | 2 |
| 176. | 70 | 17.85 | 12.15 | 5.15 | 3 | 5 | 3 |
| 177. | 70 | 18 | 12 | 6.15 | 5 | 10 | 2 |
| 178. | 70 | 19 | 11 | 7.15 | 1.5 | 10 | 3 |
| 179. | 70 | 18 | 12 | 8.15 | 3 | 15 | 2 |
| 180. | 70 | 18 | 12 | 1 | 5 | 3 | 3 |

| | Total Fumigant As a % of Main Fuel | Lower Ignition Methanol % in Fumigant | Lower Ignition LPG Butane % in Fumigant | Higher Ignition DME % in Fumigant | Higher Ignition DEE % in Fumigant | Higher Ignition DIPE % in Fumigant | Water Water % in Fumigant | Heat Methods | Comment |
|---|---|---|---|---|---|---|---|---|---|
| 1. | 1 | 0 | | 100 | | | 0 | no | |
| 2. | 1 | 4 | | 95 | | | 1 | no | |
| 3. | 1 | 13 | | 85 | | | 2 | no | 1) |
| 4. | 1 | 17 | | 80 | | | 3 | no | |
| 5. | 1 | 21 | | 75 | | | 4 | no | |
| 6. | 1 | 25 | | 70 | | | 5 | no | |
| 7. | 2 | 29 | | 65 | | | 6 | no | |
| 8. | 2 | 33 | | 60 | | | 7 | no | 2) |
| 9. | 1 | 2 | | | 90 | | 8 | no | |
| 10. | 1 | 1 | | | 90 | | 9 | no | |
| 11. | 2 | 0 | | 100 | | | 0 | no | |
| 12. | 2 | 4 | | 95 | | | 1 | no | |
| 13. | 2 | 13 | | 85 | | | 2 | no | |
| 14. | 2 | 17 | | * | | 80 | 3 | no | |
| 15. | 2 | 21 | | 75 | | | 4 | no | |
| 16. | 2 | 25 | | 70 | | | 5 | no | |
| 17. | 2 | 29 | | 65 | | | 6 | no | |
| 18. | 3 | 33 | | 60 | | | 7 | no | |
| 19. | 2 | 2 | | | 90 | | 8 | no | |
| 20. | 2 | 1 | | | 90 | | 9 | no | |
| 21. | 2 | 0 | | 100 | | | 0 | no | |
| 22. | 2 | 4 | | 95 | | | 1 | no | |
| 23. | 2 | 13 | | 85 | | | 2 | no | |
| 24. | 3 | 17 | | 80 | | | 3 | no | |
| 25. | 3 | 21 | | 75 | | | 4 | no | |
| 26. | 3 | 25 | | 70 | | | 5 | no | |
| 27. | 3 | 29 | | 65 | | | 6 | no | |
| 28. | 3 | 33 | | 60 | | | 7 | no | |
| 29. | 2 | 2 | | | 90 | | 8 | no | |
| 30. | 2 | 1 | | | 90 | | 9 | no | |
| 31. | 3 | 0 | | 100 | | | 0 | no | |
| 32. | 3 | 4 | | 95 | | | 1 | no | |
| 33. | 4 | 13 | | 85 | | | 2 | no | |
| 34. | 4 | 17 | | 80 | | | 3 | no | |
| 35. | 4 | 21 | | 75 | | | 4 | no | |
| 36. | 4 | 25 | 20 | 50 | | | 5 | no | |
| 37. | 5 | 29 | | 65 | | | 6 | no | |
| 38. | 5 | 33 | | 60 | | | 7 | no | |
| 39. | 3 | 2 | | | 90 | | 8 | no | |

-continued

| | | | | | | |
|---|---|---|---|---|---|---|
| 40. | 3 | 1 | | 90 | 9 | no |
| 41. | 4 | 0 | 100 | | 0 | no |
| 42. | 4 | 4 | 95 | | 1 | no |
| 43. | 5 | 13 | 85 | | 2 | no |
| 44. | 5 | 17 | 80 | | 3 | no |
| 45. | 5 | 21 | 75 | | 4 | no |
| 46. | 6 | 25 | 70 | | 5 | no |
| 47. | 6 | 29 | 65 | | 6 | no |
| 48. | 7 | 33 | 60 | | 7 | no |
| 49. | 4 | 2 | | 90 | 8 | no |
| 50. | 4 | 1 | | 90 | 9 | no |
| 51. | 5 | 0 | 100 | | 0 | no |
| 52. | 5 | 4 | 95 | | 1 | no |
| 53. | 6 | 13 | 85 | | 2 | no |
| 54. | 6 | 17 | 80 | | 3 | no |
| 55. | 7 | 21 | 75 | | 4 | no |
| 56. | 7 | 25 | 70 | | 5 | no |
| 57. | 8 | 29 | 65 | | 6 | no |
| 58. | 8 | 33 | 60 | | 7 | no |
| 59. | 6 | 2 | | 90 | 8 | no |
| 60. | 6 | 1 | | 90 | 9 | no |
| 61. | 6 | 0 | 100 | | 0 | no |
| 62. | 6 | 4 | 95 | | 1 | no |
| 63. | 7 | 13 | 85 | | 2 | no |
| 64. | 8 | 17 | 80 | | 3 | no |
| 65. | 8 | 21 | 75 | | 4 | no |
| 66. | 9 | 25 | 70 | | 5 | no |
| 67. | 9 | 29 | 65 | | 6 | no |
| 68. | 10 | 33 | 60 | | 7 | no |
| 69. | 7 | 2 | | 90 | 8 | no |
| 70. | 7 | 1 | | 90 | 9 | no |
| 71. | 8 | 0 | 100 | | 0 | no |
| 72. | 8 | 4 | 95 | | 1 | no |
| 73. | 9 | 13 | 85 | | 2 | no |
| 74. | 10 | 17 | 80 | | 3 | no |
| 75. | 11 | 21 | 75 | | 4 | no |
| 76. | 11 | 25 | 70 | | 5 | no |
| 77. | 12 | 29 | 65 | | 6 | no |
| 78. | 13 | 33 | 60 | | 7 | no |
| 79. | 9 | 2 | | 90 | 8 | no |
| 80. | 9 | 1 | | 90 | 9 | no |
| 81. | 11 | 0 | 100 | | 0 | no |
| 82. | 12 | 8 | 90 | | 2 | no |
| 83. | 13 | 13 | 85 | | 2 | no |
| 84. | 12 | 3 | 95 | | 2 | no |
| 85. | 14 | 0 | 100 | | 0 | no |
| 86. | 16 | 13 | 85 | | 2 | no |
| 87. | 15 | 3 | 95 | | 2 | no |
| 88. | 19 | 0 | 100 | | 0 | no |
| 89. | 19 | 0 | | 100 | 0 | no |
| 90. | 19 | 0 | | 100 | 0 | no |
| 91. | 1 | 0 | 100 | | 0 | yes |
| 92. | 1 | 4 | 95 | | 1 | yes |
| 93. | 1 | 13 | 85 | | 2 | yes |
| 94. | 1 | 17 | 80 | | 3 | yes |
| 95. | 1 | 21 | 75 | | 4 | yes |
| 96. | 1 | 25 | 70 | | 5 | yes |
| 97. | 2 | 29 | 65 | | 6 | yes |
| 98. | 2 | 33 | 60 | | 7 | yes |
| 99. | 1 | 2 | | 90 | 8 | yes |
| 100. | 1 | 1 | | 90 | 9 | yes |
| 101. | 1 | 0 | 100 | | 0 | yes |
| 102. | 1 | 4 | 95 | | 1 | yes |
| 103. | 2 | 13 | 85 | | 2 | yes |
| 104. | 2 | 17 | 80 | | 3 | yes |
| 105. | 2 | 21 | 75 | | 4 | yes |
| 106. | 2 | 25 | 70 | | 5 | yes |
| 107. | 2 | 29 | 65 | | 6 | yes |
| 108. | 2 | 33 | 60 | | 7 | yes |
| 109. | 1 | 2 | | 90 | 8 | yes |
| 110. | 1 | 1 | | 90 | 9 | yes |
| 111. | 2 | 0 | 100 | | 0 | yes |
| 112. | 2 | 4 | 95 | | 1 | yes |
| 113. | 2 | 13 | 85 | | 2 | yes |
| 114. | 2 | 17 | 80 | | 3 | yes |
| 115. | 2 | 21 | 75 | | 4 | yes |
| 116. | 2 | 25 | 70 | | 5 | yes |
| 117. | 3 | 29 | 65 | | 6 | yes |
| 118. | 3 | 33 | 60 | | 7 | yes |

-continued

| | | | | | | |
|---|---|---|---|---|---|---|
| 119. | 2 | 2 | | 90 | 8 | yes |
| 120. | 2 | 1 | | 90 | 9 | yes |
| 121. | 2 | 0 | 100 | | 0 | yes |
| 122. | 2 | 4 | 95 | | 1 | yes |
| 123. | 2 | 13 | 85 | | 2 | yes |
| 124. | 3 | 17 | 80 | | 3 | yes |
| 125. | 3 | 21 | 75 | | 4 | yes |
| 126. | 3 | 25 | 70 | | 5 | yes |
| 127. | 3 | 29 | 65 | | 6 | yes |
| 128. | 3 | 33 | 60 | | 7 | yes |
| 129. | 2 | 2 | | 90 | 8 | yes |
| 130. | 2 | 1 | | 90 | 9 | yes |
| 131. | 3 | 0 | 100 | | 0 | yes |
| 132. | 3 | 4 | 95 | | 1 | yes |
| 133. | 3 | 13 | 85 | | 2 | yes |
| 134. | 3 | 17 | 80 | | 3 | yes |
| 135. | 4 | 21 | 75 | | 4 | yes |
| 136. | 4 | 25 | 70 | | 5 | yes |
| 137. | 4 | 29 | 65 | | 6 | yes |
| 138. | 4 | 33 | 60 | | 7 | yes |
| 139. | 3 | 2 | | 90 | 8 | yes |
| 140. | 3 | 1 | | 90 | 9 | yes |
| 141. | 4 | 0 | 100 | | 0 | yes |
| 142. | 4 | 4 | 95 | | 1 | yes |
| 143. | 4 | 13 | 85 | | 2 | yes |
| 144. | 5 | 17 | 80 | | 3 | yes |
| 145. | 5 | 21 | 75 | | 4 | yes |
| 146. | 5 | 25 | 70 | | 5 | yes |
| 147. | 6 | 29 | 65 | | 6 | yes |
| 148. | 6 | 33 | 60 | | 7 | yes |
| 149. | 4 | 2 | | 90 | 8 | yes |
| 150. | 4 | 1 | | 90 | 9 | yes |
| 151. | 5 | 0 | 100 | | 0 | yes |
| 152. | 5 | 4 | 95 | | 1 | yes |
| 153. | 5 | 13 | 85 | | 2 | yes |
| 154. | 6 | 17 | 80 | | 3 | yes |
| 155. | 6 | 21 | 75 | | 4 | yes |
| 156. | 7 | 25 | 70 | | 5 | yes |
| 157. | 7 | 29 | 65 | | 6 | yes |
| 158. | 8 | 33 | 60 | | 7 | yes |
| 159. | 5 | 2 | | 90 | 8 | yes |
| 160. | 5 | 1 | | 90 | 9 | yes |
| 161. | 6 | 0 | 100 | | 0 | yes |
| 162. | 7 | 4 | 95 | | 1 | yes |
| 163. | 7 | 13 | 85 | | 2 | yes |
| 164. | 8 | 17 | 80 | | 3 | yes |
| 165. | 8 | 21 | 75 | | 4 | yes |
| 166. | 9 | 25 | 70 | | 5 | yes |
| 167. | 10 | 29 | 65 | | 6 | yes |
| 168. | 11 | 33 | 60 | | 7 | yes |
| 169. | 7 | 2 | | 90 | 8 | yes |
| 170. | 7 | 1 | | 90 | 9 | yes |
| 171. | 9 | 0 | 100 | | 0 | yes |
| 172. | 9 | 4 | 95 | | 1 | yes |
| 173. | 11 | 13 | 85 | | 2 | yes |
| 174. | 11 | 17 | 80 | | 3 | yes |
| 175. | 12 | 21 | 75 | | 4 | yes |
| 176. | 13 | 25 | 70 | | 5 | yes |
| 177. | 14 | 29 | 65 | | 6 | yes |
| 178. | 15 | 33 | 60 | | 7 | yes |
| 179. | 10 | 2 | | 90 | 8 | yes |
| 180. | 10 | 1 | | 90 | 9 | yes |

$^\Delta$ % by weight; additional to the 100% water/methanol combination
* by weight of total fuel intake The claims defining the invention are as follows:

1. A process of powering a compression ignition engine, comprising:
    introducing a diesel engine fuel composition into a combustion chamber, the diesel engine fuel composition comprising:
        methanol,
        from 5% by weight to 25% by weight water,
        one or more additives selected from the group consisting of: ignition improvers, fuel extenders, combustion enhancers, oxygen absorbing oil, lubricity additives, product colouration additives, flame colour additives, anti corrosion additives, biocides, freeze point depressants, deposit reductants, denaturants, pH controlling agents, and mixtures thereof, and
        0% to 20% by weight dimethyl ether;
    pre-heating an intake air stream of the compression ignition engine or fumigating an intake air stream with an ignition enhancer;
    introducing the intake air into the combustion chamber in the engine and compressing the intake air; and
    igniting the fuel/air mixture to thereby drive the engine.

2. The process of claim 1, wherein the process comprises both pre-heating and fumigating steps.

3. The process of claim 1, wherein the ignition enhancer is dimethyl ether.

4. A process of powering a compression ignition engine comprising:
introducing an intake airstream with a fumigant comprising an ignition enhancer into the combustion chamber of the compression ignition engine;
compressing the fumigated airstream on the compression stroke of the engine to ignite the fumigant and thereby pre-heat the combustion chamber; and
injecting a main fuel into the pre-heated combustion chamber, the main fuel comprising:
methanol,
from 5% to 25% by weight water,
one or more additives selected from the group consisting of: ignition improvers, fuel extenders, combustion enhancers, oxygen absorbing oil, lubricity additives, product colouration additives, flame colour additives, anti corrosion additives, biocides, freeze point depressants, deposit reductants, denaturants, pH controlling agents, and mixtures thereof, and
0% to 20% by weight dimethyl ether.

5. A process of powering a compression ignition engine, comprising:
igniting a mixture comprising a diesel engine fuel composition and air in a combustion chamber in the compression ignition engine, the diesel engine fuel composition comprising:
at least 20% by weight methanol,
from 5% by weight to 25% by weight water,
one or more additives selected from the group consisting of: ignition improvers, fuel extenders, combustion enhancers, oxygen absorbing oil, lubricity additives, product colouration additives, flame colour additives, anti corrosion additives, biocides, freeze point depressants, deposit reductants, denaturants, pH controlling agents, and mixtures thereof, and
0% to 20% by weight dimethyl ether.

6. The process of claim 5, wherein the composition comprises from 5% by weight to 15% by weight water.

7. The process of claim 5, wherein the composition comprises at least 12% by weight water.

8. The process of claim 5, wherein the composition comprises from 12% to 23% by weight water.

9. The process of claim 5, wherein the composition comprises at least 50% by weight methanol.

10. The process of claim 9, wherein the composition comprises at least 12% by weight water.

11. The process of claim 5, wherein the composition comprises not more than 20% by weight additives.

12. The process of claim 5, wherein the composition is a single phase fuel composition.

13. The process of claim 5, wherein the methanol is a crude methanol.

14. The process of claim 5, wherein the total amount of water and methanol is at least 60% by weight of the fuel composition.

15. The process of claim 5, wherein the additives comprise:
a product colouration additive at up to 1% by weight, and
a flame colour additive at up to 1% by weight of the fuel.

* * * * *